United States Patent
Lawson et al.

(10) Patent No.: US 12,177,304 B2
(45) Date of Patent: *Dec. 24, 2024

(54) SYSTEM AND METHOD FOR PROVIDING A MICRO-SERVICES COMMUNICATION PLATFORM

(71) Applicant: Twilio Inc., San Francisco, CA (US)

(72) Inventors: Jeffrey Lawson, San Francisco, CA (US); John Wolthius, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/301,340

(22) Filed: Mar. 31, 2021

(65) Prior Publication Data
US 2021/0218819 A1    Jul. 15, 2021

Related U.S. Application Data

(63) Continuation of application No. 16/823,223, filed on Mar. 18, 2020, now Pat. No. 11,019,159, which is a
(Continued)

(51) Int. Cl.
*H04L 67/51* (2022.01)
*H04L 12/14* (2006.01)
(Continued)

(52) U.S. Cl.
CPC .............. *H04L 67/51* (2022.05); *H04L 12/14* (2013.01); *H04L 12/1403* (2013.01);
(Continued)

(58) Field of Classification Search
CPC ..... H04L 67/16; H04L 12/14; H04L 12/1403; H04L 61/308; H04L 65/403;
(Continued)

(56) References Cited

U.S. PATENT DOCUMENTS

| 5,274,700 A | 12/1993 | Gechter et al. |
| 5,526,416 A | 6/1996 | Dezonno et al. |

(Continued)

FOREIGN PATENT DOCUMENTS

| DE | 1684587 A1 | 3/1971 |
| EP | 0282126 A2 | 9/1988 |

(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

(Continued)

*Primary Examiner* — Michael Won
(74) *Attorney, Agent, or Firm* — Schwegman Lundberg & Woessner, P.A.

(57) ABSTRACT

A multi-tenant media communication platform system and methods. The platform system includes media communication micro-services and micro-service configuration for a plurality of entities configured for use of the platform system. Enrolling an entity in the platform system includes setting entity configuration for use of the platform system by the entity. A micro-service request is processed according to the entity configuration. The micro-service request is a request for use of at least one micro-service of the platform system on behalf of the entity. Use of each micro-service is accounted for on behalf of the entity. Billing information for the entity is generated based on the accounting for the use of each micro-service on behalf of the entity. Entity configuration includes micro-service configuration, and micro-service configuration specifies at least one of: an endpoint (Continued)

mapping to at least one application logic URI, an event callback URI, and an event application logic URI.

20 Claims, 29 Drawing Sheets

Related U.S. Application Data continuation of application No. 15/842,731, filed on Dec. 14, 2017, now Pat. No. 10,637,938, which is a continuation of application No. 15/297,857, filed on Oct. 19, 2016, now Pat. No. 9,906,607, which is a continuation of application No. 15/141,624, filed on Apr. 28, 2016, now Pat. No. 9,509,782, which is a continuation of application No. 14/919,650, filed on Oct. 21, 2015, now Pat. No. 9,363,301.

(60) Provisional application No. 62/066,766, filed on Oct. 21, 2014, provisional application No. 62/066,776, filed on Oct. 21, 2014, provisional application No. 62/066,763, filed on Oct. 21, 2014, provisional application No. 62/066,768, filed on Oct. 21, 2014, provisional application No. 62/066,774, filed on Oct. 21, 2014.

(51) Int. Cl.
| | |
|---|---|
| *H04L 65/403* | (2022.01) |
| *H04L 65/75* | (2022.01) |
| *H04L 65/80* | (2022.01) |
| *H04L 67/02* | (2022.01) |
| *H04L 67/104* | (2022.01) |
| *H04L 67/141* | (2022.01) |
| *H04L 67/50* | (2022.01) |
| *H04L 67/565* | (2022.01) |
| *H04L 67/60* | (2022.01) |
| *H04M 15/00* | (2006.01) |
| *H04L 61/2514* | (2022.01) |
| *H04L 61/256* | (2022.01) |
| *H04L 61/2575* | (2022.01) |
| *H04L 61/2589* | (2022.01) |
| *H04L 101/38* | (2022.01) |

(52) U.S. Cl.
CPC ............ *H04L 65/403* (2013.01); *H04L 65/75* (2022.05); *H04L 65/80* (2013.01); *H04L 67/02* (2013.01); *H04L 67/104* (2013.01); *H04L 67/141* (2013.01); *H04L 67/535* (2022.05); *H04L 67/565* (2022.05); *H04L 67/60* (2022.05); *H04M 15/41* (2013.01); *H04M 15/44* (2013.01); *H04M 15/47* (2013.01); *H04M 15/52* (2013.01); *H04M 15/62* (2013.01); *H04L 61/2514* (2013.01); *H04L 61/2564* (2013.01); *H04L 61/2575* (2013.01); *H04L 61/2589* (2013.01); *H04L 2101/38* (2022.05)

(58) Field of Classification Search
CPC ....... H04L 65/601; H04L 65/80; H04L 67/02; H04L 67/104; H04L 67/141; H04L 67/22; H04L 67/2823; H04L 67/32; H04L 61/2514; H04L 61/2564; H04L 61/2575; H04L 61/2589; H04M 15/41; H04M 15/44; H04M 15/47; H04M 15/52; H04M 15/62
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,343,332 B1 | 1/2002 | Ueda |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,442,159 B2 | 8/2002 | Josse et al. |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,811 B2 | 3/2004 | Greenberg et al. |
| 6,707,889 B1 | 3/2004 | Saylor et al. |
| 6,707,899 B2 | 3/2004 | Saito et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,915 B1 * | 12/2004 | Beyschlag .......... H04L 65/1043 370/522 |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |

(56) References Cited

U.S. PATENT DOCUMENTS

| | | |
|---|---|---|
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,046,778 B2 | 5/2006 | Martin et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,142,662 B2 | 11/2006 | Rodenbusch et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,231,035 B2 | 6/2007 | Walker et al. |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,830 B2 | 11/2007 | Guedalia et al. |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B2 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,426,750 B2 | 9/2008 | Cooper et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,532,596 B2 | 5/2009 | Trossen et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,132,262 B2 | 3/2012 | Asai et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |

(56) References Cited

U.S. PATENT DOCUMENTS

| | | |
|---|---|---|
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,190,670 B2 | 5/2012 | Gavrilescu et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,137,127 B2 | 9/2015 | Nowack et al. |
| 9,141,592 B2 | 9/2015 | Baikov et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,590,872 B1 | 3/2017 | Jagtap et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,661,143 B1 | 5/2017 | Okita et al. |
| 10,250,455 B1 | 4/2019 | Moniz et al. |
| 10,498,831 B2 * | 12/2019 | Lu .................. H04L 67/146 |
| 10,531,365 B2 * | 1/2020 | Kaur .................. H04W 48/10 |
| 10,637,938 B2 | 4/2020 | Lawson et al. |
| 2001/0034831 A1 * | 10/2001 | Brustoloni .......... H04L 12/2856 |
| | | 713/151 |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |

(56) References Cited

U.S. PATENT DOCUMENTS

| | | |
|---|---|---|
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0140385 A1* | 6/2006 | Haase ................ H04L 67/306 379/221.09 |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0161441 A1* | 7/2006 | Nathoo ................ G06Q 40/02 705/1.1 |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0209794 A1* | 9/2006 | Bae ................ H04M 7/0075 370/352 |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1* | 4/2007 | Tai ................ H04M 7/128 709/227 |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0126481 A1 | 5/2008 | Chakra et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |

(56) References Cited

U.S. PATENT DOCUMENTS

| | | |
|---|---|---|
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0276304 A1 | 11/2008 | Maffione et al. |
| 2008/0298353 A1* | 12/2008 | Zhu ............... H04W 76/15 370/356 |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0070786 A1* | 3/2009 | Alves ............... G06Q 40/02 719/318 |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0094674 A1 | 4/2009 | Schwartz et al. |
| 2009/0113460 A1* | 4/2009 | Parrish ............... H04L 69/18 719/328 |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0164591 A1* | 6/2009 | Chadli ............... H04L 65/1006 709/206 |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1* | 11/2009 | Nickolov ............ H04L 67/1029 718/1 |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0041369 A1 | 2/2010 | Narayan et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0211445 A1* | 8/2010 | Bodington ............ G06Q 40/02 705/14.28 |
| 2010/0214090 A1* | 8/2010 | Sartini ............... H04L 67/26 340/517 |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0219105 A1 | 9/2011 | Kryze |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |

(56) References Cited

U.S. PATENT DOCUMENTS

| | | |
|---|---|---|
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0046014 A1* | 2/2012 | Wachter .............. H04L 67/147 455/411 |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0221628 A1 | 8/2012 | Fujigaki |
| 2012/0221955 A1* | 8/2012 | Raleigh .............. H04L 12/1485 726/1 |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0290733 A1* | 11/2012 | Harding .............. H04L 65/1066 709/228 |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2012/0324050 A1* | 12/2012 | Peters, Jr. ............ H04L 65/1023 709/217 |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058236 A1* | 3/2013 | Ronneke .............. H04W 4/70 370/252 |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0089033 A1* | 4/2013 | Kahn .................. H04W 28/22 370/329 |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179941 A1 | 7/2013 | Mcgloin et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2013/0346493 A1 | 12/2013 | Martin |
| 2014/0013400 A1 | 1/2014 | Warshavsky et al. |
| 2014/0025503 A1 | 1/2014 | Meyer et al. |
| 2014/0026057 A1* | 1/2014 | Kimpton .............. G06F 9/451 715/733 |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1* | 4/2014 | Cooke .................. H04W 24/08 455/405 |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0188459 A1 | 7/2014 | Fink et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0330951 A1 | 11/2014 | Sukoff et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0375440 A1* | 12/2014 | Rezvani .............. H04L 63/102 340/12.29 |
| 2014/0379670 A1 | 12/2014 | Kuhr |
| 2014/0380425 A1* | 12/2014 | Lockett ................ G06F 21/00 726/4 |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0156115 A1 | 6/2015 | Buyukkoc et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0379429 A1* | 12/2015 | Lee ...................... G09B 5/00 706/11 |
| 2015/0381580 A1 | 12/2015 | Graham, III et al. |
| 2016/0006673 A1 | 1/2016 | Thomas et al. |
| 2016/0011758 A1 | 1/2016 | Dornbush et al. |
| 2016/0028648 A1* | 1/2016 | Wohlert .............. H04L 67/1095 709/226 |
| 2016/0028695 A1 | 1/2016 | Binder |
| 2016/0077693 A1 | 3/2016 | Meyer et al. |

(56) References Cited

U.S. PATENT DOCUMENTS

| | | | |
|---|---|---|---|
| 2016/0112475 | A1 | 4/2016 | Lawson et al. |
| 2016/0112521 | A1 | 4/2016 | Lawson et al. |
| 2016/0119291 | A1 | 4/2016 | Zollinger et al. |
| 2016/0124742 | A1 | 5/2016 | Rangasamy et al. |
| 2016/0127254 | A1 | 5/2016 | Kumar et al. |
| 2016/0149956 | A1 | 5/2016 | Birnbaum et al. |
| 2016/0162172 | A1 | 6/2016 | Rathod |
| 2016/0205519 | A1 | 7/2016 | Patel et al. |
| 2016/0225044 | A1 | 8/2016 | Lawson |
| 2016/0226937 | A1 | 8/2016 | Patel et al. |
| 2016/0226979 | A1 | 8/2016 | Lancaster et al. |
| 2016/0227045 | A1 | 8/2016 | Hunt et al. |
| 2016/0234391 | A1 | 8/2016 | Wolthuis et al. |
| 2016/0239770 | A1 | 8/2016 | Batabyal et al. |
| 2016/0248861 | A1 | 8/2016 | Lawson et al. |
| 2016/0260157 | A1 | 9/2016 | Krook et al. |
| 2016/0275137 | A1* | 9/2016 | Bohm ............... G06F 16/252 |
| 2017/0041406 | A1 | 2/2017 | Lawson et al. |
| 2017/0060621 | A1 | 3/2017 | Whipple et al. |
| 2017/0329588 | A1* | 11/2017 | Lundberg ............ G06F 9/44521 |
| 2017/0339283 | A1 | 11/2017 | Chaudhary et al. |
| 2018/0083977 | A1* | 3/2018 | Murugesan ......... G06F 21/6218 |
| 2018/0109634 | A1 | 4/2018 | Lawson et al. |
| 2018/0191740 | A1* | 7/2018 | Decenzo ............ H04L 12/2803 |
| 2018/0351851 | A1* | 12/2018 | Parthasarathy ....... H04L 63/123 |
| 2020/0220939 | A1 | 7/2020 | Lawson et al. |
| 2021/0067480 | A1* | 3/2021 | Goel .................. H04L 61/4511 |
| 2022/0124468 | A1* | 4/2022 | Lu .......................... H04L 67/60 |
| 2022/0147400 | A1* | 5/2022 | Cowan ............... G06F 11/3409 |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| EP | 3210350 A1 | 8/2017 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |
| WO | WO-2016065080 A1 | 4/2016 |

OTHER PUBLICATIONS

"U.S. Appl. No. 14/919,650, Notice of Allowance mailed Feb. 2, 2016", 13 pgs.

"U.S. Appl. No. 15/141,624, Notice of Allowance mailed Sep. 1, 2016", 10 pgs.

"U.S. Appl. No. 15/297,857, Examiner Interview Summary mailed Aug. 14, 2017", 3 pgs.

"U.S. Appl. No. 15/297,857, Non Final Office Action mailed May 5, 2017", 12 pgs.

"U.S. Appl. No. 15/297,857, Notice of Allowance mailed Sep. 25, 2017", 9 pgs.

"U.S. Appl. No. 15/297,857, Notice of Allowance mailed Oct. 6, 2017", 6 pgs.

"U.S. Appl. No. 15/297,857, Response filed Aug. 4, 2017 to Non Final Office Action mailed May 5, 2017", 10 pgs.

"U.S. Appl. No. 15/842,731, Examiner Interview Summary mailed Nov. 22, 2019", 3 pgs.

"U.S. Appl. No. 15/842,731, Non Final Office Action mailed Jun. 25, 2019", 15 pgs.

"U.S. Appl. No. 15/842,731, Notice of Allowance mailed Dec. 18, 2019", 9 pgs.

"U.S. Appl. No. 15/842,731, Preliminary Amendment filed May 22, 2019", 10 pgs.

"U.S. Appl. No. 15/842,731, Response filed Nov. 22, 2019 to Non-Final Office Action mailed Jun. 25, 2019", 14 pgs.

"U.S. Appl. No. 16/823,223, Examiner Interview Summary mailed Dec. 4, 2020", 3 pgs.

"U.S. Appl. No. 16/823,223, Non Final Office Action mailed Sep. 16, 2020", 17 pgs.

"U.S. Appl. No. 16/823,223, Notice of Allowance mailed Jan. 25, 2021", 9 pgs.

"U.S. Appl. No. 16/823,223, Response filed Dec. 10, 2020 to Non Final Office Action mailed Sep. 16, 2020", 12 pgs.

"Archive Microsoft Office 365 Email I Retain Unified Archiving", Gwava, Inc., Montreal, Canada, [Online] Retrieved from the Internet: <URL: http://www.gwava.com/Retain/Retain_for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"European Application Serial No. 15853172.3, Extended European Search Report mailed May 16, 2018", 14 pgs.

"European Application Serial No. 15853172.3, Response filed Jun. 4, 2018 to Extended European Search Report mailed May 16, 2018", 1 pg.

"European Application Serial No. 15853172.3, Response filed Nov. 27, 2017 to Communication pursuant to Rules 161(1) and 162 EPC mailed May 31, 2017", 11 pgs.

"European Application Serial No. 15853172.3, Response filed Dec. 12, 2018 to Extended European Search Report mailed May 16, 2018", 248 pgs.

"International Application Serial No. PCT/US2015/056773, International Preliminary Report on Patentability mailed May 4, 2017", 9 pgs.

"International Application Serial No. PCT/US2015/056773, International Search Report mailed Jan. 11, 2016", 2 pgs.

"International Application Serial No. PCT/US2015/056773, Written Opinion mailed Jan. 11, 2016", 7 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

Xu, Shao, et al., "An Integrated Telecom and IT Service Delivery Platform", Asia-Pacific Services Computing Conference IEEE, (2008).

(56) References Cited

OTHER PUBLICATIONS

U.S. Appl. No. 14/919,650 U.S. Pat. No. 9,363,301, filed Oct. 21, 2015, System and Method for Providing a Micro-Services Comniunication Platform
U.S. Appl. No. 15/141,624 U.S. Pat. No. 9,509,782, filed Apr. 28, 2016, System and Method for Providing a Micro-Services Comniunication Platform
U.S. Appl. No. 15/297,857 U.S. Pat. No. 9,906,607, filed Oct. 19, 2016, System and Method for Providing a Micro-Services Comniunication Platform.
U.S. Appl. No. 15/842,731 U.S. Pat. No. 10,637,938, filed Dec. 14, 2017, System and Method for Providing a Micro-Services Comniunication Platform.
U.S. Appl. No. 16/823,223, filed Mar. 18, 2020 System and Method for Providing a Micro-Services Comniunication Platform.
U.S. Appl. No. 14/919,659 U.S. Pat. No. 9,749,428, filed Oct. 21, 2015, System and Method for Providing a Network Discovery Service Platform.

* cited by examiner

Programatic Mapping

| | |
|---|---|
| 415-555-1234 | Error Callback URI: companyA.example.com/error<br>End Callback URI: companyA.example.com/end |
| 415-555-5678 | Logic Callback URI: ACME.example.com/234SD |
| 415-555-2233 | - |
| Account 34 | End Callback URI: companyX.example.com/end<br>Logic Callback URI: companyX.example.com/234SD |
| Application 64D3 | Error Callback URI: service.example.com/error |

FIGURE 7

|  | Network Discovery | Identity and Presence | Transcoding | Recording | Conferencing/Mixing | Media Intelligence |
|---|---|---|---|---|---|---|
| Accounts | X | X | X | X | X | X |
| Sub-Accounts | X | X | X | X | X | X |
| Queuing | X | X | X | X | X | X |
| Metering and Accounting | X | X | X | X | X | X |
| Fraud Detection | X | X | X | X | X | X |
| Programmatic Mechanisms | X | X | X | X | X | X |
| Cross micro-service integration | X | X | X | X | X | X |

Columns: Micro-Services. Rows: CPaaS Features.

FIGURE 12

SYSTEM AND METHOD FOR PROVIDING A MICRO-SERVICES COMMUNICATION PLATFORM

CROSS-REFERENCE TO RELATED APPLICATIONS

This application is a continuation of U.S. patent application Ser. No. 16/823,223, filed 18 Mar. 2020, which is a continuation of U.S. patent application Ser. No. 15/842,731, filed 14 Dec. 2017, which is a continuation of U.S. patent application Ser. No. 15/297,857, filed 19 Oct. 2016, which is a continuation of U.S. patent application Ser. No. 15/141,624, filed 28 Apr. 2016, which is a continuation of U.S. patent application Ser. No. 14/919,650, filed 21 Oct. 2015, which claims the benefit of U.S. Provisional Application Ser. No. 62/066,763, filed on 21 Oct. 2014, U.S. Provisional Application Ser. No. 62/066,766, filed on 21 Oct. 2014, U.S. Provisional Application Ser. No. 62/066,768, filed on 21 Oct. 2014, U.S. Provisional Application Ser. No. 62/066,774, filed on 21 Oct. 2014, and U.S. Provisional Application Ser. No. 62/066,776, filed on 21 Oct. 2014, all of which are incorporated in their entirety by this reference.

TECHNICAL FIELD

This invention relates generally to the communication platform field, and more specifically to a new and useful system and method for providing a micro-services communication platform in the communication platform field.

BACKGROUND

The rise of smart phones and the merging of communication and applications have caused a proliferation of modes of communication. Additionally, new communication platforms have provided tools to integrate phone calls, text messaging, and other forms of communication. Many solutions lack basic features that enable easy integration with a system built for particular forms of communication. Other platforms are built for the general public and as such have additional features that may not be utilized uniformly across all users, which can cause such solutions to be unfeasible in terms of cost and functional overhead. However, building out the infrastructure to support the communication application may require tremendous amounts of engineering resources both to build and maintain such a solution. Thus, there is a need in the communication platform field to create a new and useful system and method for providing a micro-services communication platform. This invention provides such a new and useful system and method.

BRIEF DESCRIPTION OF THE FIGURES

FIG. 7 is a table representation of exemplary mappings of programmatic mechanisms;

FIG. 12 is a schematic representation of an exemplary micro-service and CPaaS feature matrix;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System and Method for a Micro-Services Communication Platform

Figure 1:
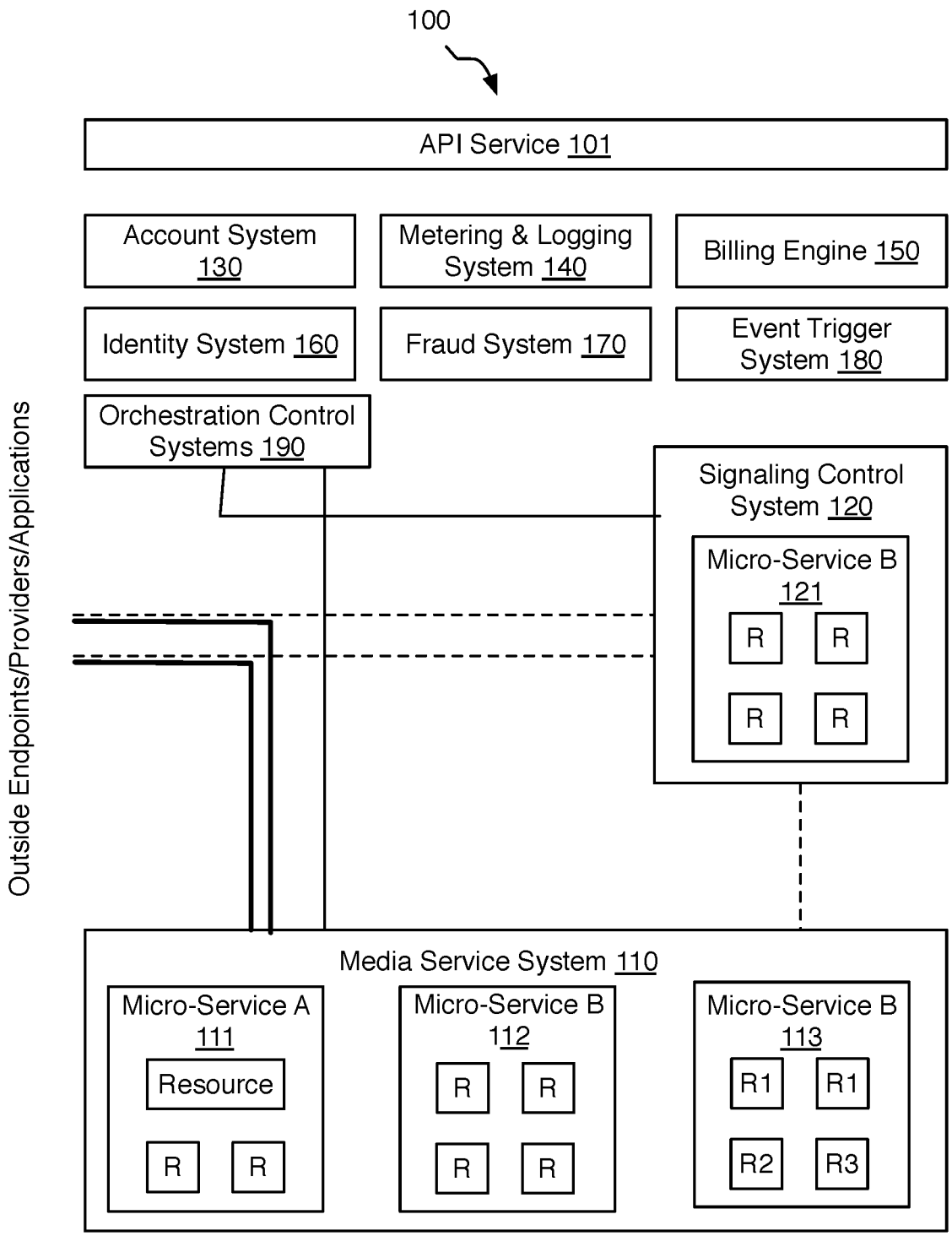
FIG. 1 is a schematic representation of a system of a preferred embodiment.

As shown in FIG. 1, a system and method for providing a micro-services communication platform of a preferred embodiment functions to provide a set of fundamental elements that can be composed to build modern multi-modal communication systems. There are various applications that depend on a similar set of basic communication resource primitives. While individual communication applications may have individually built a single tenant solution, doing so requires a tremendous amount of resources in building, deploying, scaling. Even when deployed such solutions are limited by the knowledge held within that single solution. A platform has not extracted and offered one or more communication primitives as multi-tenant solution. Further, many communication applications are developed in an environment that is dependent on the capability to scale with user demand. Thus, to build such an infrastructure independently would be prohibitive to accomplish without significant investment. However, there are additionally numerous communication applications that benefit from building communication interactions off of basic communication resource primitives and building higher abstractions on top of such resources.

The system and methods of preferred embodiments can preferably offer a heterogeneous mix of communication resources as accessible multitenant resources facilitating at least one communication micro-service primitive. Users (i.e., applications and services of account holders in the communication platform) can preferably select appropriate types of primitives in the platform that are needed to facilitate the media communication resource gap in their communication application. Users can compose various micro communication services to fulfill a role of a communication primitive but in a programmatic, flexible, and scalable manner. The micro-services can serve any suitable combination of signaling, media processing, informational analysis, hosting, and/or any suitable communication service. Through providing a micro communication service within a multitenant communication platform, other communication primitive as a service (CPaaS) features in areas such as security, metering, logging, billing, programmatic integration, quality control, fraud and policy enforcement, multi-modal capabilities, dynamic resource scaling, and other suitable aspects may be enables.

The micro-services communication platform (MSCP) can be used in facilitating communication in a service based network solutions. The MSCP may alternatively be applied to peer-to-peer communication network solutions. A variety of micro-services can be provided such as a: identity/presence service, a network discovery service (e.g., STUN/TURN service), a media transcoding service, a conferencing/mixing service, an interactive voice response services, a DTMF detection services, a media intelligence services (text to speech service, speech recognition, sentiment detection, answering machine detection service), and/or any suitable type of micro-service. As one example use, an outside developer can employ the use of the network discovery service of the MSCP when building out a video communication service. Instead of building out a STUN/TURN service, the application can seamlessly leverage the existing micro-service of network discovery to negotiate communicating with an endpoint behind a network address translator (NAT) or a firewall. As another exemplary use, an outside developer can employ the use of the transcoding micro-service, which enables media to be routed through transcoding media servers of the system and facilitate transcoding operations such as handling codec translation, bit-rate compensation, resizing, and/or other transcoding operations. In other use cases, multiple micro-services can be used in isolation or combination in building a communication application.

System Overview

As shown in FIG. 1, a system 100 of a preferred embodiment may include a media service system 110, a signaling control system 120, and a set of operational services (e.g., 130, 140, 150, 160, 170, 180 and 190 of FIG. 1). The system 100 functions to provide one or more media-related microservice to outside applications and services. The system 100 is preferably part of a multitenant communication platform in which various accounts or other suitable entities can establish and manage application/service integration with one or more micro-service. In addition to providing one or more micro-services, the system 100 functions to provide a set of platform specific aspects that enable providing such a set of micro-services. The system is preferably multitenant, wherein the multitenant system provides: mechanisms for metering, logging, and billing; a set of security and monitoring features built into operation of the platform; various programmatic hooks to better integrate an outside application with the micro-service offering of the system; distributed scalability and quality management; and/or other various aspects, which are described in more detail below.

The media service system 110 of a preferred embodiment functions to provide a scalable set of distributed media processing resources that facilitates one or more processes of a communication. The media service system is preferably a set of media servers that run on machines, virtual machines, containers, or other computing environments inside a distributed computing infrastructure. The media service system is preferably hosted in a remote computing environment. The media service system preferably includes a set of different types of media micro-services. The media micro-services can be instantiated as a service instance within a host, a server, a machine, a virtual machine, or any suitable component. A single host (or other suitable computing component) may provide only a single micro-service, but may additionally or alternatively provide a set of different micro-services. The media service system may be hosted within a single computing cluster, but more preferably is distributed across various clusters and/or operational regions. In one variation, media service sub-systems can be deployed in different geographical regions to provide improved regional performance.

The media micro-services 111-113 can provide a variety of media related services. Media micro-services can be synchronous or asynchronous. A synchronous media micro-service operates on a media stream in real-time. Operating on a media stream can include mixing streams, translating/transcoding streams, compositing streams, or otherwise allowing arbitrary low-latency computation on a media stream. A synchronous media micro-service can be used in altering a live media stream or providing substantially real-time information of that media stream. An asynchronous media micro-service operates on the media stream independent of the active media stream. An asynchronous media micro-service processes and/or transforms a stored representation of the media stream. Asynchronous media processing can enable computations that have a processing time that would impact latency of a real-time media stream. Asynchronous media processing could include processing such as sentiment detection, speaker identification, object detection, face detection, and/or other processing operations. A media micro-service can be a mutable or immutable service. A mutable media micro-service preferably alters, manipulates, and/or augments the communicated stream. The transcoding media can convert between media formats. As an example, a transcoding media server may convert between various codecs such as Speex used in mobile operating system applications (e.g., iOS and Android), Opus used in web and WebRTC applications, and PCMU used in PSTN and other media services. Any suitable codec or media transformation may alternatively be performed. A transcoding media service can additionally translate between media mediums such as converting a pure audio stream to a video stream or pulling the audio from a video into an audio stream. Immutable media servers preferably inspect, analyze, log, and/or process media streams. A recording media service and a speech detection service can serve as exemplary immutable media server.

The media micro-services system no can be a substantially homogeneous cluster of identical or similar instances of the same media server. For example, a system may provide only one media focused process (i.e., a single communication primitive) in which case all the media servers may be substantially similar. The media micro-service may alternatively be heterogeneous containing more than one type of service provided by the media servers. In one example, there may be a first type of transcoding server operating on a first software (such as the FreeSWITCH) stack inside of the operating system of a virtual machine, and then a second type of transcoding server built to run in the virtual machine. In this example, the first type of a media server may be a legacy media service, and the second type may be a new version of the media service. The use of the first and second type may be interchangeable. Alternatively, two of the media servers may not be interchangeable where each is designed for a particular purpose. For example, a subset of media servers may be for audio processing and a second subset of media servers for video processing operations.

The signaling control system 120 can function as a distinct service that manages signaling of a media stream. In one variation, the signaling control system might be embedded in a separate service that handles both media and signaling (e.g., mobile iOS/Android connection service). The signaling control system preferably handles the signaling messaging that directs media streams. The signaling control system can maintain state of the Session Description Protocol (SDP) mechanism of a communication session. A communication session preferably includes the media session and the directing of signaling messages. The signaling control system can preferably communicate SDP information to relevant resources such as an outside client initiating or receiving a communication, or to an internal resource such as a communication application service. During integration with a media micro-service, use of the signaling control system may be used to facilitate that integration process. The signaling components can similarly be a form of a composable micro-service. The signaling components may be used in combination with external media resources, but the signaling resources may alternatively be supplied and handled external to the MSCP when using a media service.

The signaling control system 120 is preferably a service on a computing device distinct from that of the media resources (e.g., the media proxy service 110 and the media server cluster 120). The signaling control system may be on a different host or optionally a different virtual machine. Operating independently, a communication session can be recovered during a failure of a media or signaling resource. In particular, if a host of a media resource, either a media proxy server or a media server, goes down, the associated signaling control system for that communication session can re-establish the media session with a different media resource. Additionally, as distinct elements, the signaling control system can perform asynchronous operations relating to a communication session. For example, a signaling control system may asynchronously call out to an authentication service, and later act on an authentication response from the authentication service.

The signaling control system 120 can additionally include a set of orchestration services and state managers that function to manage the orchestration, allocation, and state of related services. The configuration of orchestration services and/or states managers may be different depending on the type and function of the provided media services. The orchestration service preferably includes application logic to interface and direct one or more media service state managers. The communication signaling is preferably managed within the signaling control system (i.e., orchestration service). For example, incoming SIP communication is directed to a signaling controller. The orchestration service then communicates with a media service state manager that sets up media service infrastructure to support the communication. The media service state manager then transmits the information back to the orchestration service, which then negotiates the communication session as specified by the media service state manager. A media state manager can include application logic and state information to determine the state of a particular type of media communication session such as a conferencing media session, a transcoding media session, and the like. A media state manager may additionally include application logic to control the state of related media servers. There can be multiple types or media state managers, which apply different levels of media service modeling.

The system 100 can include an account system 130, which functions to map processing of the MSCP to an identity within the system. The system 100 is preferably a multi-tenant platform wherein multiple outside entities can create an account within the platform. An account preferably provides a set of credentials or an alternative authentication mechanism through which requests can be validated. The account system 130 can be a management system for different entity identities. The entity identities can be persistent identities such as accounts, sub-accounts, and other substantially permanent identity constructs. There may additionally or alternatively be ephemeral identities, which can expire according to time condition, usage condition, or any suitable condition. The account system preferably authenticates requests made by an account or other suitable entities. In one variation, an account identifier and an authentication token can be included in a request, and these authentication credentials are validated by the account system before the request is fulfilled. An account may be authenticated when making use of a REST API, when receiving signaling communication, during use of a user interface control panel or at any suitable instance.

Various aspects of an account and usage of the platform can be configured through account management interfaces. An account may be managed through an account portal user interface. An account may alternatively be managed through API requests or through any suitable mechanism. Aspects of an account that can be managed include configuring programmatic mechanisms and settings when using the MSCP. For example, an account manager could set various callback URIs that are triggered during errors or other events in the system. The account manager can further define various parameters that will determine how a communication is routed.

Figure 13:
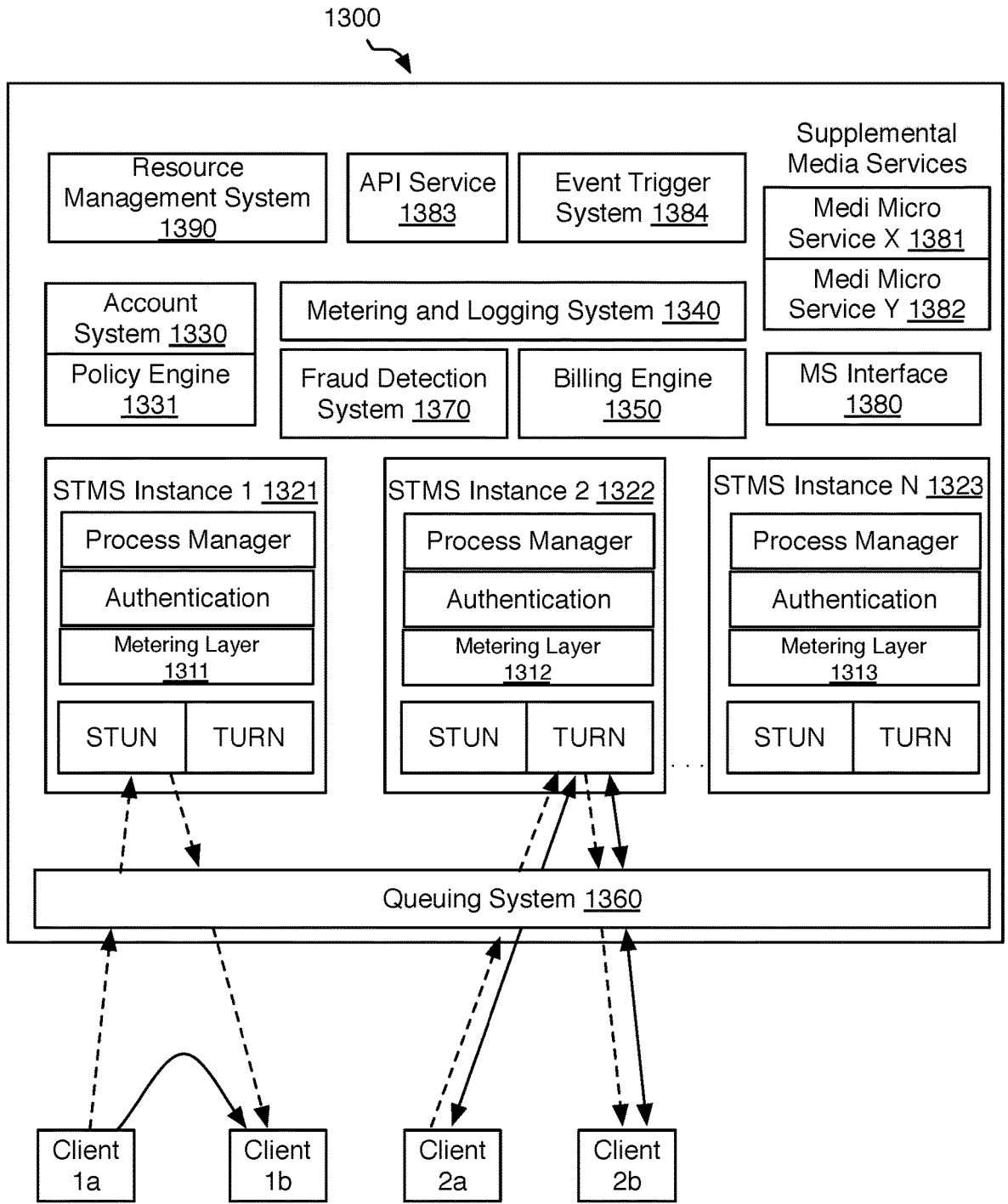
FIG. 13 is a schematic representation of a system of a preferred embodiment.

As a related aspect, the system can include a policy engine (e.g., a policy engine similar to the policy engine 1311 of FIG. 13). The policy engine may be a supplemental component or a sub-component of the account system 130. Policy can be set per account. Accordingly, different accounts can have different permissions, capabilities, pricing, capacity, performance, or other aspects, which can be set through an account policy. Policy may alternatively be set for a sub-account, for the entire platform, for a geographic region, or for any suitable context. Policy settings may be set by default by the platform but some or all of the policy settings may be driven by an account.

An account can include a defined policy configuration. A policy configuration may set particular limitations for account usage within the platform. The policy can prevent an application of an outside entity incurring usage that is beyond the scope in which the application is meant to be used. Micro-service capabilities, amount of data processing, time duration of usage, and other suitable capabilities can regulated through customized policy. Similarly, the policy configuration may limit usage to machines with a particular network address, types of devices, physical geographic location of a device, or other suitable properties.

The account system 130 can additionally include a sub-account mechanism, which functions to enable a user of the platform to partition account usage to enable multitenancy within a product of the account holder. The sub-account mechanism preferably accounts for usage, and more specifically creditable/billable usage to be monitored according to an identifier for a sub-set of usage by an account. For example, an account holder may build an outside application platform that depends on the system. The outside application platform can similarly be multitenant in that multiple users can have individually metered and accounted usage. The inheritable multitenancy property of the platform (i.e., the capability of one account within a multitenant collection of accounts to further subdivide usage the account between subclass of accounts). Can preferably provide the capabilities of a parent account to a subaccount including: billing; programmatic customization, allocation of identifiers or endpoints; and/or other customization. A billing engine can cooperatively facilitate delivering billing statements and collecting payments from the sub-accounts. Additionally, the sub-account mechanism can establish a hierarchy of policy inheritance. A platform preferably contains policies that are applied to account. In one variation, a usage policy is based on the type of account such as free account, basic account, or enterprise-account. A parent account can similarly at least partially define the policies of sub-accounts. In one variation, an account will create sub-account resources.

The media servers (of the media service system 110) can additionally include metering and logging layers (e.g., metering and logging layers similar to the metering layer 1313 FIG. 13) of that operate in coordination with the provided media services. The metering and logging function to create a record of notable activities. The metering can be used in providing programmatic hooks (e.g., callback URI triggering, application execution, and the like), billing/crediting an associated entity (e.g., charging for services or controlling resource access), creation of an audit trail, and/or other suitable functionality. In one variation, the media services include an instance layer that facilitates logging and tracking of accountable events. Metering preferably includes recording who (e.g., which account, sub-account, user, etc.) is associated with the use of one or more media micro-services and the quantity of usage. The quantity of usage may use different metrics depending on the type of micro-service. A micro-service may care about: the number of requests or instances of use (e.g., how many sessions fulfilled for an account); the total time of usage; the amount of data passed through the media micro-service; and/or any suitable metric. A billing engine may operate independently of the metering system, but may alternatively be integrated. A billing engine preferably calculates amount owed by a particular account/sub-account. The billing engine can additionally facilitate collecting and distributing of funds as appropriate.

The metering and logging system 140 of the preferred embodiment functions to create a monitoring system to the MSCP (e.g., monitoring for one or more of the signaling control system 120 and the media service system 110). In an implementation, the MSCDP includes the signaling control system 120 and the media service system 110. The metering and logging system 140 operates in coordination with the provided MSCP. In one variation, the metering and logging system is integrated within an MSCP instance (e.g., one or more of micro-service instances 121, 111, 112 and 113) running on a machine. In another variation, the metering and logging system 140 can externally monitor the actions of the MSCP, wherein the actions of the MSCP may be reported to the metering and logging system 140 in any suitable manner. The metering and logging function to create a record of notable activities. The metering can be used in providing programmatic hooks (e.g., callback URI triggering, application execution, and the like), billing/crediting an associated entity (e.g., charging for services or controlling resource access), creation of an audit trail, and/or other suitable functionality. In one variation, a MSCP instance (e.g., 121, 111, 112 and 113 of FIG. 1) running on a host includes an instance layer (e.g., an instance layer similar to the metering layer 1313 of FIG. 13) that facilitates logging and tracking of accountable events. Metering preferably includes recording who (e.g., which account, sub-account, user, etc.) is associated with the use of media micro-service and the quantity of usage.

In one variation, the metering layer (e.g., an instance layer similar to the metering layer 1313 of FIG. 13) of an MSCP instance (e.g., 121, 111, 112 and 113 of FIG. 1) will record individual events such as initialization requests, responses to a request, changes to a facilitated communication session, when a communication session ends, and/or any suitable event. The metering layer may additionally measure the amount of data transfer, the time of communication sessions, and/or any suitable usage metric while facilitating a particular communication session. The records are preferably metered and logged in connection to an associated account.

A billing engine (e.g., 150 of FIG. 1) may operate independently of the metering and logging system, but may alternatively be integrated. A billing engine preferably calculates amount owed by a particular account/sub-account. The billing engine can additionally facilitate collecting and distributing of funds as appropriate. Such accounting may be used in billing or crediting an entity/account for metered usage, which functions to allow a sustainable MSCP to be operated. In another variation, usage accountability can be used in limiting and balancing usage of a particular entity. As the platform is preferably multitenant, usage is preferably balanced across multiple entities. Rate limiting and action limits may be imposed at various times. Additionally, as use of a communication infrastructure is often accompanied with significant financial cost, fraudulent behavior by accounts or users of an account can be harmful to users of the platform and to the platform itself. Fraud detection can additionally be accounted for during usage of the platform.

The system 100 can additionally include a set of edge media and/or signaling gateways that interface with a set of providers include communication interfaces, which function to bridge media and/or signaling to outside communication channels. The outside communication channels can include PSTN, SIP services, OTT media communication services, and/or any suitable communication channel. Access to a particular channel can similarly be offered as a micro-service with similar set of platform mechanisms (e.g., multitenancy, metering and billing, programmatic mechanisms, security, quality/regional routing).

The system 100 may additionally include a resource management system (e.g., a resource management system similar to the resource management system 1390 of FIG. 13) which functions to scale and orchestrate the computing resources that support the MSCP platform. The set of MSCP instances are preferably scaled so as to support the usage requirements across a set of accounts. As a multi-tenant platform, the resources are preferably shared across accounts. In other words, a MSCP instance used for a first account at one time may be used by a second account at a different time. The variability of usage requirements for distinct account users is preferably normalized across a set of accounts within the platform, such that the platform is scaled to support the varying usage demands of various account holders. The resource management system can preferably instantiate more MSCP resources or other services, suspend resources, or terminate service instances. In one variation, a usage model is generated for at least a set of active accounts of the platform. For the users that use the platform, or alternatively that use the MSCP platform above a particular threshold, a model may be generated that predicts their usage over time. In one instance, an account may have a substantially steady state of usage. In another instance, the amount of usage may be a function of time of day, week, month, or year. In another instance, an account may have varying trends that are predicted in real-time based on past metrics and optionally metrics of similar accounts. As one baseline heuristic for usage prediction, the media type or application use case may be used to generate a usage model. For example, an account may select the type of MSCP usage during activation of the micro-service for the account—selecting an option such as network discovery service, transcoding, recording, media mixing, and the like. A predictive model may be generated using any suitable algorithm or heuristic.

The system 100 may additionally include a queuing system (e.g., a queuing system similar to the queueing system 1360 of FIG. 13) which functions to facilitate rate limiting and/or resource management. The queuing system can preferably queue requests of a defined scope. A queuing scope may include queuing across a platform, within a regional segment of the platform, across an account, across a sub-account, across requests of a telephony endpoint, or across any suitable scope. In the variation of queuing with a platform scope, requests from different accounts to use a micro-service may be initially queued until a resource is available. The requests may be queued according to different entity limits and policy. Requests of an account or sub-account may be associated with a dequeuing rate and limit. A dequeuing limit preferably defines a maximum frequency of a particular action with a particular micro-service. A dequeuing limit preferably defines a hard limit on the number of particular actions within a time window. For example, an account may be limited to no more than three session initiations for a given micro-service per minute and a limit of two hundred per day. Additionally or alternatively, the dequeuing of a request may be dependent at least in part on the resource usage and/or predicted impact of the request on the system. For example, with limited capacity, a request to use micro-service for an audio session may be dequeued prior to a request to use TURN for a video session, wherein the video session is predicted to use more resource usage.

The queuing system preferably enables requests to be delayed until a suitable condition. In one variation, a queuing system can operate cooperatively with the resource management system. In demand input mode, queuing system information can be an input to the resource management system in determining what and how many resources to allocate or deallocate. In a management mode, the resource management system can alter the queuing mechanism.

The system 100 will additionally include subsystems to support various programmatic mechanisms described herein such as APIs, event triggers, callbacks, and other suitable programmatic hooks that developers can use when building out applications or services.

The system 100 preferably includes an application programming interface (API) service 101 through which an authenticated account entity may interact with the system and/or obtain information from the system. The API may be used in setting configuration of one or more micro-services for an account. For example, an API request may be used to alter usage limits and thresholds. As mentioned above, the API can set configuration related to use of additionally micro-services, callbacks, and other interaction options of a session can be controlled. In one variation, the API may enable programmatic control of active communication sessions such that a communication session may be augmented through an asynchronous API request. In one variation, a video chat may be terminated, paused, redirected or modified through the API.

The API service 101 is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein, HTTP may be used, but should not be interpreted as being limited to the HTTP protocol. HTTP requests (or any suitable request communication) to the platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE.

The system 100 can additionally include sub-systems to support event triggers and/or event callbacks (e.g., the event trigger system 180 of FIG. 1). Event triggers can be account-customized conditions that result in an event response when the condition is satisfied. The event triggers can leverage internal information of the platform, but without exposing the used internal information to an outside account entity. When an event trigger condition is satisfied, a configured event is executed. The event could be an internal operation, a callback event, or any suitable action. An Internal operation can be a closed action that may not be fully exposed to an account holder such as ending all active communication sessions serviced by an MSCP instance. A callback event preferably includes making an application layer protocol communication to an external resource. A callback event may alternatively be configured by account for any suitable event such as when a session starts, when a session ends, when crossing a usage threshold, or any suitable condition.

Method Overview

Figure 2:
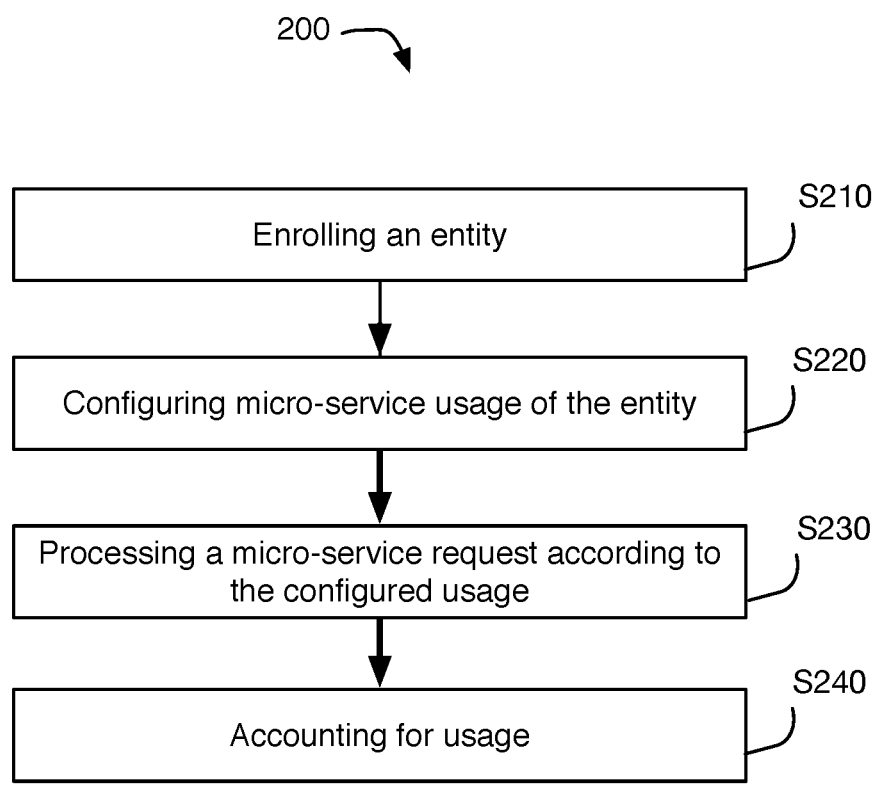
FIG. 2 is a block diagram representation of a method of a preferred embodiment.

As shown in FIG. 2, a method 200 for providing a micro-services communication platform can include enrolling an entity (S210), configuring micro-service usage of the entity (S210), processing a micro-service request according to the configured usage (S220); and accounting for usage (S230). The method 200 functions to correlate usage of a micro-service to a user. Registering an entity (e.g., the process S210) preferably includes registering a developer account (i.e., an account), but may alternatively be associated with registering a subaccount, an application, a communication endpoint, and/or any suitable entity. Configuring of a micro-service (e.g., the process S220) can include defining programmatic mechanisms that can: respond to use of a micro-service, define how communication is managed by a micro-service, and/or play any suitable role in acting on a communication. In one variation, registration of a managed endpoint may be used such that various providers direct communication to the MSCP as the registered manager of that endpoint. For example, a PSTN phone number may be registered with the MSCP, and various micro-services such as recording, routing, and other micro-service primitives can be configured. In another variation, an outside application or service will direct communications (e.g., media and/or signaling to particular resources of the MSCP). For example, a mobile application may configure an application to direct SIP traffic to a particular domain of the MSCP, which can then handle at least a portion of SIP negotiation of a communication.

Processing a micro-service request (e.g., the process S230) can include a variety of operations and may be dependent on the type (and variety) of micro-service used. Processing a micro-service request service functions to execute policy on usage of one or more micro-services in accordance with entity configuration (e.g., account or subaccount configuration). Multiple micro-services may be used during a communication. This may be directed through entity configuration. For example, various configuration mechanisms may be exposed to enable simple coupling of different micro-services. Alternatively, a single communication session can leverage multiple micro-services but can do so according to logic of the outside application. For example, a communication application may use an identity service, a STUN/TURN service, and a transcoding service, but from the perspective of the MSCP the use of multiple micro-services is treated as independent uses of the micro-services. The micro-services are preferably highly composable such that they can be used in a variety of combinations to accomplish a given task.

Figure 3A:
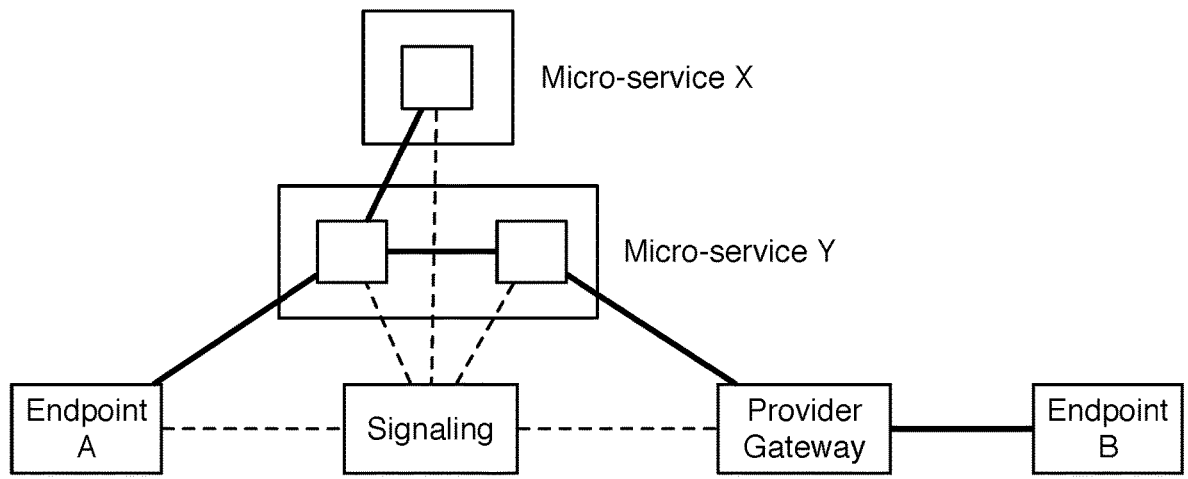
FIGS. 3A and 3B are exemplary scenarios of a variation of transitioning usage of micro-services.
Figure 3B:
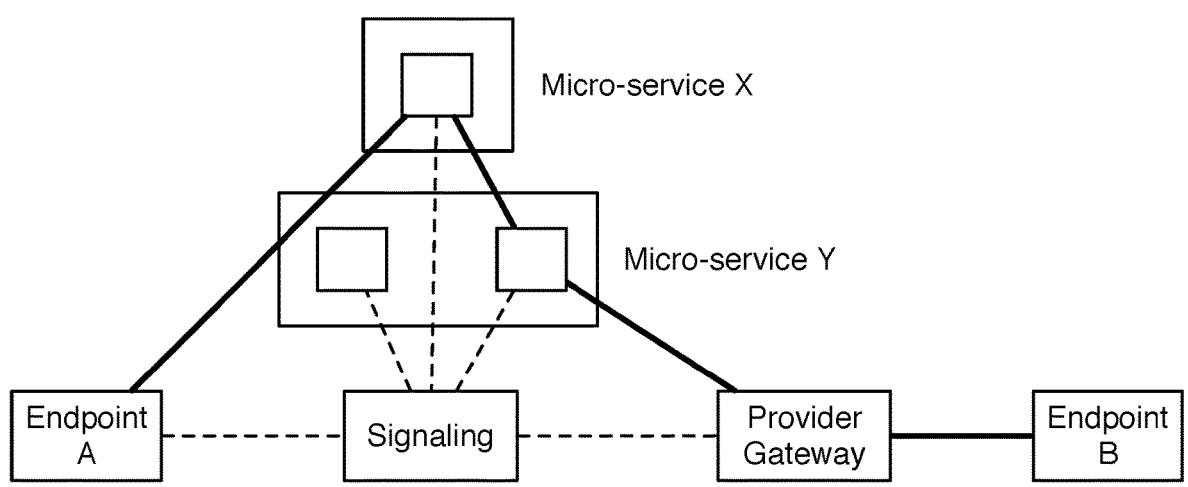

Additionally, use of the micro-services can be dynamic and can include transitioning use of a micro-service. Transitioning use of a micro-service functions to alter the type, configuration, communication orchestration and/or any suitable aspect of the micro-service resources used to facilitate a communication. A communication session can be established outside of the MSCP and then transition to using a micro-service. Additionally, a communication session utilizing a micro-service can transition to remove the micro-service resources from the communication session (e.g., due to ending that leg of the communication or just moving the communication off the MSCP). As shown in FIGS. 3A and 3B, a communication session may alternatively transition from a first configuration to a second configuration. Transitioning is preferably performed in response to a change in the requirements and context of a communication.

Use of a micro-service is preferably an accountable action (e.g., accounted for during the process S240). Such accounting may be used in billing or crediting an entity/account for such usage, which functions to allow a sustainable MSCP to be operated. In another variation, usage accountability can be used in limiting and balancing usage of a particular entity. As the MSCP is preferably multitenant, usage is preferably balanced across multiple entities. Rate limiting and action limits may be imposed at various times. Additionally, as use of a communication infrastructure is often accompanied with significant financial cost, fraudulent behavior by accounts or users of an account can be harmful to users of the MSCP and to the MSCP itself. Fraud detection can additionally be accounted for during usage of the MSCP.

The method and system of a preferred embodiment preferably includes a set of CPaaS features driven by the multitenant approach of the system and method. The method and system can includes a set of CPaaS features, which can include an account component, a metering and monitoring component, security component, programmatic mechanism component, and quality and geographical routing component. The method and system can be applied across a set of media micro-services as shown in FIG. 12. In one variation, the method and system is applied to a single media micro-service, wherein the platform offers a single communication primitive such as network discovery, media mixing, or identity. In another variation, the set of media micro-services includes two or more micro-services. In the variation where the set of media micro-services includes multiple micro-services, the media micro-services can be used in different combinations.

2. Communication Primitive Features

Account Component

As a first component of multitenant CPaaS features, the MSCP includes an account system (e.g., 130) where accounts can be created and managed. Various aspects of an account and usage of the MSCP can be configured through account management interfaces. An account may be managed through an account portal user interface. An account may alternatively be managed through API requests or through any suitable mechanism. Aspects of an account that can be managed include configuring programmatic mechanisms and settings when using the MSCP. For example, an account manager could set various callback URIs that are triggered during errors or other events in the system. The account manager can further define various parameters that will determine how a communication is routed.

Figure 11:
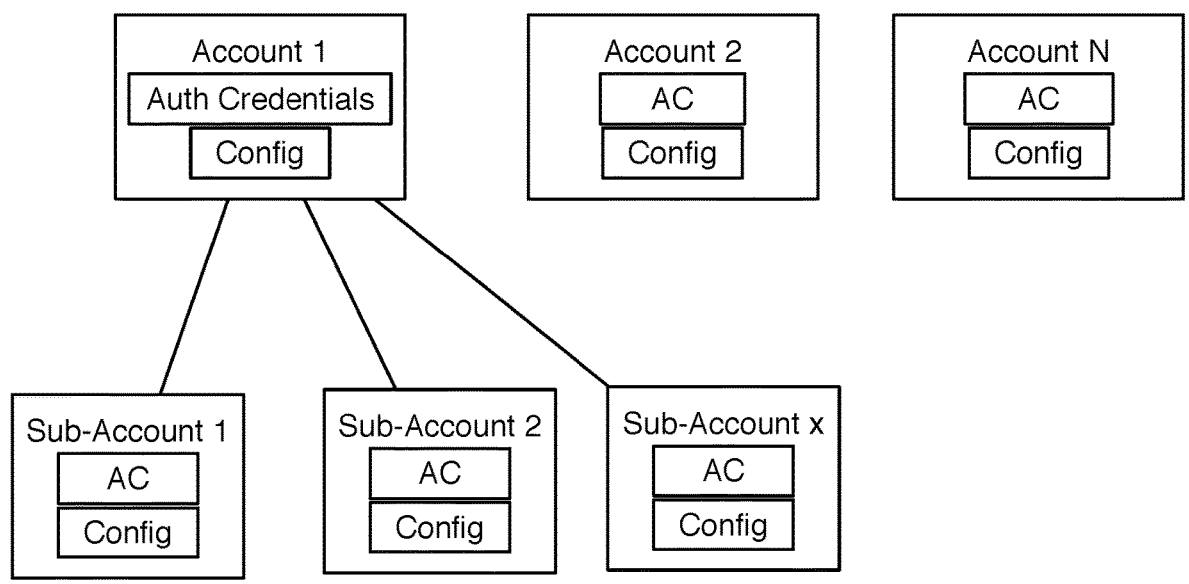
FIG. 11 is a schematic representation of setting configuration of accounts and sub-accounts.

Providing an account component includes enrolling an entity in the platform (e.g., process S210 of FIG. 2), which functions to configure an account or application for use of the platform. Herein, an account will be used in describing the entity, but an account may be a sub-account, an application, an endpoint, or any suitable entity. Enrolling an entity (e.g., the process S210) can include registering the entity and setting an entity configuration as shown in FIG. 11.

Registering an entity preferably includes registering a developer account (i.e., an account), but may alternatively be associated with registering a subaccount, an application, a communication endpoint, and/or any suitable entity. In a first variation, a new account is created and setup. In a second variation, a sub-account of an existing account is created and setup. Enrolling an entity in the platform can additionally include editing or updating an existing entity. Registering an entity can include assigning authentication credentials for the entity. In one variation, the authentication credentials include an entity secure identifier token and an authentication token. The authentication credentials are preferably used by an entity when transmitting a request, and the credentials provide a mechanism for mapping the request to an entity. Entity configuration can be used in subsequent processing of the request. The authentication credentials can additionally be used in interacting with the platform over the API. An entity may be registered through interactions over a graphical user interface, such as on a website or inside of a client application. An entity can alternatively be registered using an API.

Setting entity configuration functions to configure the customized rules around usage of a given session instance of an entity.

Setting entity configuration can includes setting permissions, capabilities, pricing, capacity, performance, or other aspects. The configuration may be expressed as platform policy, rules, parameters, or settings. Configuration settings may be driven from the MSCP but some or all of the policy settings may be driven by an account. The entity configurations are preferably applied to each instances of use. For example, the configuration is preferably applied for each communication session of an account. A communication session is preferably an open media communication channel wherein substantially real-time communication occurs, such as a voice call, video call, screen sharing, data-transfers, and the like. As different entities will have varying requirements, each entity can set at least one set of options. In one variation, multiple instance types may be configured which may be selectively used by an entity. For example, an entity may have a first set of configuration for free users of the entity's application and a second set of configuration for paid users of the entity's application. Entity configuration can be for one or more micro-services. In some instances, the configuration defines combined use of micro-services (where two or more micro-services are used in combination). In other instances, the configuration can define independent settings of micro-services (one account may use a first micro-service independent from a second micro-service).

Configuring a network discovery instance may include setting default configuration. In one variation, an account is automatically allowed access micro-service. That micro-service may be configured automatically by the platform. Different entities may receive different default configurations. In another variation, an account may need to explicitly enable the capability of a one or more micro-services such as by enrolling in the service offering through an administrator control panel.

Configuring a micro-services of an entity (e.g., the process S220 of FIG. 2) can include defining a programmatic mechanism that can include setting event callbacks, setting event triggers based on platform metrics, secondary micro-media service configuration, set usage limits, and/or setting any suitable additional functionality of the network discovery service.

In some variations, a micro-service can use endpoint addressing. Enrolling of an entity can additionally include allocating an endpoint to the endpoint. An endpoint is preferably an identifier within a namespace. Endpoints can provide mapping information between a communication destination or origin and a physical device. An endpoint preferably has a defined syntax. In one variation, the syntax can be a SIP address, but may alternatively be a username or any suitable identifier. Accounts, sub-accounts, and/or any suitable entity may be allocated endpoints. The endpoint may be global such that cross account and/or platform communication may be established. Alternatively, endpoints may be a scoped to an account or sub-account. Entities can register, acquire, or otherwise obtain a n endpoint. Endpoints may alternatively be transferred, removed, or otherwise disassociated from an account.

Subaccounts

One particular aspect of the MSCP is that the properties of multitenancy can be offered as recursive or nested multitenancy features. An account is able to offer similar forms of multitenancy to its respective customers or users, which functions to allow accounts on the MSCP to build their own multitenant platform on top of the MSCP. Mores specifically, an account entity can have subaccounts. Subaccounts are hierarchically ordered account relationships that are under another account entity. There can be any suitable number of subaccount layers.

Security, fraud, policy, usage restrictions, billing/pricing, and other account-scoped controls can additionally be scoped to particular subaccounts. In some cases, those scoped controls are set and managed by the MSCP. For example, automatic fraud detection can be detected on the scope of subaccounts (and in the scope of parent accounts). So if, for example, a subaccount within a parent account is performing actions that look like illicit usage of the MSCP, then that subaccount can be blocked, turned off, or limited. The parent account and other subaccounts can continue operating as normal. Such subaccount limiting within the multitenant MSCP. If fraud is detected scoped to the parent account, that parent account and all subaccounts may be acted upon to prevent illicit behavior. For some aspects, the scoped controls can be, at least partially, set or managed by a parent account. Examples of account set scoped controls may include: special billing for a subaccount; limited feature access; usage limits; and other suitable scoped controls.

Queuing

Figure 4:
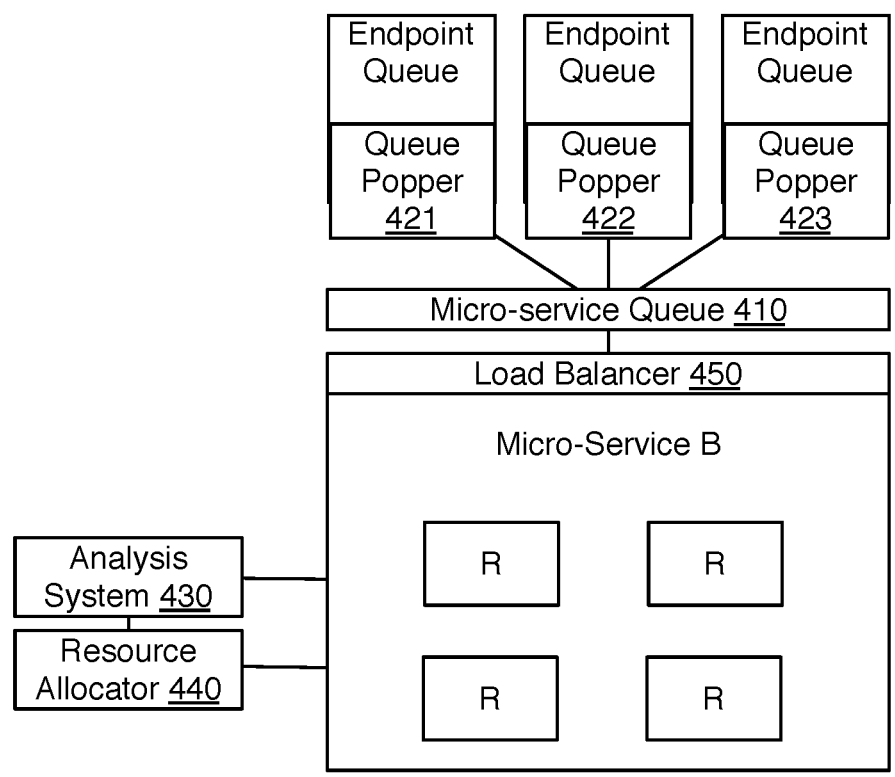
FIG. 4 is a schematic representation of a variation of a queuing system.

As shown in FIG. 4, multitenancy in the MSCP can include the usage of micro-service queues (e.g., the micro-service queue 410), which functions to throttle, balance, and manage resource usage within the MSCP. In some implementations, the MSCP is provided by the system 100 of FIG. 1. A micro-service queue is a queue that acts as a gateway to the usage of a corresponding micro-service. The micro-service queue is preferably a list of resource requests that have not been serviced or have not been assigned necessary resources. Herein request is used to describe the queued element—a queued request may be reasonably be any suitable reference to an action or entity or communication. For example, a request to process a particular media stream may be queued. The requests are preferably serviced at a rate suitable for the current capacity of the micro-services in the MSCP. Queuing is used to share the resources across a distinct set of accounts in the multitenant environment of the MSCP. Queuing can additionally be used in managing the requests of a single account so as to not saturate the micro-services of the MSCP.

The micro-service queues can be used in several different modes. In one variation, a micro-service queue can be used in establishing a media session. For example, asynchronous communication requests (e.g., API requests, directives initiated from application logic, etc.) may be queued and dequeued when one or more micro-services are available for use. The queuing may be to limit or gate access to limited resources. Resources can be automatically and dynamically scaled or redistributed to satisfy resource demand. A micro-service queue can facilitate controlled servicing of requests by micro-services. Additionally or alternatively, the microservice queues may be used in account limiting. Account limiting may be used to throttle resource usage. As an alternative to account limiting, the queues may be for a particular endpoint. For example, outgoing communication requests can be queued according to origin SIP address wherein each SIP address is dequeued at an individually determined rate. A throttle is preferably a defined limit or condition on the inter-request limit. Throttling preferably changes the resource usage rate. For example, an account throttle limit can prevent an account from making more than one outbound call per minute. The account throttles may be globally set but may alternatively be individually set for a subset of accounts (e.g., per account limits). Similarly, a cap limit may be a restriction on gross count of requests in a block of time, which may be considered a special case of a throttle limit where the time scale is large. For example, an account cap limit can limit the total number of requests served for a particular account in a day. The cap limit may be used in combination with the throttle limit—the rate and total number of requests could be limited.

The MSCP can include a variety of queue configurations. The MSCP can include per account (or subaccount) queues, where requests of a particular account are queued. There can be group queues that are used for multiple queues. The group queues can be used as control queues. In one variation, account queues will act as a first threshold of queuing and then a group control queue can act as a second stage where requests are organized in the queue according to cross-account resource sharing. The queuing order within a group queue may be dependent on the account or different conditions. For example, a premium account may be prioritized in queue ordering over a standard account. Similarly, the dequeuing rate of an account rate may function to similarly apply queue prioritization. Queues may be for a pool of resource or for individual resource queues. Resource queues can queue multiple requests of multiple accounts for a particular resource.

A queue popper (i.e., a dequeuer) (e.g., 421, 422, 423 of FIG. 4) is preferably a software or hardware mechanism that functions to select queued requests to service. The queue popper preferably selects requests at a preferred rate, but the queue popper may alternatively select requests according to capacity or available resources, or a combination thereof. There may additionally be a plurality of queue poppers that function to simultaneously select requests from a queue. The number of call poppers may be variable. The micro-service queue(s), the queue popper(s), or any suitable combination are preferably used to control the throttling (or servicing rate) of the call requests. The throttling may be performed on a per-phone number, per-endpoint, per-account, per-resource group, per resource, and/or according to any request attribute.

The multitenant portion of the MSCP can include an analysis system 430, which functions to analyze the system to predict micro-service resource requirements. The analysis system preferably monitors a plurality of aspects of the system. The analysis system may monitor the current capacity such as network or hardware operation levels or trends (increasing or decreasing); usage history such as logged data to find correlations in capacity (e.g., detecting patterns); queue length and queue entry latency; analysis of applications such as historical patterns from past usage of an application; and/or any suitable aspects. Patterns in capacity needs are preferably found related to the time of day, day of the week, yearly patterns, usage patterns (such as if an increase in capacity needs by one user indicates increase in capacity needs by other users), call location, call duration of calls, and/or any suitable indicator. The analysis system can preferably makes distinctions across different types and varieties of micro-services. The analysis system preferably generates data for the resource allocator, a load balancer, and/or additionally the micro-service queue. The predictions or data from the analysis system may additionally be used for provisioning capacity of the micro-service resources. The analysis system preferably compares expected and actual load, and provides data that is used to compensate for the variability in utilization of resources of the system.

The multitenant portion of the MSCP can include a resource allocator 440, which functions to scale and manage the operation of the distributed computing resources of the MSCP. The resource allocator additionally preferably reprovisions micro-service resources, allocates new micro-service resources, deallocates micro-service resources, and/or any other suitable allocation process. The resource allocator may additionally control the provisioning of micro-service queues and other devices of the system. The resource allocator preferably uses data of the analysis system in determining the provisioning and operation of resources. The resource allocator preferably uses information from the analysis system to predict required micro-service resource capacity. The resource allocator preferably uses the predicted capacity requirements to determine how many hardware (physical or virtualized) or software resources need to be operating, and the resource allocator preferably allocates, deallocates, or reprovisions micro-service resources (e.g., transcoders, STUN/TURN servers, media information processors, media mixing, communication application controllers, and/or other hardware or software resources) as necessary. The resource allocator may additionally use startup time, operation cost, or other parameters of hardware and software resources when determining the number and ratio of resources to have allocated at a particular time. The resource allocator also preferably keeps track of the quantity of resources currently available, and makes resource availability information available to other system components, including dequeuers, load balancers etc. Such resource availability information is preferably used by other system components to adjust operation of the system components. The resource allocator preferably monitors the resources and reprovisions resources in real time.

The multitenant portion of the MSCP can include a set of load balancers (e.g., the load balancer 450 of FIG. 4) that functions to distribute processing tasks amongst the micro-service resources and other resources. The load balancer of the preferred embodiment preferably optimizes the distribution of processing tasks such that the plurality of micro-services is operated at or near an optimal level. The load balancer preferably directs tasks (e.g., servicing of communication sessions or resource requests) to appropriate micro-service resources as the tasks are created. A task is preferably an operation in the MSCP, but may alternatively be a call request or call session.

Figure 5:
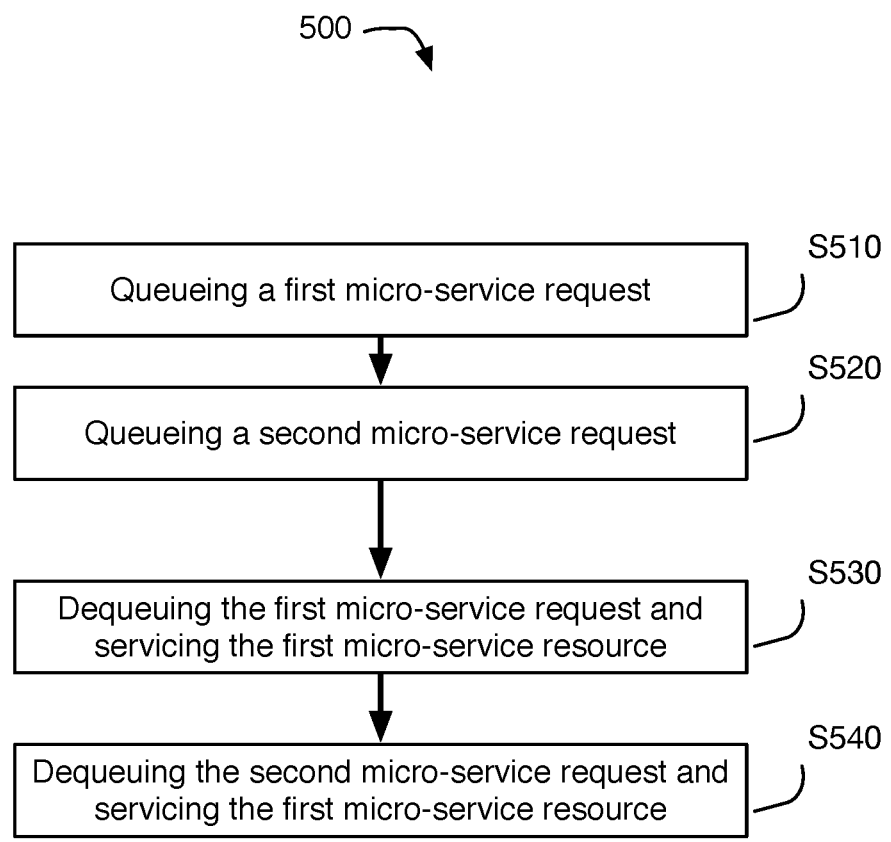
FIG. 5 is block diagram representation of a method of a queuing variation.

As shown in FIG. 5, a method 500 for multitenancy in the MSCP can include queuing a first micro-service request (process S510), queuing a second micro-service request (process S520), dequeuing the first micro-service request and servicing at a first micro-service resource (process S530) and dequeuing the second micro-service request and servicing the dequeued second micro-service request at the first micro-service resource (process S540). The method 500 preferably employs the use of queues to facilitate shared use of micro-service resources. For example, a STUN/TURN server can be shared across multiple distinct entities through the multitenant queuing policy of the method. As described above, a variety of queuing architectures may be used to control access to the resources of the MSCP. The queuing process is preferably used for asynchronous operations of the MSCP. For example, asynchronous micro-services (transcription services, media information processing, and other tasks) may be queued and dequeued within a suitable amount of time. Synchronous services such as micro-service resources that facilitate real-time communication may employ queues for the initial request to access a micro-service. Synchronous services can similarly use a queuing process with a short queued-status window (i.e., requests will be queued for a short amount of time). For example, a queue configured to queue a request for no longer than 500 ms may be used for micro-service resources where 500 ms delays do not break use of the micro-service.

In a basic operation mode, the first micro-service request and the second micro-service request are dequeued at a dequeuing rate associated with the micro-service. For example, the dequeuing rate may be dependent on the capacity and availability of a micro-service. In another operation mode, the first micro-service request is dequeued at a first rate and the second micro-service request is dequeued at a second rate. The first and second rate may be individually assigned rates that may or may not be the same. For example, the first request may be initiated for a first account and the second request for a second account. The first account may have a dequeuing rate set at the first rate, and the second account may have a dequeuing rate of the second rate. The dequeuing rate may additionally be associated with origin endpoint, destination endpoint, or combination of involved endpoints.

Metering of Usage

As another component of multitenant CPaaS includes metering of usage (e.g., the process S340 of FIG. 2). The metering of usage functions to provide a mechanism through which accounting for account usage may be maintained. Additionally, as the inner workings of the MSCP will at least partially be private from outside inspection, metering can provide various mechanisms to add programmatic hooks and/or platform provided management. Metering of usage preferably adds a layer of metering to a micro-service such that corresponding account entities can be held accountable for corresponding usage.

Preferably, a micro-service resource will have an added metering layer that collects and distributes usage information. A metering layer can log events and create a record of when and how the set of micro-services service are used and which account was associated with the usage. Events can be logged in relationship to client requests what features/micro-services were used and the amount of in-session usage. In one variation, only one attribute may be metered for a particular micro-service. In other variations, multiple attributes may be metered for a particular micro-service. For example, transcoding micro-service may meter the time of the transcoding process, the duration or quantity of transcoding process, and the account associated with the request. The metric may be the number of events (e.g., number of network discovery attempts), time of media streaming, data transfer of media streaming, and/or any suitable metric. Metering and accounting may depend on the modality of the communication stream. In an environment where the MSCP includes different types of micro-services, a reporting component may be configured for a set of micro-service types. In an environment where the MSCP includes multiple varieties of one type of micro-service, a metering layer may be configured for each variety of the micro-service.

Metered usage may be accounted for progressively as new usage occurs. Alternatively, accounting may occur at periodic increments. In one variation, usage of each account is aggregated and accounted for when preparing a monthly statement. Accounting can additionally include notifying an entity and collecting payment or credit. Such billing procedures can be automated by the platform. Additionally, the metering and billing can account for state changes of a communication stream. For example, if a communication stream were to transition between audio and video, the respective different modalities of the communication stream can be metered and accounted for differently.

In one variation, metering and accounting can additionally be sub-divided over subsets of usage. Preferably, the usage and accounting are sub-divided by sub-accounts of a parent account. In this manner, an account can provide a service wherein at least part of the cost of operating the service is delegated to an end-user. Sub-accounts can be one mechanism used in managing sub-dividing usage and metering. Sub-dividing metering can additionally enable fraud detection, event triggering, and other functionality to be based on sub-divided usage.

Figure 6:
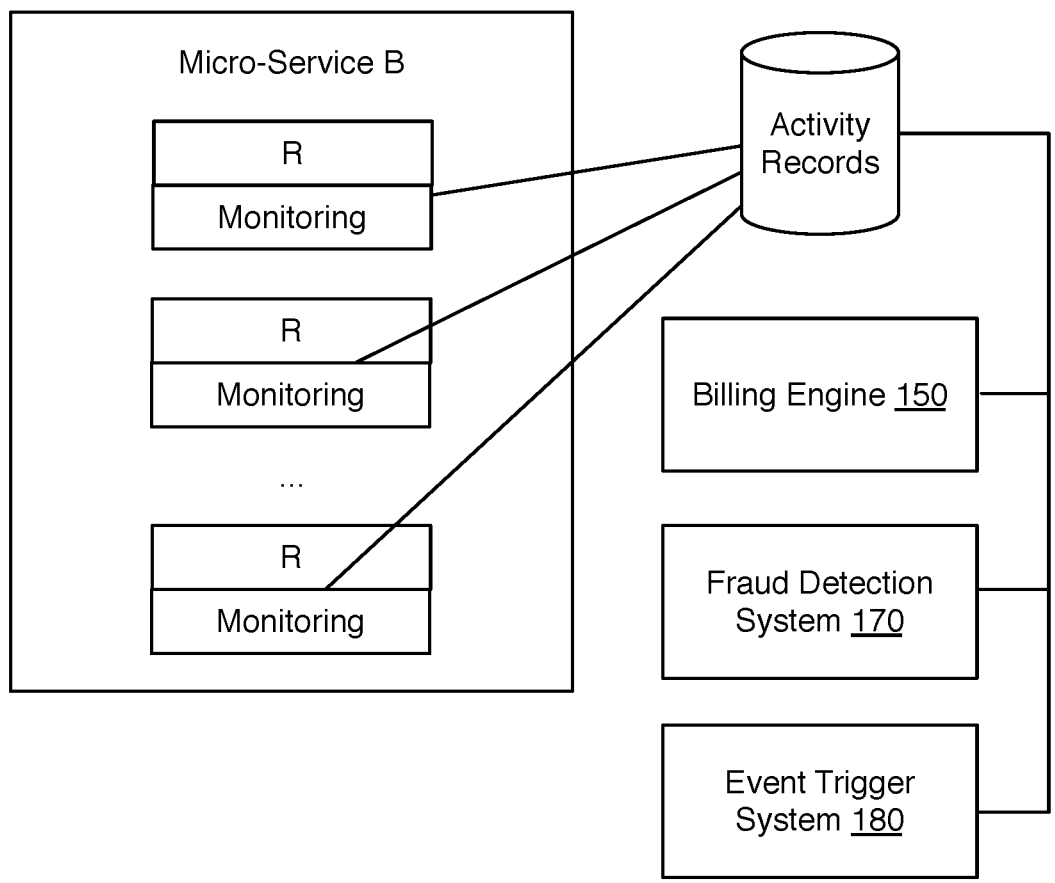
FIG. 6 is a schematic representation of a variation of metering usage.

As shown in FIG. 6, the MSCP system (e.g., the system 100) can include a variety of other components that operate on or otherwise use the data generated by the reporting components. In one variation, a billing engine (e.g., 150) uses the metered usage in generating billing reports. In another variation, an event trigger system (e.g., 180) can provide a programmatic mechanism to integrate with the inner workings of the MSCP. In yet another variation, a fraud detection service (e.g., 170) can use metered usage as a signal used in fraud detection.

Billing Engine

A billing engine (e.g., 150 of FIG. 1) can function to manage and track micro-service and platform usage to appropriately charge a responsible entity. The billing engine 150 preferably accounts for the metered usage of all the micro-services and/or other aspects of the MSCP. In a first variation, the billing engine 150 will account for all usage for a particular account and submit a bill (or actively bill) to the account. The billed usage can similarly be accounted for subaccounts. In a second variation, the billing engine 150 can account for usage according to a billing profile. Different accounts may have different billing profiles. The metered usage is processed according to a specific billing profile. In the case where the billing profile defines pricing of usage for a single account, a single bill may be generated for the amount owed to the MSCP. In the case where the billing profile defines pricing of usage for a subaccount within a parent account, the billing engine 150 may handle collection from subaccounts or end-users, distribution of funds (or crediting of funds) to the parent account, and distribution of funds to the MSCP. For example, the MSCP may provide a base billing profile of $0.01/minute of micro-service usage. The billing profile set by an account for a subaccount may be $0.02/minute of micro-service usage. If a subaccount had 1000 minutes of usage, then $20 is collected from the sub-account, $10 of the $20 is credited to the parent account, and $10 of the $20 is collected by the MSCP for the platform usage. The billing profile may similarly be used to subsidize usage. In another example, the billing profile may be set by an account for a subaccount to $0.005/minute of micro-service usage. If a subaccount had 1000 minutes of usage, then $5 is collected from the sub-account (leaving $5 to be subsidized by the account to make up for the $0.01/minute rate of the MSCP), $5 is collected from the parent account (to account for usage by this one subaccount). The MSCP in the end collects $10 in response to usage by the subaccount.

The billing engine 150 can track all micro-service operations (or at least a set of accountable micro-service operations) according to set billing policies agreed to by a customer in a usage model. This may include tracking time of use, number of uses, or according to any suitable subscription model. The billing engine 150 preferably consolidates all module fees for both the customers and the developers. It is envisioned that a customer may have multiple service agreements and contracts for various micro-services. The bills for the various modules are preferably consolidated into a single, periodic bill created and sent out by the billing engine. Similarly, it is envisioned that a developer may have a plurality of customers with varying agreements. The payments from the various customers are preferably consolidated into a single, periodic payment. Account information and billing information is preferably stored in any suitable database.

Operation of the MSCP can include metering use of a micro-service, functions to account for the different micro-service (e.g., the process S240 of FIG. 2). Metering use of a micro-service may include measuring time, the count of number of events, measuring duration of usage, measuring the quantity of usage (e.g., bandwidth, data processed), or any suitable metric. Metering is preferably performed such that it can be associated to usage scopes. For example, usage by an account can be associated with the account, the account endpoint used, the subaccount of the account, or any suitable entity. In addition to metering use of the micro-service, operation of the MSCP can use accounting for usage which can be used in calculating related measures of usage for billing, usage limits, usage triggers or any suitable action.

Metering can additionally be distributed across multiple types of micro-services. In one variation, use of a micro-service can be a binary attribute for a communication session. For example, a call that is 10 minutes long may use a recording micro-service for 5 minutes and a conferencing micro-service for 8 minutes. If both of these micro-services are accounted for in a binary fashion then this call may be billed as a 10 minute call that used recording and conferencing. Metering can alternatively be accounted for in a segmented fashion. In the example above, the call will be accounted for as a 10 minute call that had 5 minutes of recording and 8 minutes of conferencing.

The first and second module usage of the telephony application for a user account is preferably individually metered. The independent metering can preferably be achieved because use of the telephony platform during application control by each module is preferably isolated and accountable. The telephony platform (e.g., a call router) can preferably track what module URI's are being used for application control, and more preferably the dispatching engine or the policy engine preferably tracks application control. In addition to metering application control, actions outside of application control (asynchronous usage) may be monitored. For example, API calls made by a module or other use of the telephony platform that do not relate to an instance of application control may be included in the metered activity. Metering preferably includes maintaining usage statistics. The metrics used for metering preferably may include per "period use" (e.g., unlimited usage for one month), amount of usage in a fixed period (e.g., 100 minutes of call time per month or 500 text messages in a month), or a usage limit (e.g., 500 text messages), or any suitable usage model. Alternatively, the metering may include noting that a module is in use during a particular period. This may be used for a usage model with unlimited use in a time period. Preferably the comparison of time period of unlimited use and the current time is used in verifying permission for the account to use a module. For example, if a usage model is set so that the module may see unlimited use during month period, the metering preferably notes that the month is being used in a particular month, and a policy engine preferably verifies permission for an account to be used that month (e.g., check if the current date is included in the month of unlimited use). This particular alternative may be further used during the configuration of telephony application. A particular module may not be prevented from being configured within a telephony application until the current time period is paid for. The metric used to measure usage of the first module and the second module can preferably differ, such that the usage model of each module may be individually assigned.

Usage Triggers

The metering of the MSCP can operate according to a usage trigger system 180 (of FIG. 1) that includes a summarizer, a usage trigger management system, a trigger monitoring system, and a trigger action processor. The system functions to create a simple interface for outside applications to deploy usage based events within the MSCP. An interface to the system preferably enables a user/developer to generate a new usage trigger for an application or service platform that leverages the micro-services. During operation of the application platform, the system can update and monitor the status of various event counters. The event counters are preferably built according to the metering, logging, and reporting of the MSCP. Event counters are preferably form-abstracted views of internal metrics. When a particular counter satisfies a usage trigger, actions corresponding to the usage trigger can be performed. The system can preferably achieve improved efficiency and provide a wider range of trigger options, compared to an event polling system from an outside developer, when the usage triggers are integrated into the operation of the application platform. Furthermore, the system can accommodate the application server of an account holder being separate from the application platform by at least one security layer. The system can be used for general usage and event tracking of internal processing of the application platform, but the system can similarly be used for asynchronous error and warning handling.

The summarizer can function as a service to process individual event logs and metered usage into counters on which a trigger may be dependent. As different use cases may depend on different counters, the counters may be selectively engaged based on configuration. In some implementations, not all possible metered usage or event is counted, only those with a configured trigger. A usage trigger management system functions to store event triggers and configuration. Applications or users can configure the event triggers in any suitable manner. An event trigger configuration characterizes how to monitor usage and the actions to perform. A trigger monitoring system functions to monitor the counters in the context of the set usage triggers. When a condition of an event trigger is satisfied by a counter, the trigger action processor can be prompted to carry out a corresponding response. A trigger action processor of a preferred embodiment functions to initialize or perform the response of an activated usage trigger. In one variation, an action can be to make an application layer communication (HTML, SPDY, etc.) call to a callback URI hosted external to the MSCP. In another variation, the action can be internal action of the MSCP. For example, a trigger may suspend further activity of an account such that the usage trigger can be used to prevent suspicious behavior. In one variation, the usage trigger system and method can be substantially similar to the systems and methods described in U.S. application Ser. No. 14/054,464, filed 15 Oct. 2013, and U.S. application Ser. No. 14/489,387, filed 17 Sep. 2014, which are both hereby incorporated in their entirety by this reference.

Security

Another attribute of the micro-service offering of the MSCP can include security, which can include account authentication, micro-service resource access allocation, and activity monitoring.

The account authentication preferably provides a mechanism for which activity on the account can be verified and authenticated. In one variation, the authentication can be based on established account. As mentioned above, accounts, subaccounts, applications associated with account entities, endpoints associated with account entities, and other usage scopes within the MSCP can have policy applied to it by the MSCP or by a responsible entity (e.g., an account can set policy for a subaccount, application, or endpoint). In addition to registered entities having authentication capabilities, ephemeral identities can have authentication credentials. Ephemeral identities can enable users, applications, and services, which organically make use of a micro-service, to be assigned policy within the MSCP. Ephemeral identities preferably have authentication credentials generated on demand, and which will expire after a certain condition(s). The expiration condition can include a time to live time window, a particular event, or some threshold of usage.

The micro-service resource access allocation functions to dedicate at least a subset of resource access to at least a sub-set of entities. The resource access allocation can be a set of media proxy servers with defined access IP addresses and ports. Accounts can whitelist such resources so that they can interface with resources of an outside application. Similarly, an account can set a block of whitelisted resources that can connect to the MSCP on behalf of that account such that the MSCP will allow account usage for resources connected according to the whitelisted specifications.

The activity monitoring system (e.g., the fraud system 170) of the MSCP can function to apply various fraud-based heuristics across the accounts, subaccounts, endpoints, or applications. The activity monitoring can use the metered usage described above in monitoring and measuring various fraud scores based on heuristics. In one variation, fraud-based activity monitoring can include enrolling a plurality of accounts in a telecommunications platform block (as described above), at a fraud scoring system, receiving usage data of a telephony platform component (e.g., as a supplementary process to metering and monitoring), calculating a fraud score from the usage data block, detecting when fraud scores of an account satisfy a fraud threshold block, and taking action when a fraud score satisfies a fraud threshold block. The method functions to enable heuristic based identification and prevention of telephony fraud. In response to the fraud scores, the activity monitoring system can alter operation of the account within the communication platform. Such a system is preferably capable of mitigating fraudulent behavior made on top of the self sign-up communication platform. Furthermore, in the case where ephemeral identities are allowed to generate usage, fraud monitoring and prevention can oversee activity across a wide variety of accounts and scenarios. In one scenario, the system can be applied to preventing illicit use within a single account. The system can additionally be extended to detect illicit use through cooperative use of multiple accounts. Another aspect is that the multitenant account system may include functionality for an account to create sub-accounts. Sub-accounts can be used so that a developer can develop a service on top of the communication platform and provide that service to end customers. The system can enable fraudulent behavior within the subaccount of an account to also be monitored for fraudulent behavior.

The method preferably uses a heuristic based approach using rules defined in a rule set of the fraud scoring system (e.g., 170). Rules used in the method can preferably be crafted and maintained by fraud analysts, which functions to enable analysts to use their unique insight into fraud scenarios to automatically detect future scenarios using the fraud scoring system. The method additionally can automate the detection and actions taken by fraud analysts for a system. The method may additionally include Bayesian learning, neural networks, reinforcement learning, cluster analysis or any suitable machine learning or algorithmic approaches to facilitate identifying illicit use cases. Preferably a combination of automatic fraud rule generation and fraud analyst input is used in during the method of the fraud scoring system. The method is preferably capable of identifying a wide variety of illicit use cases as defined in the rule set. When illicit use of the telephony platform is matches a rule, the fraud scoring system preferably acts to prevent that instance of illicit use from continuing. In one variation, the fraud-based monitoring system can be substantially similar to the fraud detection system and method of U.S. patent application Ser. No. 14/253,316, filed 15 Apr. 2014, which is hereby incorporated in its entirety by this reference.

Programmatic Mechanisms

Another attribute of the micro-service offering of the MSCP can include a variety of programmatic mechanisms such as providing of an API (e.g., 101 of FIG. 1), mapping of micro-service usage to a programmatic mechanism, responsive execution of callback URI events, and executing retrievable application logic.

MSCP API

A MSCP API (e.g., 101 of FIG. 1) can be provided that provides a range of controlling actions of the MSCP and inspecting data of the MSCP. Preferably actions that can be performed through an account dashboard can similarly be accomplished through an API. Outside applications or services can preferably interact with the MSCP through the MSCP API by issuing requests from an outside application service. A MSCP API service (e.g., 101 of FIG. 1) receives and parses such requests and then translates the requests into a response. The response can include retrieval of information and a reply with the information. The response can include execution of some action by the MSCP and then the result of the request returned in reply to the application server. The MSCP preferably uses an architectural approach that architects the resources, and primitives of the MSCP as a set of API resources. For example, an account's API resource can be used in inspecting all accounts or creating a new account. In addition to dealing with prior configuration of the MSCP, the MSCP API can allow real-time active inspection and interaction during use of the MSCP. For example, an active communication session may be inspected and manipulated during the communication session through the API.

The MASCP API (e.g., 101) can be a REST API. The API is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein HTTP may be used, but should be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. The media service API can be used to provide information about current state of media sessions, events, media, or related data. The media service API can additionally provide interactive control of one or more operation of a media service.

Mappings to Programmatic Mechanisms

As shown in FIG. 7, mapping of micro-service usage to a programmatic mechanism functions to correlate particular events to programmatic mechanisms. In many cases, the mapping will map usage of a micro-service with a programmatic mechanism that will be used during use of that micro-service. As the MSCP will frequently handle inbound and outbound communications, the mapping can be between an endpoint and some application logic executed at a particular time. There can additionally be multiple mappings. For example, micro-service usage for a first endpoint may have an associated URI of a retrievable application logic to direct the use of the micro-service during the communication session and an associated callback URI that is triggered at the end of the communication.

Callbacks

Figure 8:
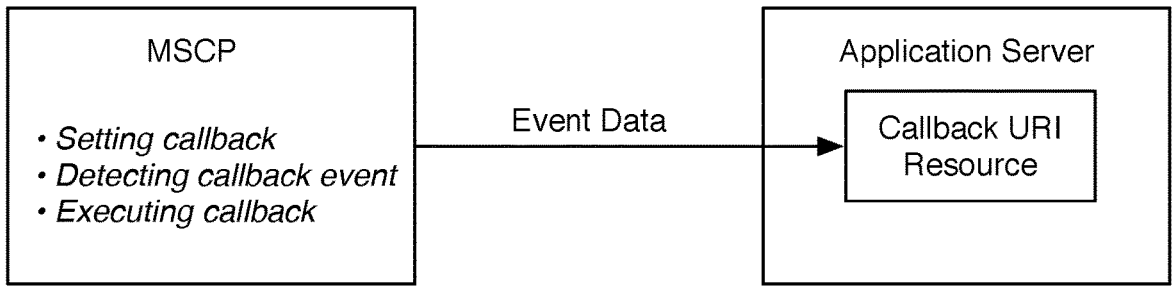
FIG. 8 is a schematic representation of executing use of a callback URI.

As shown in FIG. 8, responsively executing a callback URI event is one particular type of programmatic mechanism that can function to provide a mechanism for integrating with applications outside of the MSCP. A callback URI is preferably a configured URI of a resource controlled (or at least selected) by a developer of the outside application or service. The callback URI can be used when delegating particular decisions to an outside application server. Responsibly executing a callback URI preferably includes detecting an event associated with the callback URI and transmitting a communication to the callback URI. The communication to the callback URI preferably includes metadata related to the event. For example, the metadata can include information about the communication session (e.g., what endpoints are involved, the duration of the communication session, and context information relating to the event. A callback URI preferably functions to allow outside applications to be notified of particular events. If an outside application server decides to take some action in response to the communication to the callback URI, the API may be used. Alternatively, a response to the communication that was directed at the callback URI can specify different actions. In one variation retrievable application logic can is returned which can be used in executing retrievable application logic. In one variation, the callback URI can include variations of the system and method described in U.S. patent application Ser. No. 14/176,426, filed 10 Feb. 2014, which is hereby incorporated in its entirety by this reference.

Retrievable Application Definition

Figure 9:
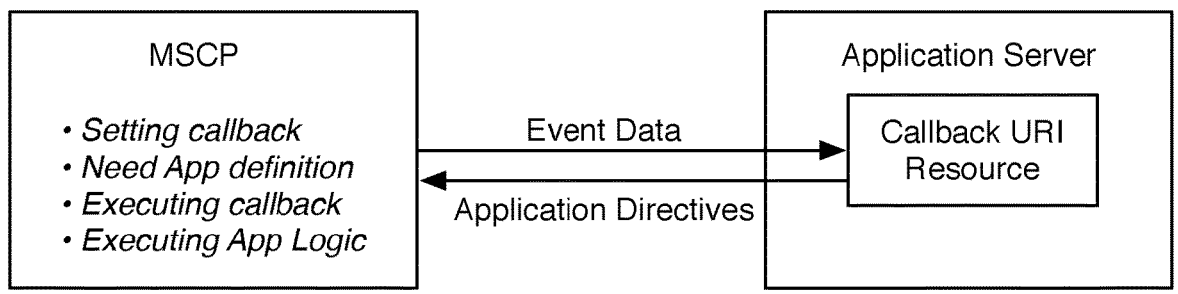
FIG. 9 is a schematic representation of executing retrievable application logic.

As shown in FIG. 9, executing retrievable application logic functions to allow particular aspects of a micro-service to be directed in response to a retrieved document specifying logic. Executing retrievable application logic preferably involves detecting occurrence of an event that is dependent on application logic (e.g., receiving an incoming communication, receiving a request to use a micro-service, etc.), mapping the event to a callback URI associated with application logic, communication with the callback URI, receiving application logic in a response from the callback URI, and executing the application logic. The communication to the URI preferably embeds state relating to use of the micro-service. From the embedded state information, an outside application can generate appropriate application logic. The application logic is preferably returned in the form of a script written in a scripting language. The scripting language is preferably substantially sequentially processed such that the instructions or executed in a sequence defined by instruction order. Alternatively, any suitable organization or specification of application logic may be used. In one variation, the application logic is an application bundle with included resources. The application logic preferably directs a set of actions associated with use of a micro-service. Some exemplary actions directed by application logic can include routing communications, controlling the format of media transformation, setting trigger response actions before, during, or after use of a micro-service; specifying preferences of micro-service actions.

Quality and Regional Communication Routing

Figure 10:
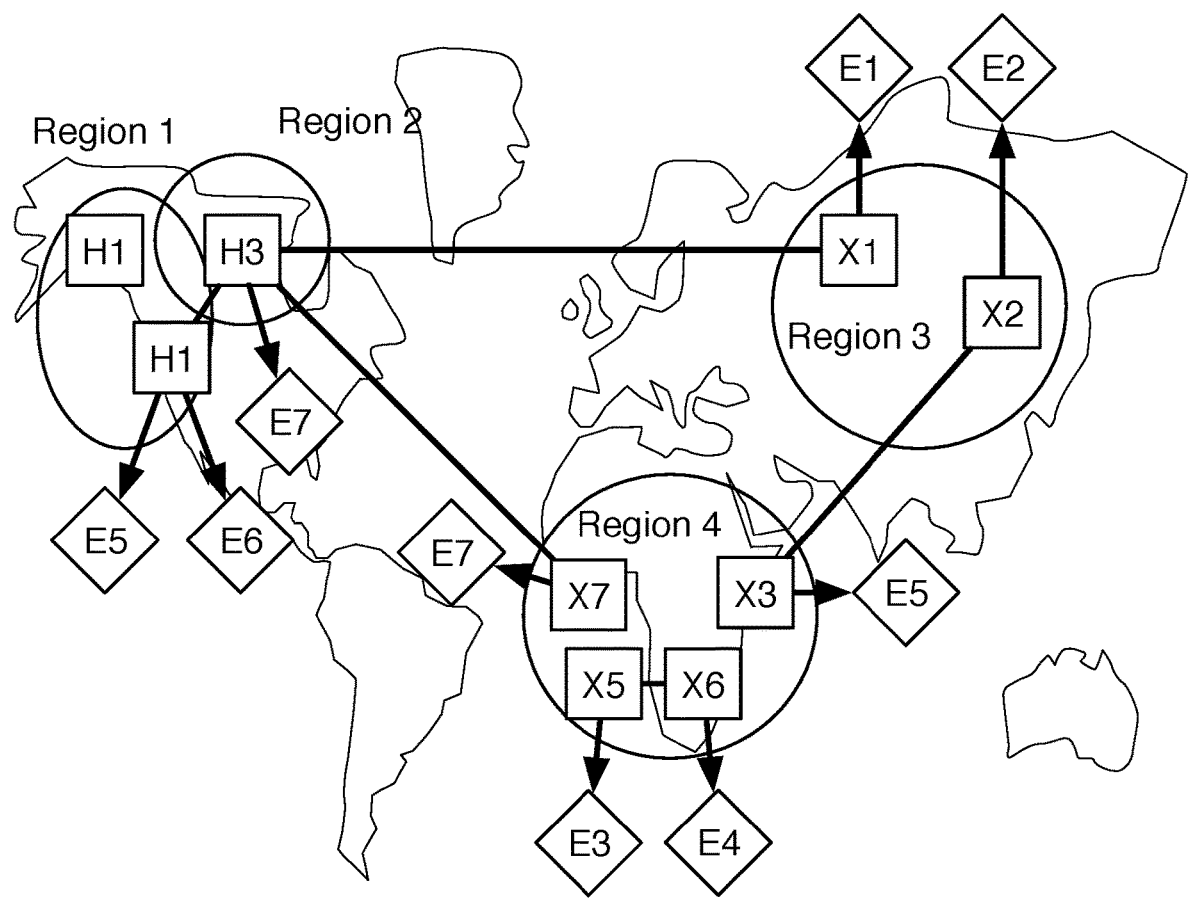
FIG. 10 is a schematic representation of regionally distributed resources.

As shown in FIG. 10, an attribute of the MSCP can include the system components associated with regionally distributed resources. The micro-service resources hosted in the distributed computing environment may additionally be distributed across various regional facilities. The regionally distributed system preferably functions to provide the highest quality path for communication between at least two endpoints in response to one or both of a selected media type and/or the location/configuration of the endpoints of the communications. As an example, the preferred system can function to minimize network latency between different types of endpoints (mobile, PSTN, browser-based telephony, client mobile devices, client browsers) using different types of media (voice, video, text, screen-sharing, multimedia) and disposed in different regions, countries, or continents.

The system is configured for managing communication throughout the system across different regional areas to improve communication according to resources requirements of a communication. In operation, the preferred system can perform routing and latency minimization in response to one or more of: the features/capabilities of the endpoints; a media quality measurement (video and audio recording); codec availability/compatibility; media resource availability; and/or any suitable metric. During operation, the communication flow of the system will preferably shift between operations modes—a first mode comprising communication flow between an endpoint of a local region to a remote region with more resources and a second mode comprising communication flow within the local region. An exemplary benefit of the system is that complex, stateful, or expensive micro-service resources may be maintained in limited regions and other resources can be implemented globally or regionally to support particular local regions. The limited communication resources may be complex because they maintain considerable state information of the platform, and replicating the state information regionally/ globally would result in increased complexity and cost. Communication platforms, which may be susceptible to global/regional scaling issues due to the real-time nature of synchronous communication, can use the system to dynamically switch between communicating within a local region and communicating with resources of a remote region.

In a regionally distributed MSCP, there can be two or more regions. The preferred system functions to maintain functional communication when the first region and second region are spatially separated by a globally significant transmission distance. A globally significant distance in this document may be understood to be a transmission distance greater than 2000 miles and more preferably greater than 5000 miles. For example, the first region may be on the West coast of the US and the second region may be on the East coast, separated by a geographic distance greater than 2500 miles. In another example, the first region may be in the United States and the second region may be in Europe, separated by a distance greater than 3500 miles. The first region and the second region are not limited to functioning with such distance ranges and may be separated by a distance less than 2000 miles or exceeding 5000 miles.

A method for managing communication in a distributed communication network of micro-services a preferred embodiment can include providing a communication platform with resources in at least two regions; initializing a communication session with a connection to at least one endpoint through a micro-service; associating the first endpoint with a first region; determining a communication route topology; and establishing the communication route topology. The method functions to dynamically redirect communication traffic within communication platform for signaling and media. The method is preferably employed in a regionally/globally distributed communication platform of micro-services that works with communication susceptible to latency and/or quality performance issues. The method is preferably used within a communication processing platform such as the telephony platform incorporated by reference above. The method may additionally or alternatively be used with video communication, client based audio communication (e.g., VoIP), screen-sharing applications, over-the-top (OTT) IP communications, and/or any suitable communication platform. As described above, replicating all components in different regions can be expensive and increase complexity of a system. The method enables communication to be re-routed within different modes of routing topologies according to requirements and quality improvements for a particular communication. Generally, different regions will have different media processing and/or signal control capabilities, and additionally, each communication may further have different and changing media and/or signaling resource requirements. The method preferably provides capability to route media according endpoint regional association and resource capability requirements of the communication session. More preferably the media and signaling are both routed, and routed independently. In one variation, the regional distributed communication network system and method can be substantially similar to the systems and methods described in U.S. patent application Ser. No. 14/176,458, filed 10 Feb. 2014 and U.S. patent application Ser. No. 14/278,952, filed 15 May 2014, which are hereby incorporated in their entirety by this reference.

3. Micro-Services

As mentioned, the MSCP can include one or many micro-services. The micro-services may be substantially homogeneous or one type of micro-service can include more than one variation. A micro-service preferably addresses a particular set of functionality that can be served in an isolated fashion. Exemplary micro-services can include an identity/presence service, a network discovery service (e.g., STUN/TURN service), a media transcoding service, conferencing/mixing service, interactive voice response services, input detection service (e.g., DTMF detection services), media intelligence services (text to speech service, speech recognition, sentiment detection, answering machine detection service), and other suitable micro-services.

An identity/presence service may function to provide a service to manage identifying/selecting devices of specified identities, authenticating, identities, setting of permissions, setting of policy, and/or providing any suitable identity or presence information.

The network discovery service can provide a set of resources to facilitate negotiating establishing communication between at least two endpoints regardless of their networking environment such as being behind a NAT.

A media transcoding service functions to convert between formats. The transcoding may convert an active media stream to another format. For example, a call with two endpoints may natively use two different codecs. The transcoding service may convert one or two of the legs of the communication to a common or compatible media stream format. Additionally, the transcoding service may work to convert accessed media resources that are or will be used in a communication session. For example, an MP3 file accessed from a URI may be converted to a wave file for playback during a phone call. In another example, a web client may use an OPUS codec while a mobile app may use Speex codec. The transcoding service preferably accepts a media stream in a first format and outputs a media stream in a second format. Transcoding can additionally alter bitrate, media size or resolution, or alter any suitable aspect. Media transcoding services may additionally or alternatively provide other media transformative operations such as image, audio, or video filtering.

A recording service preferably enables recording of calls or communication sessions. Recording is preferably for audio recording, but may additionally or alternatively include video recording, screen-sharing recording, multimedia recording, or any suitable recording service. The recording service may have additional features that may or may not be integrated into the recording service of the local service. Transcription is one preferred feature of the recording service. Transcription may use algorithmic speech recognition techniques, automated manual transcription, semi-automated techniques, and/or any suitable approach.

A Text-to speech service preferably generates, plays, and/or converts text into audible speech. The audible speech is then played within a communication stream. For example, a phone call may connect to a telephony application that specifies a script that should be read to the caller. The script is preferably directed to the TTS service to be played during the phone call. The text-to-speech services are preferably for audio communication. However, a computer generated video simulation or rendering of a speaker may additionally be created for video communication. The text-to-speech service preferably takes text as an input and outputs an audio stream that can be played or mixed in with the communication session A speech recognition service is preferably a service used in collecting spoken input and converting it into a format for transcription, natural language processing, or interpretation of responses. The speech recognition may use the transcription component described above, but may alternatively use an alternative approach. The input to the speech recognition is preferably an audio stream and parameters of speech recognition.

An input detection service functions to gather inputs of a communication device. Preferably the input detection service collects DTMF inputs from a user. In the DTMF input detection variation, an audio stream and parameters of detection are preferably an input to the service. The components of an answering machine detection service may alternatively be integrated into the input detection service or any suitable service.

Conferencing services preferably facilitate calls with more than two endpoints connected. Various features of conference calls may be enabled through components of conferencing services. The conferencing service preferably mixes audio for audio and/or video sessions.

Figure 23:
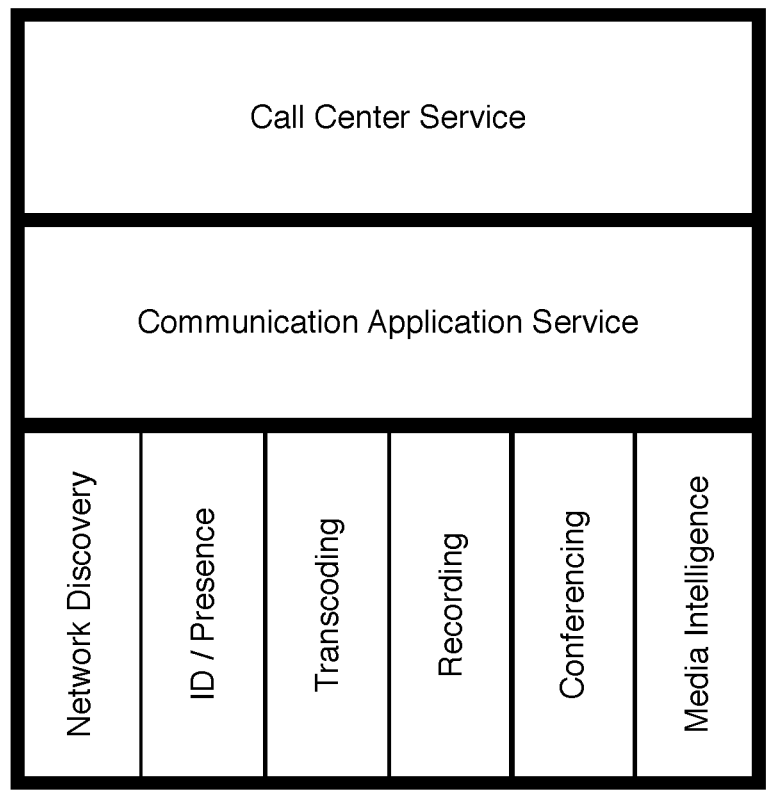
FIG. 23 is a schematic representation of a multi-layered communication stack.

In one variation, an application layer communication service can be used in combination with the micro-services. An application layer communication services preferably enables a sequence of communication instructions to be retrieved over an application layer protocol and executed in association to a communication session. The application layer communication service preferably provides a set of application level communication primitives wherein more of the communication negotiation and processing is handled by the platform. Exemplary primitives can include instructions such as "Say" (to convert text to audio/video media), "Play" (to play a media file), "Gather" (to collect input), "Record", "Message", "Dial", "Enqueue", "Hangup", and the like. The application layer communication system and methods are preferably substantially similar to the systems and methods described in U.S. patent application Ser. No. 14/459,615, filed 15 Aug. 2014, which is hereby incorporated in its entirety by this reference. Similarly, the a call-center system can be an additional sub-system of the platform wherein high level call-center directed primitives such as "Agent", "Options", "Fill Form", "Announce", and other suitable primitives. The call-center primitives preferably have significant application logic pre-configured to enable rick call-center directed solutions. As shown in FIG. 23, the micro-services, application layer service, and a call-center service can form a multi-layered communication stack. A communication service may be able to integrated with one ore more primitives along different layers of the communication stack. In one variation, a communication session can transition between layers. In another variation, a communication session can simultaneously use multiple layers during a communication session.

4. System for Providing a Network Discovery Service Platform

As shown in FIG. 13, a system 1300 for providing a network discovery service (e.g., STUN/TURN service) platform of a preferred embodiment can include a STUN/TURN micro-service (STMS) (e.g., an STMS that provides STMS instances 1321-1323) and a set of operational services. The operational services preferably include an account system 1330 and a metering and logging service 1340. The system 1300 functions to enable a platform to offer network discovery and negotiating services to a set of diverse and distinct entities.

The network discovery service platform is preferably used to connect a first device behind a NAT to a peer. Such network discovery tasks can be used in media or communication applications. The system 1300 provides such functionality as a service such that an outside entity can leverage the network discovery services of the platform rather than build, refine, and maintain a standalone STUN/TURN solution. An outside developer can employ the use of the network discovery service platform when building out a video communication service, a screen sharing service, a real-time audio communication stream or any suitable application where a synchronous media stream is established between two endpoints. Instead of building out a STUN/TURN service, a user can seamlessly leverage the existing micro-service of network discovery to negotiate communicating with an endpoint behind a network address translator (NAT).

Furthermore, use of the network discovery service platform can provide automatic and flexible scalability to an end user. A user can start off using the service for a small volume of users and then as the user's application grows, the user's use of the system automatically follows.

By providing a micro communication service of STMS within a communication platform system, other benefits in areas such as security, metering, logging, billing, programmatic integration, quality control, fraud and policy enforcement, multi-modal capabilities, and other suitable aspects may be achieved.

The system 1300 is preferably multitenant; provides mechanisms for metering, logging, and billing; offers a set of security and monitoring features built into operation of the platform; various programmatic hooks to better integrate an outside application with the micro-service offering of the system; distributed scalability and quality management; and/or other various aspects, which are described in more detail below.

The STUN/TURN micro-service (STMS) of a preferred embodiment functions to provide network discovery services to outside entities attempting to establish a network connection. The STMS is preferably a delegate service that can be used by outside entities (e.g., applications and services authenticated as registered account). In place of setting up a STUN/TURN service to facilitate P2P communication for video/audio chat, screen sharing, or other synchronous forms of communications, an application can just be set to use the STUN/TURN service on demand. An application does not have to pre-allocate or deploy a dedicated STMS, the system functions to allow the use of an STMS to scale appropriately to each user. As a micro-service, an application can use the STMS as a standalone communication service, while implementing any other communications operations within an internal or third party service. In one variation, the STMS can be used in combination with a set of one or more micro-services such as recording, transcoding, media intelligence, PSTN/SIP/other communication gateways, or other suitable micro-services.

The STMS is preferably a synchronous signaling and media service. In a first operating mode, the STMS applies only a STUN service wherein the STMS provides signaling through a STUN like solution. In a second operating mode, the STMS applies a TURN service to connect media of two endpoints, wherein the STMS provides synchronous media services acting on the media stream. The TURN mode is preferably engaged when the network topology and NAT types prevent the use of STUN. Alternatively, the TURN mode may be engaged when the configuration of the STMS is configured with capabilities that automatically trigger TURN for a particular network discovery session. For example, media stream recording may be enabled for a media session established with the STMS.

The STMS is preferably a set of media servers that run on machines, virtual machines, containers, or other computing environments inside a distributed computing infrastructure. The STMS is preferably hosted in a remote computing environment. The STMS can be instantiated as a service within a host, a server, a machine, a virtual machine, or any suitable component. A single host (or other suitable computing component) may provide only a single micro-service, but may additionally or alternatively provide a set of different micro-services. The media service system may be hosted within a single computing cluster, but more preferably is distributed across various clusters and/or operational regions. In one variation, media service sub-systems can be deployed in different geographical regions to provide improved regional performance.

The STMS is preferably composed of a set of STMS instances (e.g., 1321-1323) that can be deployed throughout the computing environment of the platform. An STMS instance is preferably one instance of a service operable on a host machine. Multiple instances can run on a host or server. Depending on the computing resources of a host and configuration of an STMS instance on that host, a given STMS instance will have an approximate capacity limit. For example, an STMS instance may have a limit on the number of concurrent network discovery sessions established through TURN. The various STMS instance can have individual operational layers (e.g., 1311-1313) beyond business logic of network discovery. The operational layers can that provide additional functionality within the platform such as account authentication, policy enforcement, supplementary media service integration, and the like. In one variation, an STMS instance can include a process manager 1311, an authentication layer 1312, a metering layer 1313, and a STUN/TURN engine 1314. The process manager 1311 can function to execute policy for requests to the platform. Any of the operational layers (e.g., 1311-1313) of an instance may additionally or alternatively be implemented outside of an STMS system as centralized services or distributed services. Alternatively the STMS can be a monolithic service, or a service partitioned and distributed in any suitable manner.

The account system 130 of the preferred embodiment functions to map requests of the STMS to an identity within the system. The system is preferably a multitenant platform wherein multiple outside entities can create an account within the platform. An account preferably provides a set of credentials or an alternative authentication mechanism through which requests can be validated. The account system preferably authenticates requests made by an account. In one variation, an account identifier and an authentication token must be included in a request, and these authentication credentials are validated by the account system before the request is fulfilled. An account may be authenticated when making use of a REST API, when receiving signaling communication, during use of a user interface control panel or at any suitable instance.

Various aspects of an account and usage of the platform can be configured through account management interfaces. An account may be managed through an account portal user interface. An account may alternatively be managed through API requests or through any suitable mechanism. Aspects of an account that can be managed include configuring programmatic mechanisms and settings when using the STMS. For example, an account manager could set various callback URIs that are triggered during errors or other events in the system. The account manager can further define various parameters that will determine how a communication is routed.

As a related aspect, the system can include a policy engine 1331. The policy engine may be a supplemental component or a sub-component of the account system. Policy can be set per account. Accordingly, different accounts can have different permissions, capabilities, pricing, capacity, performance, or other aspects, which can be set through an account policy. Policy may alternatively be set for a sub-account, for the entire platform, for a geographic region, or for any suitable context. Policy settings may be set by default by the platform but some or all of the policy settings may be driven by an account.

An account can include a defined policy configuration. A policy configuration may set particular limitations for account usage within the platform. The policy can prevent an application of an outside entity incurring usage that is beyond the scope in which the application is meant to be used. For example, a policy configuration may limit the duration of a communication session while facilitated with TURN. Similarly, the policy configuration may limit usage to machines with a particular network address, types of devices, physical geographic location of a device, or other suitable properties.

The account system 130 can additionally include a sub-account mechanism, which functions to enable a user of the platform to partition account usage to enable multitenancy within a product of the account holder. The sub-account mechanism preferably accounts for usage, and more specifically creditable/billable usage to be monitored according to an identifier for a sub-set of usage by an account. For example, an account holder may build an outside application platform that depends on the system. The outside application platform can similarly be multitenant in that multiple users can have individually metered and accounted usage. The inheritable multitenancy property of the platform (i.e., the capability of one account within a multitenant collection of accounts to further subdivide usage the account between subclass of accounts). Can preferably provide the capabilities of a parent account to a subaccount including: billing; programmatic customization, allocation of identifiers or endpoints; and/or other customization. A billing engine can cooperatively facilitate delivering billing statements and collecting payments from the sub-accounts. Additionally, the sub-account mechanism can establish a hierarchy of policy inheritance. A platform preferably contains policies that are applied to account. In one variation, a usage policy is based on the type of account such as free account, basic account, or enterprise-account. A parent account can similarly at least partially define the policies of sub-accounts. In one variation, an account will create sub-account resources.

The metering and logging system 1340 of the preferred embodiment functions to create a monitoring system to the STMS. The metering and logging system operates in coordination with the provided STMS. In one variation, the metering and logging system is integrated within an STMS instance running on a machine as shown in FIG. 13. In another variation, the metering and logging system can externally monitor the actions of the STMS, wherein the actions of the STMS may be reported to the metering and logging system in any suitable manner. The metering and logging function to create a record of notable activities. The metering can be used in providing programmatic hooks (e.g., callback URI triggering, application execution, and the like), billing/crediting an associated entity (e.g., charging for services or controlling resource access), creation of an audit trail, and/or other suitable functionality. In one variation, a STMS instance running on a host includes an instance layer that facilitates logging and tracking of accountable events as shown in FIGURE. Metering preferably includes recording who (e.g., which account, sub-account, user, etc.) is associated with the use of media micro-service and the quantity of usage.

In one variation, the metering layer (e.g., 1311-1313) of an STMS instance (e.g., 1321-1323) will record individual events such as initialization requests, responses to a request, changes to a facilitated session, when a communication session ends, and/or any suitable event. The metering layer may additionally measure the amount of data transfer, the time of communication sessions, and/or any suitable usage metric while facilitating a particular communication session. The records are preferably metered and logged in connection to an associated account.

A billing engine 1350 may operate independently of the metering and logging system 1340, but may alternatively be integrated. A billing engine 1350 preferably calculates amount owed by a particular account/sub-account. The billing engine 1350 can additionally facilitate collecting and distributing of funds as appropriate. Such accounting may be used in billing or crediting an entity/account for metered usage, which functions to allow a sustainable STMS to be operated. In another variation, usage accountability can be used in limiting and balancing usage of a particular entity. As the platform is preferably multitenant, usage is preferably balanced across multiple entities. Rate limiting and action limits may be imposed at various times. Additionally, as use of a communication infrastructure is often accompanied with significant financial cost, fraudulent behavior by accounts or users of an account can be harmful to users of the platform and to the platform itself. Fraud detection can additionally be accounted for during usage of the platform.

The system 1300 may additionally include a resource management system 1390 which functions to scale and orchestrate the computing resources that support the STMS platform. The set of STMS instances (e.g., 1321-1323) are preferably scaled so as to support the usage requirements across a set of accounts. As a multi-tenant platform, the resources are preferably shared across accounts. In other words, a STMS instance used for a first account at one time may be used by a second account at a different time. The variability of usage requirements for distinct account users is preferably normalized across a set of accounts within the platform, such that the platform is scaled to support the varying usage demands of various account holders. The resource management system can preferably instantiate more STMS resources or other services, suspend resources, or terminate service instances. In one variation, a usage model is generated for at least a set of active accounts of the platform. For the users that use the platform, or alternatively that use the STMS platform above a particular threshold, a model may be generated that predicts their usage over time. In one instance, an account may have a substantially steady state of usage. In another instance, the amount of usage may be a function of time of day, week, month, or year. In another instance, an account may have varying trends that are predicted in real-time based on past metrics and optionally metrics of similar accounts. As one baseline heuristic for usage prediction, the media type or application use case may be used to generate a usage model. For example, an account may select the type of STUN/TURN usage during activation—selecting an option such as audio, video, screen sharing, and the like. A predictive model may be generated using any suitable algorithm or heuristic.

The system 1300 may additionally include a queuing system 1360 which functions to facilitate rate limiting and/or resource management. The queuing system can preferably queue requests of a defined scope. A queuing scope may include queuing across a platform, within a regional segment of the platform, across an account, across a sub-account, across requests of a telephony endpoint, or across any suitable scope. In the variation of queuing with a platform scope, requests from different accounts to use the TURN portion of the STMS may be initially queued until a resource is available. The requests may be queued according to different entity limits and policy. Requests of an account or sub-account may be associated with a dequeuing rate and limit. A dequeuing limit preferably defines a maximum frequency of a particular action with the STMS. A dequeuing limit preferably defines a hard limit on the number of particular actions within a time window. For example, an account may be limited to no more than three session initiations over TURN per minute and a limit of two hundred per day. Additionally or alternatively, the dequeuing of a request may be dependent at least in part on the resource usage and/or predicted impact of the request on the system. With limited capacity, a request to use TURN for an audio session may be dequeued prior to a request to use TURN for a video session, wherein the video session is predicted to use more resource usage.

The queuing system 1360 preferably enables requests to use the STMS functionality to be delayed until a suitable condition. In one variation, a queuing system 1360 can operate cooperatively with the resource management system 1390. In demand input mode, queuing system information can be an input to the resource management system 1390 in determining what and how many resources to allocate or deallocate. In a management mode, the resource management system 1390 can alter the queuing mechanism.

Additionally, the system 1300 can include additional media service integration interface mechanisms (e.g., 1380), which function to enable supplemental media services (e.g., 1381 and 1382) and functionality to be added to use of the STMS. In a first instance, an account holder will only make use of the STMS to complete the network discovery task of an outside application—the account holder may not have the need of additional services. In another instance, a second account holder may have additional functionality that can be fulfilled by other micro-services (e.g., 1381, 1382) of the platform.

The micro-services (e.g., 1381, 1382) may include micro-services that include a transcoding service, a transcription service, a recording service, a mixing/conferencing service, a protocol gateway (e.g., PSTN gateway, etc.), a media-intelligence service, an application processing service, and/or any suitable type of service offered as a media processing micro-service primitive.

Figure 14:
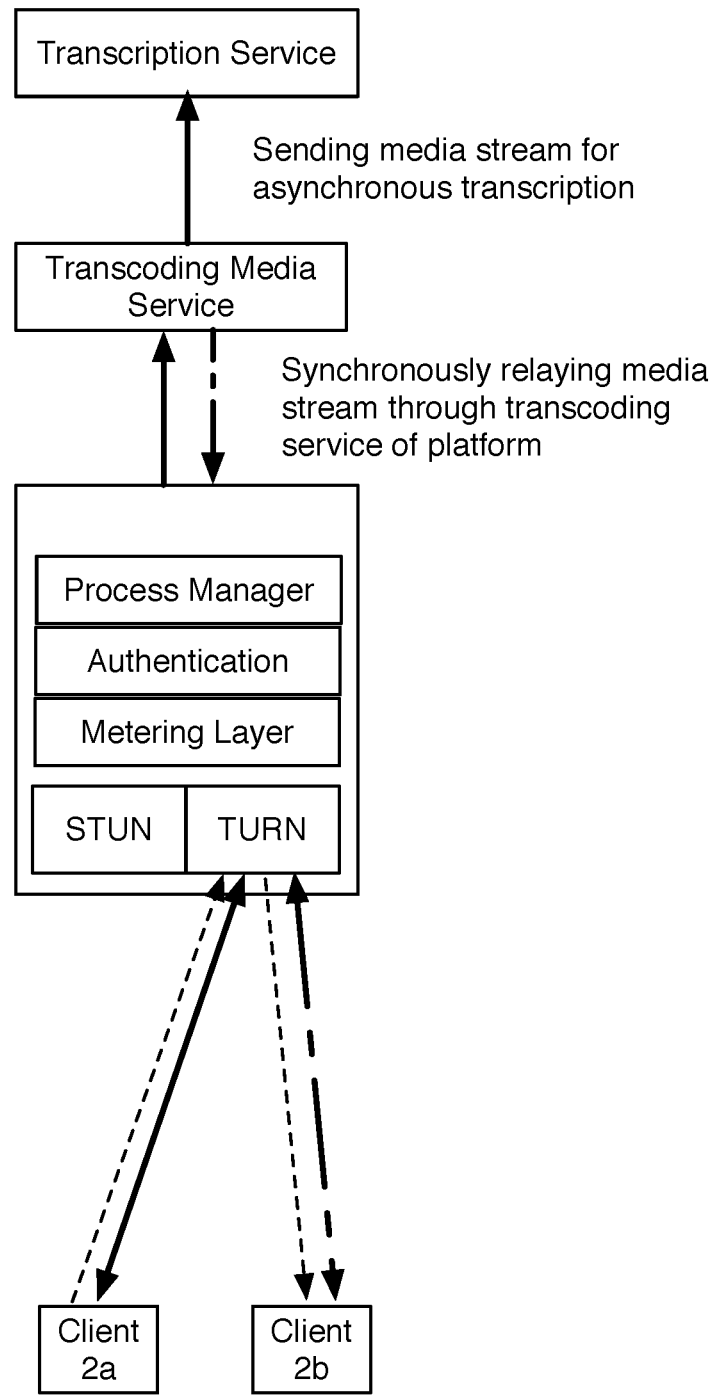
FIG. 14 is an exemplary schematic representation of an instance of integrating network discovery service with supplemental media services.

A service integration interface mechanism 1380 can enable a communication to be redirected to an additional micro-service for additional processing as shown in FIG. 14. The integration interface mechanism 1380 preferably includes at least one mechanism for directing the use of one or more micro-service. As one variation, signaling may be able to selectively specify activation of one or more additional micro-services. For example, a signaling request to the STMS may include a data parameter that specifies the use of a transcoding media micro-service to be employed to the communication session. An alternative variation, an account or sub-account may pre-configure usage of a micro-service to employ one or more additional micro-services. For example, an administrator may set the STMS settings of an account to record media. In another alternative variation, use of a micro-service may be directed in response to callback event in which the STMS calls out to an external application server to retrieve processing instructions. The instructions retrieved through the callback may direct the use of one or more additional micro-services. In yet another variation, an additional micro-service may be activated in response to an asynchronously received API request. For example, in the middle of serving a video chat session over the STMS, a REST API request may be received that references an identifier of that video chat session, and directs a modification to the media routing to include one or more media micro-services.

An additional micro-service can be leveraged in several different modes. As one aspect, the micro-media service may be synchronous media micro-service or an asynchronous media micro-service. A synchronous media micro-service will operate in real-time on the media stream. A temporary or record of the media service may not be made. An asynchronous media micro-service preferably operates on the media offline from the real-time communication. In one instance, a transcription media service may provide a transcription of a communication session, but may provide that at a later time. (A synchronous transcription media service may alternatively be offered). Additionally a media service may include mutable or immutable operations. A media micro-service includes a mutable operating mode if the micro-service modifies or mutates the media. A transcoding media micro-service is a mutable micro-service. A media micro-service includes an immutable operating mode if the micro-service processes the media without modifying the contents. Information extraction services such as transcription or media intelligence service can have immutable operating modes.

The system 1300 can additionally include a set of sub-systems to support various programmatic mechanisms described herein such as APIs, event triggers, callbacks, and other suitable programmatic hooks that developers can use when building out applications or services.

The system 1300 can additionally include an application programming interface (API) service (e.g., 1383 of FIG. 13) through which an authenticated account entity may interact with the system and/or obtain information from the system. The API (e.g. the API of the API service 1383) may be used in setting configuration of STMS usage for an account. For example, an API request may be used to alter usage limits and thresholds. As mentioned above, the API can set configuration related to use of additional micro-services, callbacks, and other interaction options of a session can be controlled. In one variation, the API may enable programmatic control of active communication sessions such that a communication session may be augmented through an asynchronous API request. In one variation, a video chat may be terminated, paused, redirected or modified through the API.

The API service (e.g., 1383) is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein, HTTP may be used, but should not be interpreted as being limited to the HTTP protocol. HTTP requests (or any suitable request communication) to the platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE.

The system 1300 can additionally include sub-systems to support event triggers and/or event callbacks (e.g., the event trigger system 1384 of FIG. 13). Event triggers can be account-customized conditions that result in an event response when the condition is satisfied. The event triggers can leverage internal information of the platform, but without exposing the used internal information to an outside account entity. When an event trigger condition is satisfied, a configured event is executed. The event could be an internal operation, a callback event, or any suitable action. An Internal operation can be a closed action that may not be fully exposed to an account holder such as ending all active communication sessions serviced by an STMS instance. A callback event preferably includes making an application layer protocol communication to an external resource. A callback event may alternatively be configured by account for any suitable event such as when a session starts, when a session ends, when crossing a usage threshold, or any suitable condition.

5. Method for Operating a Network Discovery Service Platform

Figure 15:
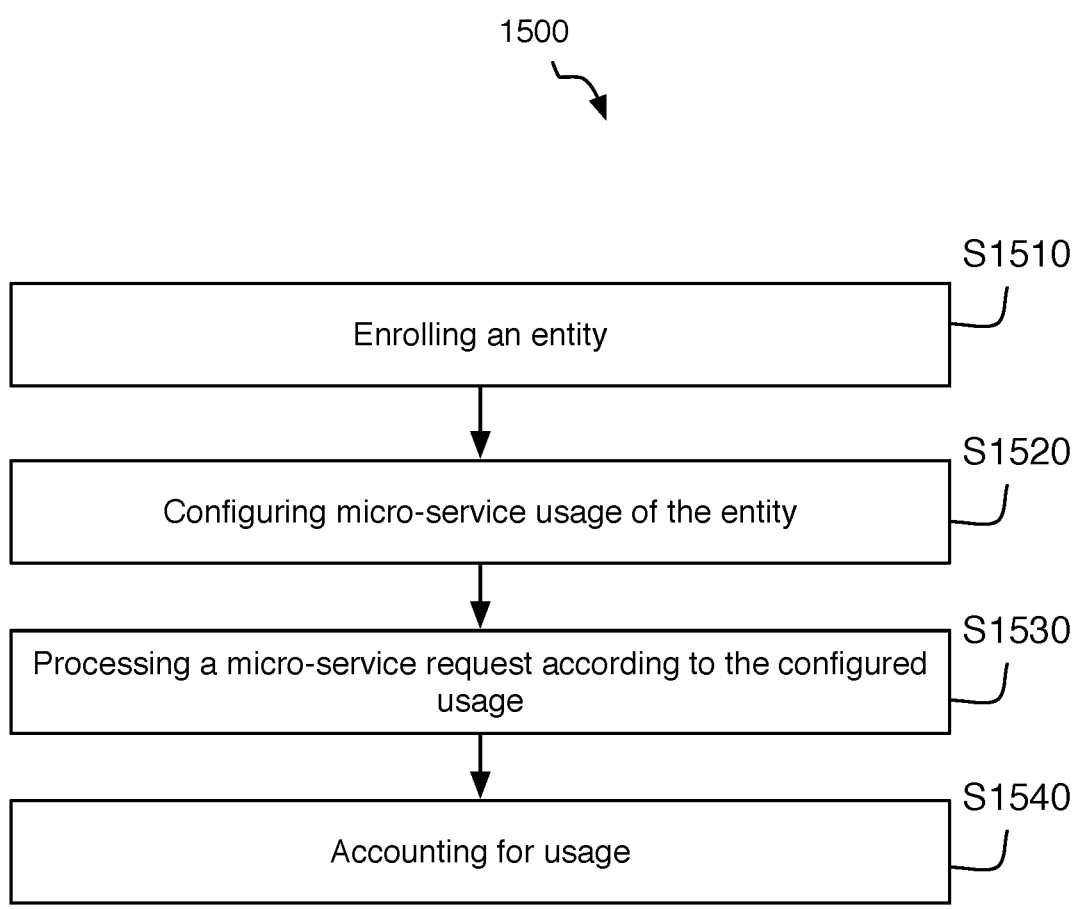
FIG. 15 is a flowchart representation of a method of a preferred embodiment.
Figure 16:
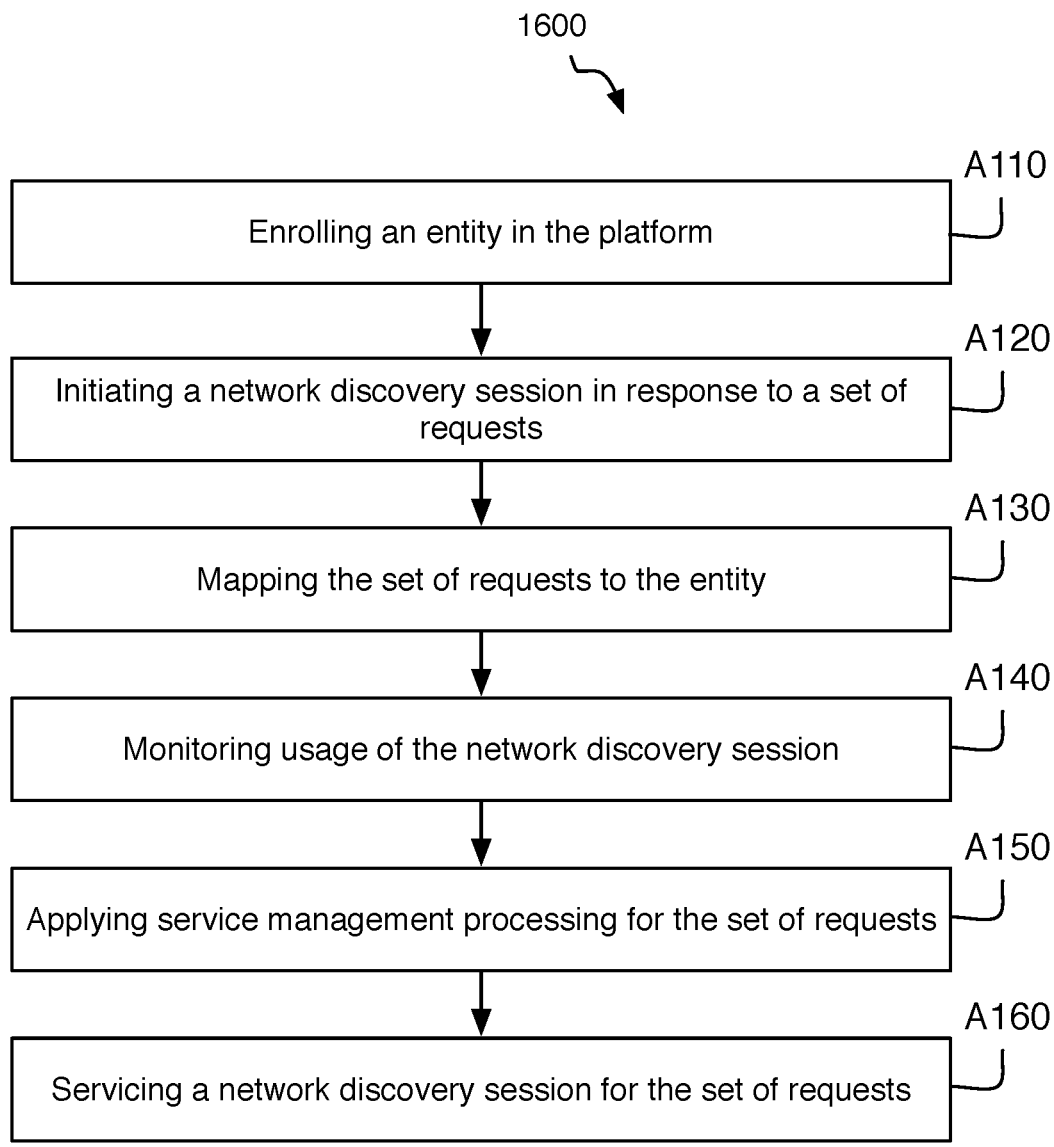
FIG. 16 is a detailed flowchart of a method of a preferred embodiment.
Figure 18:
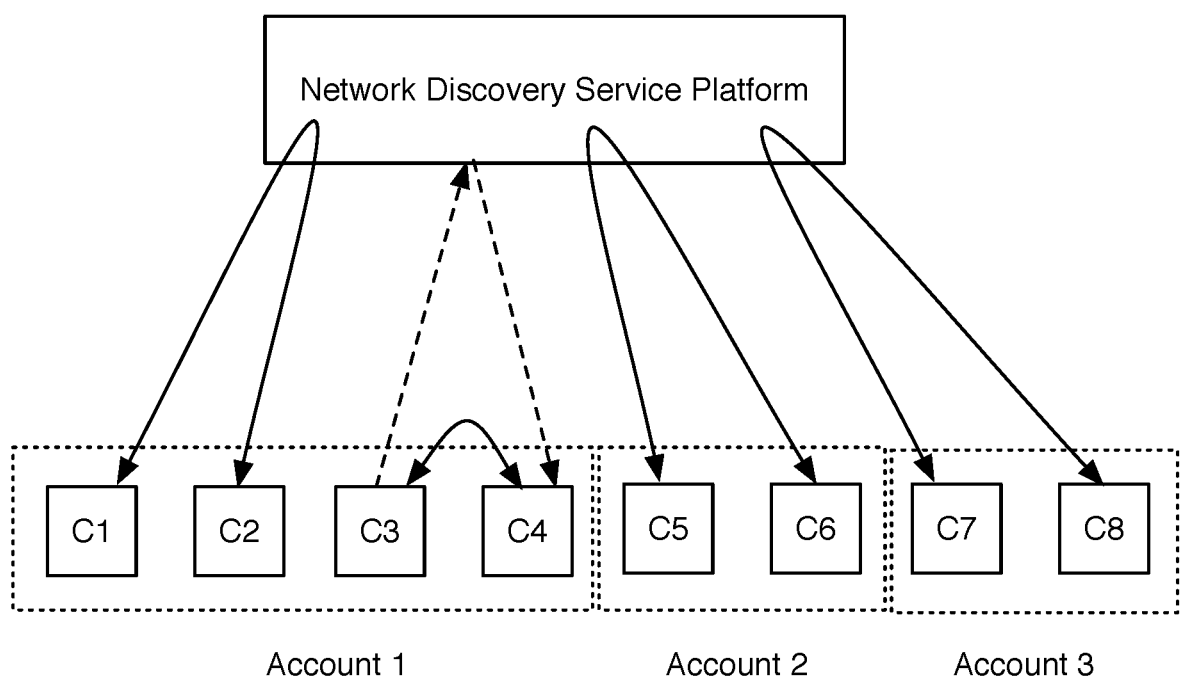
FIG. 18 is a schematic representation of application of the method across multiple accounts and network discovery sessions.

As shown in FIG. 15, a method 1500 for operating a network discovery service platform of a preferred embodiment can include enrolling an entity (process S1510), configuring micro-service usage of the entity (process S1520), processing a micro-service request according to the configured usage (process S1530); and accounting for usage (process S1540). The method 1500 functions to correlate usage of a STUN/TURN micro-service to an entity such as an account or subaccount. Applied within the platform, multiple entities can achieve delegated, customized network discovery on demand. Applied to a single entity instance, the method 1600 can include enrolling an entity in the platform A110, initiating a network discovery session in response to a set of requests A120, mapping the set of requests to the entity A130, monitoring usage of the network discovery session A140, applying service management processing for the set of requests A150, and servicing a network discovery session for the set of requests A160 as shown in FIG. 16. Such a method is preferably performed across multiple entities in multiple distinct network discovery sessions, which may be at different times or overlap as shown in FIG. 18.

The method (e.g., 1500, 1600) for operating a platform for a network discovery service is preferably used to establish a media communication session between devices wherein at least one device is within a private network (e.g., not in the public internet). More specifically, the method connects a first computing device behind a NAT to a peer, computing device, wherein the connection is facilitated by delegate services hosted by the platform. An outside developer can employ the use of the network discovery service platform when building out a video communication service, a screen sharing service, a real-time audio communication stream or any suitable application where a synchronous media stream is established between two endpoints. The network discovery service is preferably a STUN/TURN service but may alternatively be any suitable variation or alternative network topology negotiation service. Instead of building out a STUN/TURN service, an application of an account can seamlessly leverage the existing micro-service of network discovery to negotiate communicating with an endpoint behind a network address translator (NAT).

Figure 19:
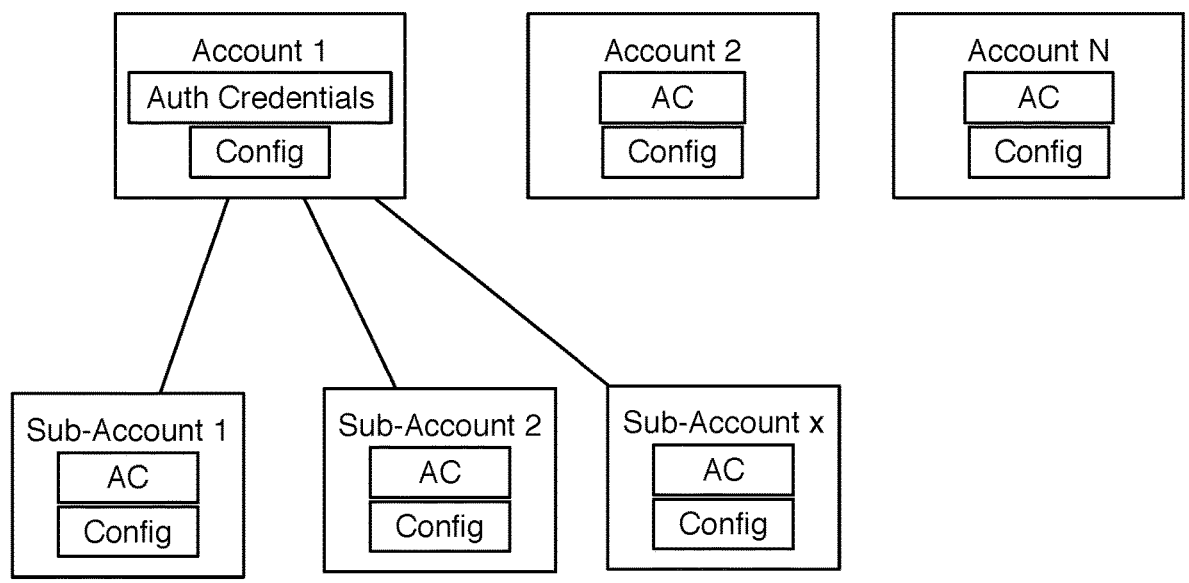
FIG. 19 is a schematic representation of registered entities and configuration.

Use of the network discovery service platform may provide automatic and flexible scalability to an end user. Use of the network discovery service platform can be scalable wherein a user can start off using the service for a small volume of users and then as the user's application grows, the user's use of the network discovery service follows. The method can additionally include processes that provide security, metering, logging, billing, programmatic integration, quality control, fraud and policy enforcement, multi-modal capabilities, and other suitable processes. The method is preferably implanted by a system substantially similar to the one described above, but may alternatively be implemented by any suitable system Block A110, which includes enrolling an entity in the platform, functions to configure an account or application for use of the platform. Herein, an account will be used in describing the entity, but an account may be a sub-account, an application, an endpoint, or any suitable entity. Enrolling an entity can include registering the entity and setting an entity network discovery instance configuration as shown in FIG. 19.

Registering an entity preferably includes registering a developer account (i.e., an account), but may alternatively be associated with registering a subaccount, an application, a communication endpoint, and/or any suitable entity. In a first variation, a new account is created and setup. In a second variation, a sub-account of an existing account is created and setup. Enrolling an entity in the platform can additionally include editing or updating an existing entity. Registering an entity can include assigning authentication credentials for the entity. In one variation, the authentication credentials include an entity secure identifier token and an authentication token. The authentication credentials can be supplied when receiving a request of Block A120 to provide a mechanism for mapping the request to entity accounting and configuration in subsequent processing of the request. The authentication credentials can additionally be used in interacting with the platform over the API. An entity may be registered through interactions over a graphical user interface, such as on a website or inside of a client application. An entity can alternatively be registered using an API.

Configuring a network discovery instance of an entity sets the customized rules around usage of a given session instance of an entity. A network discovery instance is a particular instance of a network discovery session established through the platform. For example, a video chat application may have one instances of a network discovery session each time one user sets up a chat with a second user. A network discovery session can include the signaling and communication in establishing a communication session (e.g., a media stream). The network discovery instance can additionally include the communication session when the media path passes through the platform (e.g., such as when TURN is used). A communication session is preferably an open media communication channel wherein substantially real-time communication occurs, such as a voice call, video call, screen sharing, data-transfers, and the like. As different entities will have varying requirements, each entity can set at least one set of options. In one variation, multiple instance types may be configured which may be selectively used by an entity. For example, an entity may have a first network discovery configuration for free users of the entity's application and a second network discovery configuration for paid users of the entity's application.

Configuring a network discovery instance may include setting default configuration for a given network discovery instance. In one variation, an account is automatically allowed access to a network discovery service. That network discovery service may be configured automatically by the platform. Different entities may receive different default configurations. In another variation, an account may need to explicitly enable the capability of a network discovery service such as by enrolling in the service offering through an administrator control panel. Other aspects of the network discovery configuration may be further configured by an account.

Configuring a network discovery instance can include defining a programmatic mechanisms that can include setting event callbacks, setting event triggers based on platform metrics, secondary micro-media service configuration, set usage limits, and/or setting any suitable additional functionality of the network discovery service.

Enrolling of an entity can additionally include allocating an endpoint to the endpoint. An endpoint is preferably an identifier within a namespace. Endpoints can provide mapping information between a communication destination or origin and a physical device. An endpoint preferably has a defined syntax. In one variation, the syntax can be a SIP address, but may alternatively be a username or any suitable identifier. Accounts, sub-accounts, and/or any suitable entity may be allocated endpoints. The endpoint may be global such that cross account and/or platform communication may be established. Alternatively, endpoints may be a scoped to an account or sub-account. Entities can register, acquire, or otherwise obtain a n endpoint. Endpoints may alternatively be transferred, removed, or otherwise disassociated from an account.

Figure 17:
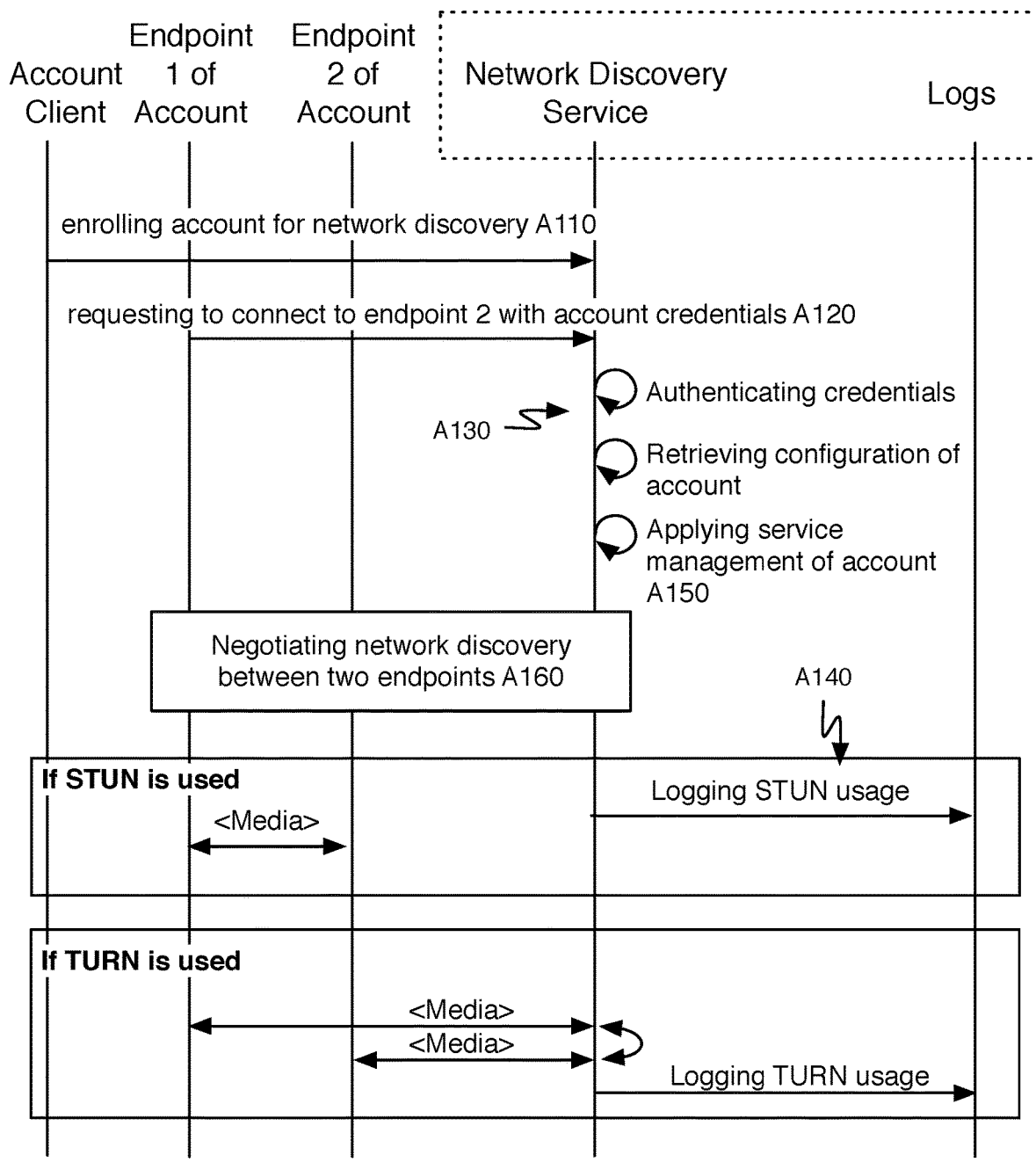
FIG. 17 is a communication sequence diagram of a method of a preferred embodiment.

Block A120, which includes initiating a network discovery session in response to a set of requests, functions to start an instance of a network discovery session. In the case of a network discovery micro-service, a session instance can begin upon receiving a request. As shown in FIG. 17, a first device preferably directs a network discovery request to an exposed endpoint of the platform. The request can be transmitted over an application layer protocol such as an HTTP-based protocol (e.g., HTTP and HTTPS), SPDY, or any suitable application layer protocol. Alternatively, the request may be transmitted over a protocol of any suitable layer of the internet protocol suite or other networking interconnection protocol. The request is preferably authenticated through an authentication service of the platform.

In some scenarios, the entity will be enabling user client devices to connect with other devices. A user client device may be outside of the security layer of the entity and the platform, and accordingly, credentials may be exposed. Account credentials and, in particular, private tokens of an account are preferably not supplied in an observable form to a user client device. The method can include facilitating ephemeral credentials. Ephemeral credentials can be credentials with limited usage conditions that act as temporary delegate credentials of an entity (e.g., an account, sub-account). An authentication service can mint ephemeral credentials using a shared secret between the entity and the platform. The ephemeral credentials can be supplied to exposed devices. For example, a video chat application may enable video chat to occur with anonymous users accessing a website on an internet browser. Sending credentials to the browser could enable introspection of the private credentials of the account. Preferably, ephemeral credentials are created and delivered to the browser, and the browser uses generated ephemeral credentials in establishing a media communication session with a peer. Ephemeral credentials may have an expiration condition based, at least in part, on time—ephemeral credentials may become invalid after a particular time. Ephemeral credentials may have expiration conditions based, at least in part, on usage. Ephemeral credentials may only be used a set number of times (e.g., one time use). Alternatively or additionally, ephemeral credentials may set limits of total communication session time, data usage, or other suitable usage metric. A communication session authenticated with ephemeral credentials with a 30-minute limit will terminate after 30 minutes of communication time have occurred. Ephemeral credentials may additionally have functional limits such as bandwidth, geographic/regional restrictions, feature limits, and other suitable limits.

The initiation of a network discovery session preferably includes determining if the session is allowed or rejected. If the request is authenticated, the request is preferably fulfilled by the platform. If the request is not authenticated, the request is denied and an error message or a suitable response is returned.

Block A130, which includes mapping the set of requests to the entity, which functions to establish an association between the initiated network discovery session and an enrolled account. The network discovery instance configuration of an entity is then retrieved and applied to the service management of the session. The enrolled account is preferably held accountable for the usage. In one alternative variation, the platform may support some amount of unregistered usage, wherein there may be no authentication and no associated account. In the case of unregistered usage, at least some subset of platform usage involves mapping to an entity.

Preferably, a single entity is mapped to the requests. Alternatively, multiple entities may be associated with the request. In one variation, the multiple entities may be a hierarchical structure of entities such as a parent account and a subaccount. The network discovery instance configuration of the multiple accounts may be applied in block A150 according to permissions or prioritization. For example, some configuration parameters may not be overridden by a sub-account, whereas some configuration parameters can override those a parent account. In this example, the sub-account lacks permissions to a subset of the configuration parameters. In another variation, a different entity may be associated with each request received at the platform. For example, a first entity may be associated with a first request and a second entity associated with a second request. Service management processing may be applied independently for each entity. For example, if a first entity enables audio recording, the audio may be recorded for the first entity, but not offered to the second entity.

Block A140, which includes monitoring usage of the network discovery session, functions to metering, account, and otherwise track usage of an entity and apply policy based on that usage. Preferably, the metered usage is used in setting or regulating the bill of an account or crediting an account. Network discovery and, in particular TURN facilitated sessions, can result in resource usage for which an account may be held accountable. Preferably, a metering layer is integrated into each network discovery server instance that facilitates network discovery. The metering layer can log events and create a record of when and how the network discovery service was used and which account was associated with the usage. Events can be logged in relationship to client requests (e.g., block A120), activated platform usage (e.g., block A150), and for session usage (e.g., TURN-facilitated communication sessions of block A160). Accounting may be based on one or more metric. The metric may be the number of events (e.g., number of network discovery attempts), time of media streaming, data transfer of media streaming, and/or any suitable metric. Metering and accounting may additionally be set by modality of the communication stream. Audio streaming requests may be metered and billed different from video streaming requests. Accounting may occur progressively as new usage occurs. Alternatively, accounting may occur at periodic increments. In one variation, usage of each account is aggregated and accounted for when preparing a monthly statement. Accounting can additionally include notifying an entity and collecting payment or credit. Such billing procedures can be automated by the platform. Additionally, the metering and billing can account for state changes of a communication stream. For example, if a communication stream were to transition between audio and video, the respective different modalities of the communication stream can be metered and accounted for differently.

In one variation, metering and accounting can additionally be sub-divided over subsets of usage. Preferably, the usage and accounting are sub-divided by sub-accounts of a parent account. In this manner, an account can provide a service wherein at least part of the cost of operating the service is delegated to an end-user. Sub-accounts can be one mechanism used in managing sub-dividing usage and metering.

For example, a video chat app may use the network discovery service to facilitate running their video streams. The account may be held responsible for paying for all the usage accrued by the users of the video chat stream. A sub-account may be created for each end user account, and metering and accounting by sub-accounts can collect payment from the end users, such that the cost of network discovery is offloaded from the account holder to the end users.

An account holder may additionally set different accounting or crediting configuration such that an account holder can monetize the usage by a sub-account or subsidize and offset the cost for the sub-account. In monetizing the usage by a sub-account, a price is set for usage that is greater than the platform price. The configured pricing is used in collecting payment from an end user. Then the fee based on the platform price is collected from that payment, the difference is transferred to the account holder. In one variation, the difference is transferred to the account holder as a collected sum of multiple sub-accounts. In subsidizing the usage of the sub-account, the account holder can pay for part or all of the cost for a sub-account. The account holder can configure the pricing at a rate lower than the platform rate for a particular sub-account. The configured rate is used for the sub-account. In this variation, a billing statement is sent to the sub-account for the offset fee, and the account holder is sent a billing statement for the difference between the platform pricing and the account subsidized pricing. The billing statement sent to the account holder may be bundled as a single statement for a set of sub-accounts.

The metered usage can additionally be used in limiting account usage, detection of fraud/illicit behavior, triggering events, or any suitable action in the platform as described below.

Block A150, which includes applying service management processing for the set of requests, functions to execute policy over the network discovery service in accordance with the network discovery service configuration. Applying service management can include platform management and entity-driven management as set by customized configuration. Applying service management can include executing synchronous processes during a network discovery session or executing a background/asynchronous process. The service management preferably functions to add a layer of functionality that enables the network discovery service to be offered to distinct entities. Applying service management can include limiting account usage of the network discovery service, managing requests and resources of the platform in response to account usage, detecting illicit use of the platform, and interfacing with at least a second micro-media service.

Limiting account usage of the network discovery service functions to monitor and restrict usage of the network discovery service. Limiting account usage can include event count limits, time of use, data transfer usage, bandwidth (rate of data transfer) limits, feature limiting, and/or any suitable type of limits. In the STUN/TURN implementation of network discovery, network discovery can result in either network discovery through a STUN negotiation, wherein the media communication is established outside of the platform, or through TURN, wherein the media communication passes through the platform. STUN facilitated network discovery is preferably not limited. However, the number of STUN negotiations may alternatively be tracked and restricted. Similarly, time of day and additional conditions could limit when network discovery sessions are permitted. For example, a network discovery configuration may restrict STUN negotiations (and preferably TURN negotiations too) to a particular time of day. A network discovery configuration can similarly limit bandwidth. For example, a particular account can be limited to using TURN services with a set bandwidth limit. Since TURN requires channeling media through a TURN server during the duration of a session, at least one server uses some portion of computing resources to facilitate the communication. In one variation, an entity will configure a network discovery instance with some level of permitted bandwidth. In one variation, the level of bandwidth is set by media type such as audio stream, low-resolution video stream, or a high-resolution video stream. Set categories of stream resolutions can place appropriate limits on the bandwidth of a stream, and could limit an entity from streaming video when an audio configuration is set. Such limits may be set based on pricing. Limits may additionally be beneficial to an entity such that they can ensure usage from ephemeral user devices does not use the system in unintended manner. In one variation, a first tier of usage would allow basic audio streaming and would have a first set of usage fees, a second tier of usage would allow video streaming and would have a second (typically more expensive usage fees). Such bandwidth limits may not be hard limits; the bandwidth limit may include burst or peak bandwidth limits or a normalized bandwidth limiting heuristic to allow for some variability in the communication stream. Similar limits may be placed on the time of usage. For example, an account may be allocated a set amount of minutes of communication streaming. Communication sessions may be prevented after that threshold or be treated differently in any suitable manner.

Managing requests and resources of the platform in response to account usage functions to transparently operate the platform to maintain reliability of the platform. Managing requests and resources of the platform is preferably performed within the context of a servicing a set of distinct entities. The platform is preferably a multi-tenant platform, wherein the resources of the platform are shared across a set of accounts. In one variation, dedicated, allocated resources are operated for the sole use of a designated entity. More preferably, resources are shared and orchestrated to provide a normalized quality of service across multiple accounts. Managing requests and resources of the platform can include queuing requests, dynamically allocating resources, and detecting illicit use of the platform.

Dynamically allocating resources functions to automatically scale the platform. The platform is preferably scaled to sufficiently handle the demand of the entities. The scaling of resources is preferably transparent to the entities using the platform. Resources are preferably allocated to satisfy higher network discovery demand. Resources may alternatively be deallocated when platform capacity exceeds demand. In one variation, a set of resources are maintained in a standby operation mode, and can be transitioned into active operation during high demand, and resources set to standby when inactive.

In one variation, usage of the platform is characterized and the resources are dynamically allocated in response to the current characterization of resource utilization. Characterizing the platform preferably includes characterizing a set of entities (e.g., accounts, subaccounts, endpoints, and the like). Characterizing entity usage preferably scopes usage trends, which can enable better predictions of resource capacity requirements.

Figure 20:
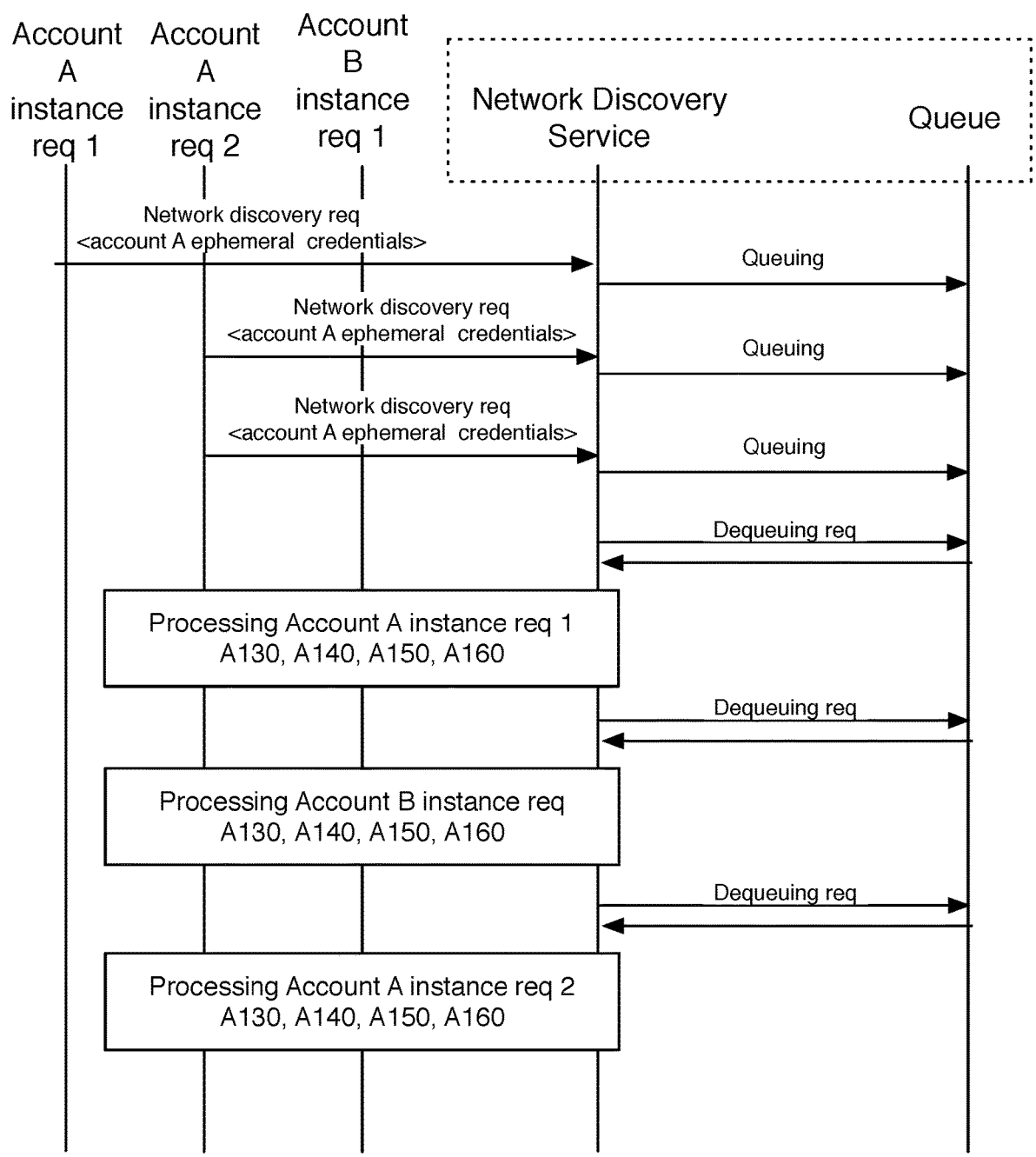
FIG. 20 is a communication sequence diagram of a variation including queuing and dequeuing requests.

Queuing requests functions to gate the fulfillment of network discovery requests as shown in FIG. 20. Queuing can ensure that the fluctuations in demand can be addressed through limited resources. From the perspective of an entity, the platform may be configured to provide substantially unlimited number of network discovery sessions. Such unlimited access of resources is conditioned on policy that limits and gates the real-time fulfillment of those requests. An account may have particular request rate limit and potentially a request cap. The request rate limit is a limit on the frequency with which a request may be met. A request cap may be a hard limit on the number of requests in given time period. Any suitable limits may be set.

Requests can preferably be queued in different scopes. Requests may be queued within account, across accounts, across sub-accounts, for a particular instance configuration, across requests associated with a region, or with any suitable scope. Within an account, requests associated with that account that cannot be immediately serviced are added to a queue.

Individual items in the queue may be treated uniformly for a first in first out heuristic. Alternatively, queued items may receive prioritization such that dequeuing of an item is balanced against the relative priority of that item to other items. Item prioritization may additionally account for amount of time queued.

Across accounts, multiple accounts may be queued so servicing requests is balanced across accounts. In one implementation a single queue is used to manage requests of a set of accounts. Alternatively, a set of queues for each account is used, and a queue popper will selectively cycle through the account queues to select an request for servicing. There can additionally be multiple queue poppers such that multiple items can be selected simultaneously. Dequeuing across a set of queues may use various fair dequeuing heuristics such as a round robin heuristic, weighted dequeuing heuristic, or any suitable rotation dequeuing heuristic.

In queuing network discovery requests, the requests may be queued at various stages. Preferably network discovery includes the two modes of network discovery of STUN and TURN. STUN is a non-resource intensive mode of network discovery wherein the communication stream is not facilitated by a resource for the duration of the stream. Accordingly, establishing a communication stream through STUN may initially be attempted and if unsuccessful, then the request may be queued prior to attempting TURN.

Queuing may be cooperative with the dynamic allocation of resources. In one variation, analytics are collected over the set of managed network discovery queue and are used in calculating and predicting resource requirements, which are addressed by dynamically allocating resources. In an alternative variation, the dynamic allocation and usage demand on the platform can alter the queuing behavior. Request dequeuing rates of a queue can be reduced when sufficient resources are available, and similarly, the dequeuing rates may be increased when resources are constrained. The queuing can provide a temporary solution while resources are allocated. A target steady state dequeuing rate may be set as a target which balances the cost of running resources in standby and adequately servicing requests in a timely manner.

Detecting illicit use of the platform functions to provide fraud detection and anomaly prevention. Detecting illicit use can identify event patterns that have match an illicit behavior pattern. In one variation, detecting illicit operations can include correlating actions of two entities through shared profile information such as payment information, billing address, machine addresses, or any suitable identifiable information. In one example an illicit usage pattern can include detecting when multiple distinct accounts share the same credit card for billing.

Upon detecting an illicit usage pattern, the associated subset of usage can be limited. Limiting usage can include preventing future interactions, ending current sessions, throttling or reducing the servicing rate or the bandwidth, feature limitations (e.g., preventing recording or transcoding or TURN network discovery) or taking any direct action towards minimizing the effects of the illicit usage. Alternatively, the illicit usage pattern can trigger notifying an associated party. For example, initially, an account manager may receive an email alerting the account holder to the illicit usage pattern. If the illicit behavior continues, the account can be suspended.

The illicit usage pattern can be associated with a subset of usage within a scope. In one variation, the illicit usage pattern can be associated with usage by a sub-account of a parent account. Accordingly, the method can include associating the usage within the sub-account and not with the whole account. In other words, other sub-accounts that are not involved in the usage are not affected. In another variation, ephemeral credentials generated in connection with IP addresses in a particular geographic region may be associated with the illicit usage pattern. Ephemeral credentials may be temporarily blocked or otherwise limited for that geographic region.

Detecting illicit usage patterns can additionally include detecting abuse of the communication stream. For example, if a communication stream is registered as audio but is used to transmit video then action may be taken.

Interfacing with at least a second micro-media service which functions to integrate with other micro-services. A second micro-media service is preferably a media service, but the second micro-media service may additionally be a signaling micro-service. Interfacing with a second micro-service enables additional functionality to be added while providing a network discovery service. A media-service can preferably be added when the network discovery processes results to using TURN or an alternative network discovery approach wherein at least one resource of the platform is an intermediary node in the media communication stream. The additional micro-services can include transcoding, recording, media intelligence, transcription, text-to-speech, or any suitable service that alters or uses the media. The media micro-services preferably act on the media by consuming media, augmenting/mutating media, processing media.

A media service can mutate the media stream wherein the media stream is transformed for one or both endpoints. For example, a transcoding media service can translate the media between a codec of a first endpoint and a second codec of a second endpoint. Transcoding, mixing, filtering, changing media resolution or medium, or other mutable services may be used.

As an example, a transcoding media server may convert between various codecs such as Speex used in mobile operating system applications (e.g., iOS and Android), Opus used in web and WebRTC applications, and PCMU used in PSTN and other media services. Any suitable codec or media transformation may alternatively be performed. A transcoding media service can additionally translate between media mediums such as converting a pure audio stream to a video stream or pulling the audio from a video into an audio stream.

Figure 21A:
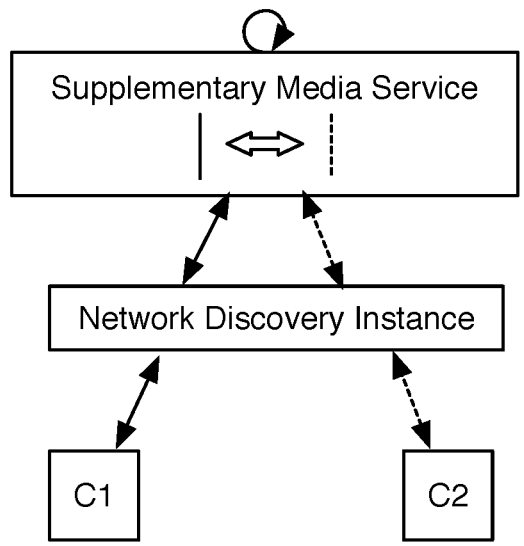
FIGS. 21A and 21B are schematic representations of interfacing with a second media service for synchronous media mutation.
Figure 21B:
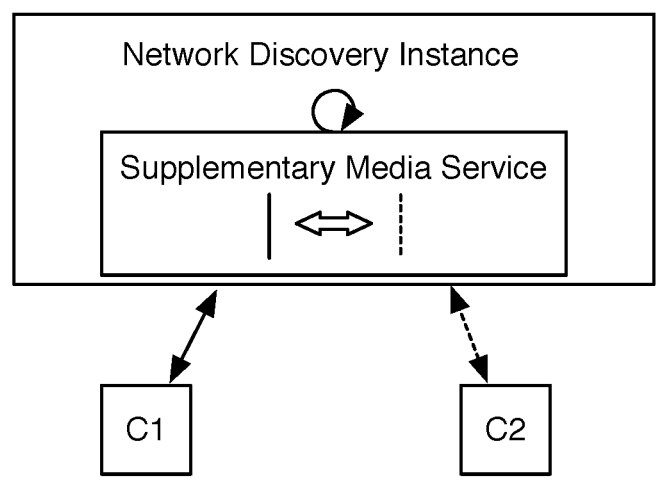

A media service synchronously mutating the media stream can include routing the media to an additional resource of the platform such as a transcoding server as shown in FIG. 21A. Alternatively, the network discovery server instance can include a media service module that can be selectively activated as shown in FIG. 21B.

Figure 22:
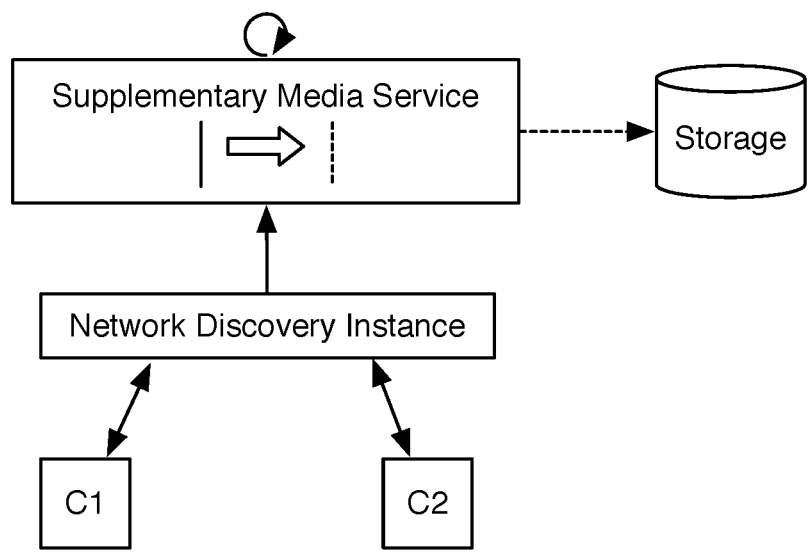
FIG. 22 is a schematic representation of interfacing with a second media service for asynchronous media mutation.

A media service can alternatively asynchronously mutate the media stream. The media is preferably processed and a transformed media representation is outputted in a time frame out of sync with substantial real-time communication. For example, asynchronous media mutation may require five seconds or more of processing. A second leg of the media stream is preferably delivered to the asynchronous media service, which processes and stores a processed version as shown in FIG. 22.

A media service can act on the media stream as an immutable stream, wherein the media is observed but not transformed. Such a processing media service can include transcription, recording, media intelligence, and other media processing operations. The media may be stored for asynchronous processing wherein the processing is completed substantially not in real time with the communication session. The media may be alternatively synchronously processed to provide real-time information. For example, a real-time transcription service may provide speech to text transcription. Multiple micro-services can be used in combination in building a communication application. Media intelligence can be apply different audio or video processing to extract information from the content. For example, speaker sentiment may be detected and logged. Voice recognition or speaker recognition can additionally be a media intelligence service. Video media may allow object detection and tracking may be another exemplary media intelligence service.

A second micro-service is preferably invoked in response to some directive. The directive may be pre-set in the network discovery instance configuration. For example, an account holder may set all network discovery sessions to also record the communication stream. Configuration directives provide a base default for a particular entity. In another variation, a micro-service can be invoked by including a directive in the request or other suitable signaling message. In this variation, an application can selectively invoke a micro-service asynchronously through an API request. The API request is preferably received during a network discovery session and preferably supplies an identifier of the network discovery session. That identifier may be a unique identifier such as a session identifier, but the identifier may alternatively apply to multiple sessions such as an identifier of all sessions for a particular account, endpoint, or other suitable identifier or identifiers.

Block A160, which includes servicing the network discovery session for the set of requests, which functions to execute the process of network discovery in accordance. The servicing of the network discovery session is preferably performed in accordance with platform and entity configuration and may be executed in coordination with the service management processing of block A150. Network discovery preferably includes the signaling negotiation to establish a communication stream, and more preferably a media communication stream, between at least two entities. The network discovery process can use STUN/TURN approach, and, in one variation, the method will include selectively engaging STUN or TURN functionality.

A STUN service preferably flows from the request of Block A120. The request is preferably a binding request received from a client over a network connection (e.g., the public network). The network discovery service preferably detects and responds with a success response that contains as payload the IP address and port of the client as observed from the perspective of the server. The payload can be obfuscated to avoid IP address translation by a NAT. UDP can be used as a transport protocol and used along side application-controlled retransmissions for reliability. The communication can additionally be transported in an encryption secured form such as TLS. Alternatively, communication can be of any suitable format. The client device can use the discovered public IP and Port of a device in coordinating and communicating with another client. The public address can be shared with additional peer clients to establish a communication. In one variation, both clients may make use of the STUN service in discovering their respective public addresses, such as when both are behind a NAT. Other approaches to external address discovery may alternatively be used such as Interactive Connectivity Establishment (ICE) approach. When STUN is sufficient for the communication path of a desired communication, the clients will use the external address information to establish a communication stream outside of the platform such as through UDP hole punching.

A STUN service is preferably used in facilitating a service discovery when the service management processing does not necessitate communication session visibility. When session monitoring or session interaction is specified in the instance configuration, then TURN operations are engaged. However, when there is no direction for in-session interactions, then STUN peer-to-peer communication negotiation can be preliminarily attempted.

In some cases STUN-based negotiations are not suitable for the network discovery session. In one variation, STUN-based negotiations cannot establish a communication stream based on the networking topology and conditions. For example, STUN-based negotiations can prove insufficient if the NAT is a symmetric NAT. In another variation, the service management processing goals conflict with establishing a communication stream fully external to a node of the platform (i.e., the media stream does not pass through the platform). A TURN-based negotiation can be used when a STUN-based negotiation is not used.

Traversal Using Relays around NAT (TURN) is a protocol that enables clients behind a NAT or firewall to receive incoming data over TCP, UDP or other suitable connections. The TURN-based negotiations of the method can enable clients to receive data as well as send by utilizing an intermediary media routing proxy hosted in the platform. The TURN negotiation preferably includes receiving a request from a client, such as during A120. The request is preferably an Allocate request. The platform preferably allocates resources on behalf of the client for contacting a peer. The amount of resources can be determined based on the media type specified in the request, the restrictions or configuration of the account, or by other suitable policy directives. Resources can additionally be dynamically allocated according to the characterization of the requesting account/sub-account (e.g., based on typical usage for a given application). An allocation request may be queued as described above until sufficient resources are available. If allocation is allowed and successful, an "Allocation Successful" response is relayed to the client. The "Allocation Successful" response has a payload includes the transport address of the allocated resources of the TURN server. The transport address may alternatively be delivered in any suitable message. The TURN negotiation process can then proceed in creating permissions with the TURN server resources. The peer client can be contacted; data is sent to the TURN server and permissions can be verified. Data can be sent with a send mechanism or a channel bind mechanism. Other suitable TURN-based operations can similarly be applied. In one variation, the STUN and TURN negotiations can conform to STUN and TURN protocols, and supplemental functionality and instance management is transparently applied for a given account. Alternatively, deviations of the STUN/TURN protocols or alternative network discovery protocols can be used.

6. Multi-Tenant Micro-Service Media Communication Platform System

Figure 24A:
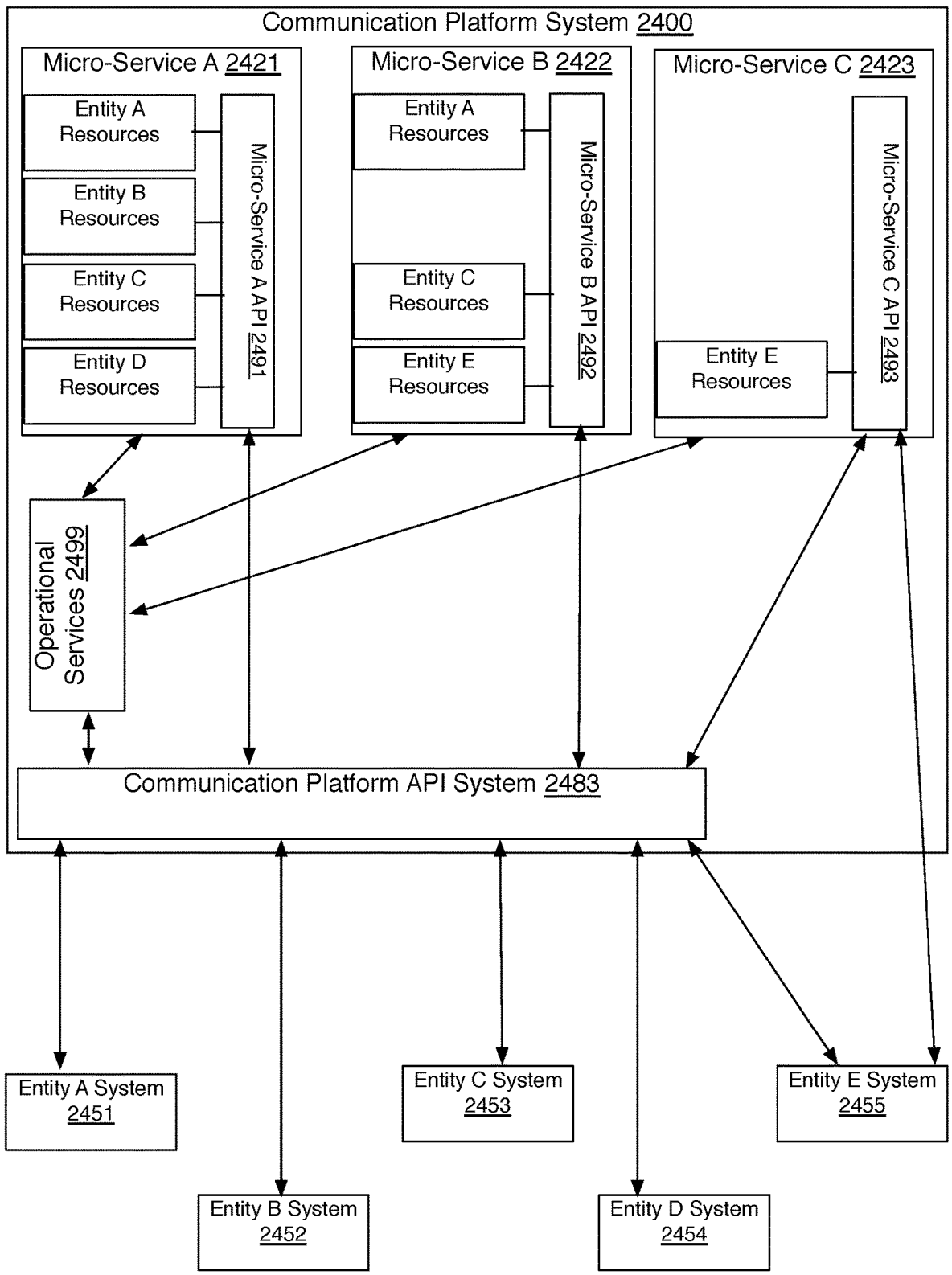
FIGS. 24A and 24B are schematic representations of a system of a preferred embodiment.

FIG. 24A is a schematic representation of a multi-tenant media communication platform system 2400 that includes one or more media communication micro-services (e.g., 2421-2423). The system 2400 is a multi-tenant system that includes plural entities (e.g., entities of the systems 2451-2455 of FIG. 24A). In some embodiments, entities include one or more of accounts, sub-accounts, organizations, users and service instances. In some implementations, each service instance includes platform configuration of the platform system 2400 for an application of an account (or sub-account) of the platform system 2400. For example, an account holder of a platform account can have multiple applications that use the platform system 2400, each application of the account holder having a separate service instance that includes platform configuration. In some embodiments, each entity is independently configurable, and the system 2400 manages configuration for each configured entity. In some embodiments, entity configuration at the system 2400 includes configuration for one or more micro-services of the system 2400. In some embodiments, entity configuration is received from an external system of a corresponding entity via an account management interface (e.g., an account portal user interface, an account management API, and the like). In some implementations, entity configuration includes configuration as described herein for FIGS. 1-23. In some implementations, entity configuration includes configuration as described herein for FIGS. 1, 2, 13, 15 and 16. In some implementations, entity configuration is stored at the system 2400. In some implementations, entity configuration is stored at a remote data storage device that is external to the system 2400.

In some embodiments, the system 2400 generates one or more micro-services resources for a configured entity.

As depicted in FIG. 24A, the communication platform system 2400 includes micro-services 2421-2423, operational services 2499, and a communication platform API system 2483.

Communication Platform System

In some embodiments, the system 2400 is a multi-tenant peer-to-peer real-time media communication platform system. In some embodiments, the system 2400 is a multi-tenant peer-to-peer asynchronous media communication platform system. In some embodiments, the system 2400 is a multi-tenant peer-to-peer synchronous media communication platform system. In some embodiments, the system 2400 is constructed to provide one or more media communication micro-services.

In some embodiments, each media communication micro-service (e.g., 2421-2423) provides at least one media process for a synchronous media stream. In some embodiments, the synchronous media stream is a synchronous media stream between two synchronous media communication endpoints. In some embodiments, the two synchronous media communication endpoints communicate via a media communication channel that is established between the two endpoints. In some embodiments, the synchronous media stream is a synchronous media stream that is broadcasted to at least one synchronous media communication endpoint. In some embodiments, a broadcasting media communication endpoint broadcasts the synchronous media stream to each destination media communication endpoint via at least one media communication channel that is established between the broadcasting endpoint and at least one destination endpoint.

The micro-services 2421-2423 include one or more of signaling micro-services (e.g., network discovery services, such as STUN/TURN services) and media micro-services (e.g., a transcoding micro-service, a recording micro-service, a mixing micro-service, a conferencing micro-service, a media intelligence micro-service, a text-to-speech micro-service, a speech detection micro-service, a notification micro-service, a call-progress micro-service, and the like). In some implementations, signaling micro-services of the platform system 2400 are similar to the micro-services of the signaling and control system 120 of FIG. 1. In some implementations, signaling micro-services of the platform system 2400 are similar to the STUN/TURN micro-services (STMS) of FIG. 13. In some implementations, media micro-services of the platform system 2400 are similar to the media micro-services of the media service system 110 FIG. 1. In some implementations, media micro-services of the platform system 2400 are similar to the media micro-services 1381 and 1382 of FIG. 13.

Figure 24B:
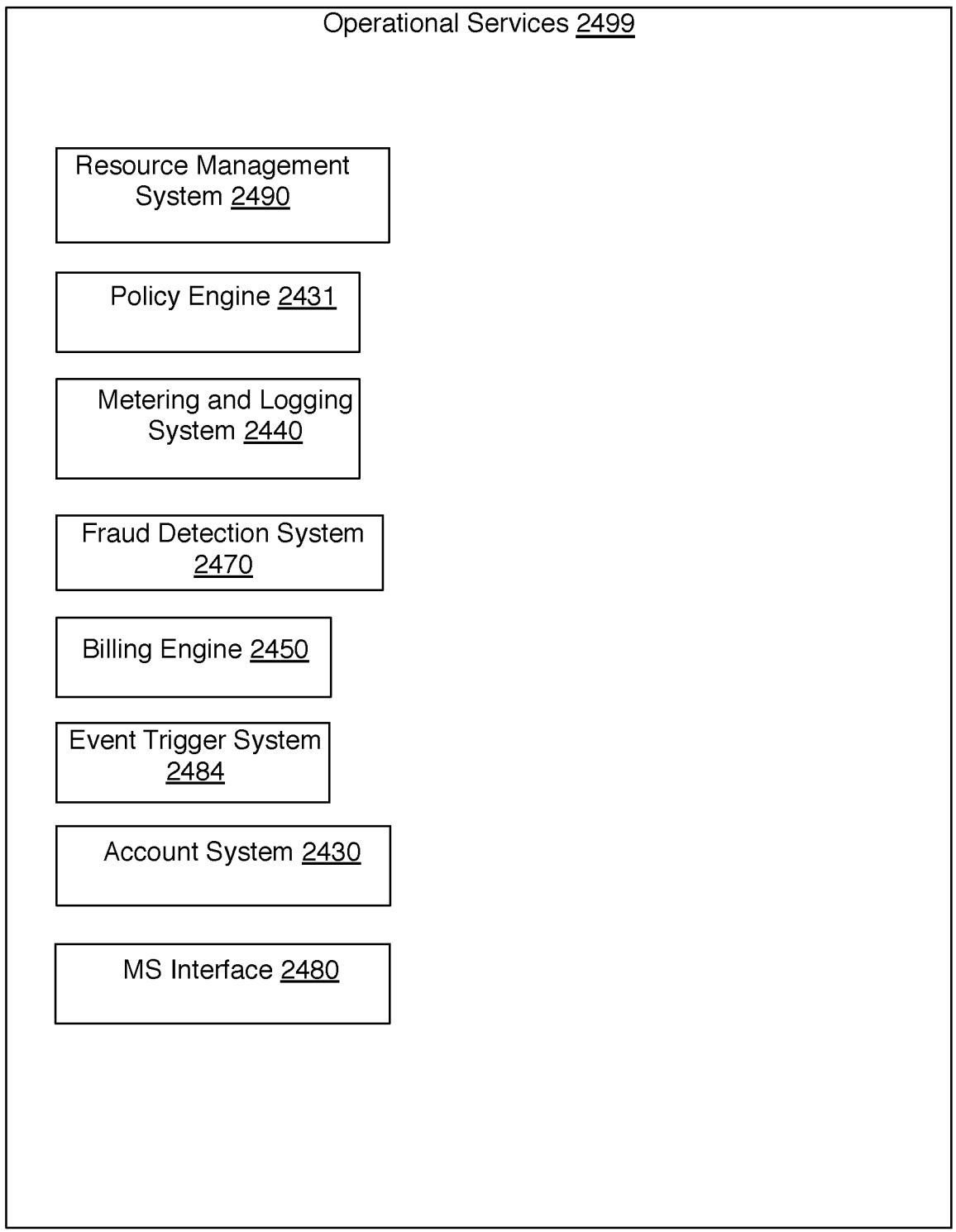

In some embodiments, the operational services 2499 include a resource management system 2490, a Micro-Service (MS) interface 2480, an account system 2430, a policy engine 2431, a metering and logging system 2440, a fraud detection system 2470, a billing engine 2450, and an Event Trigger System 2484, as depicted in FIG. 24B.

In some implementations, the resource management system 2490, the MS interface 2480, the account system 2430, the policy engine 2431, the metering and logging system 2440, the fraud detection system 2470, the billing engine 2450, the communication platform API system 2483, and the Event Trigger System 2484 are similar to the resource management system 1390, the MS interface 1380, the account system 1330, the policy engine 1331, the metering and logging system 1340, the fraud detection system 1370, the billing engine 1350, the API service 1383, and the Event Trigger System 1384 (respectively) of FIG. 13. In some implementations, the system 2400 includes a queueing system similar to the queueing system 1360 of FIG. 13.

In some implementations, one or more of the micro-services 2421-2423, are accessible by a system (e.g., Entity A system 2451, Entity B system 2452, Entity C system 2453, Entity D system 2454, and Entity E system 2455) that is external to the system 2400 and that is a system of an entity of the communication platform system 2400. In some implementations, one or more of the micro-services 2421-2423, are accessible by an external system of an entity via the API system 2483. In some implementations, one or more of the micro-services 2421-2423, are accessible by an external system of an entity via a micro-service API of the respective micro-service (e.g., micro-service A API 2491, micro-service B API 2492, micro-service C API 2493). In some implementations, an external system of an entity accesses one or more of the micro-services 2421-2423 by providing at least one signaling request to the system 2400 (e.g., via a signaling interface of the system 2400, a queueing system similar to the queueing system 1360 of FIG. 13, and the like).

In some implementations, one or more of the micro-services 2421-2423 are accessible by another micro-service of the system 2400. In some implementations, one or more of the micro-services 2421-2423 are accessible by another micro-service of the system 2400 via the MS interface 2480. In some implementations, one or more of the micro-services 2421-2423 are accessible by another micro-service of the system 2400 via the API service 2483. In some implementations, one or more of the micro-services 2421-2423 are accessible by another micro-service of the system 2400 via a respective micro service API (e.g., one of the APIs 2491-2493). In some implementations, one or more of the micro-services 2421-2423 are accessible by another micro-service of the system 2400 via a signaling request.

In some implementations, the system 2400 is similar to the system 100 of FIG. 1.

In some implementations, one or more of the micro-services 2421-2423 include RESTful API resources (e.g., Entity A Resources, Entity B Resources, Entity C Resources, Entity D Resources, and Entity E Resources as depicted in FIG. 24A), which act as endpoints that can act as a mechanism for specifying requested information or requesting particular actions. In some implementations, the resources are expressed as URI's or resource paths. In some implementations, the RESTful API resources are responsive to different types of HTTP methods such as GET, Put, POST and/or DELETE. In some implementations, each micro service API (e.g., one of the APIs 2491-2493) is a RESTful API.

In some implementations, one or more of the micro-services 2421-2423 include a process manager, an authentication layer, and a metering layer similar to the process managers, the authentication layers, and the metering layers (e.g., 1311-1313) of FIG. 13.

7. Multi-Tenant Micro-Service Media Communication Method

Figure 26:
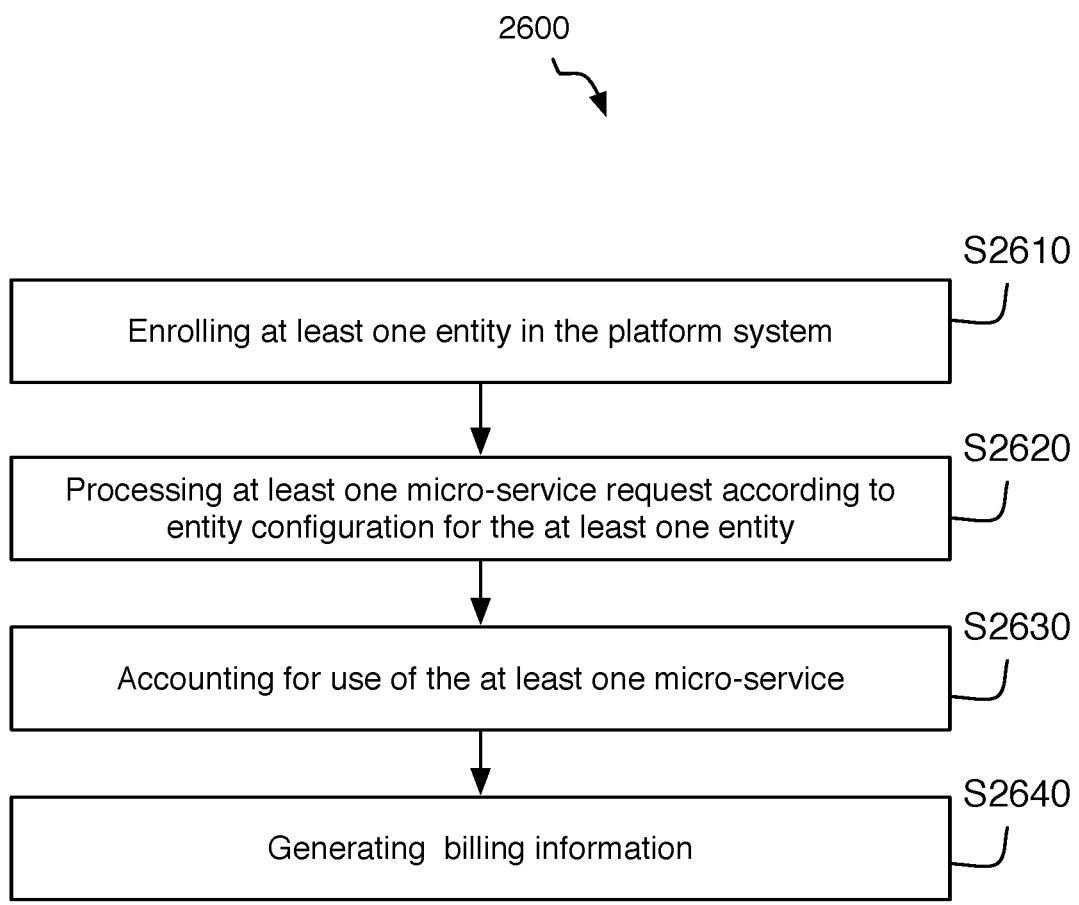
FIG. 26 is a block diagram representation of a method of a preferred embodiment.

As shown in FIG. 26, the method 2600 is performed at a multi-tenant media communication platform system (e.g., the system 2400 of FIG. 24) that includes a plurality of media communication micro-services (e.g., 2421-2423 of FIG. 24A) and micro-service configuration for a plurality of entities (e.g., the entities corresponding to the systems 2451-2455 of FIG. 24A) configured for use of the platform system (e.g., 2400). In some implementations, the micro-service configuration is managed by operational services of the platform system (e.g., the operational services 2499 of FIG. 24A). In some implementations, the micro-service configuration is managed by an account system of the platform system (e.g., the account system 2430 of FIG. 24B). In some implementations, the micro-service configuration is managed by a policy engine of the platform system (e.g., the policy engine 2431 of FIG. 24B). In some implementations, the micro-service configuration is managed by a respective micro-service of the platform system (e.g., 2421-2423 FIG. 24A).

The method 2600 includes: enrolling at least one entity in the platform system (process S2610); processing at least one micro-service request according to entity configuration for the at least one entity, the at least one micro-service request being a request for use of at least one micro-service of the platform system on behalf of the at least one entity (process S2620); accounting for use of the at least one micro-service on behalf of the at least one entity (process S2630); and generating billing information for the at least one entity based on the accounting for the use of the at least one micro-service on behalf of the at least one entity (process S2640).

Figure 25:
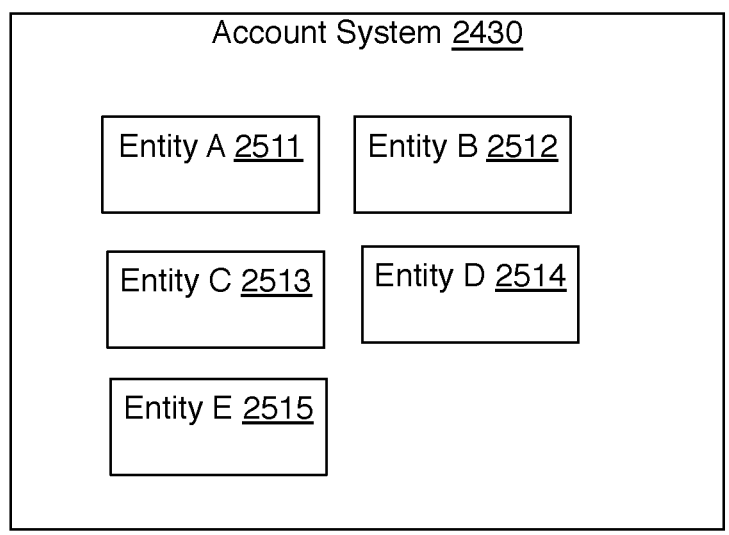
FIG. 25 is a schematic representation of an exemplary system of a preferred embodiment.

Enrolling at least one entity in the platform system (the process sS2610) includes setting entity configuration for use of the platform system 2400 by an entity (e.g., an entity of 2451-2455). In some implementations, entity configuration is managed by operational services of the platform system (e.g., the operational services 2499 of FIG. 24A). In some implementations, the entity configuration is managed by an account system of the platform system (e.g., the account system 2430 of FIG. 24B). FIG. 25 depicts exemplary account information 2511-2515 managed by the account system 2430 for Entity A, Entity B, Entity C, Entity D, and Entity E, respectively. In some implementations, the entity configuration is managed by a policy engine of the platform system (e.g., the policy engine 2431 of FIG. 24B). In some implementations, entity configuration related to a micro-service is managed by the micro-service (e.g., 2421-2423 FIG. 24A).

The plurality of entities include at least one of a platform account, sub-account, organization, user, and service instance. Entity configuration is received from at least one external system (e.g., 2451-2455) via an account management interface. In some implementations, the account management interface includes an account portal user interface provided by the platform system 2400. In some implementations, the account management interface includes an account management API provided by the platform system 2400 (e.g., an API provided by the API system 2483). Entity configuration for the entity includes micro-service configuration for use of at least one of the plurality of media communication micro-services (e.g., 2421-2423) by the entity (e.g., an entity of one of the systems 2451-2455). Micro-service configuration specifies at least one of: an endpoint mapping to at least one application logic URI of an external system (e.g., 2452-2455), an event callback URI of an external system (e.g., 2452-2455), and an event application logic URI of an external system (e.g., 2452-2455). The platform system 2400 includes at least one micro-service API resource (e.g., the resources depicted in FIG. 24A for micro-services 2421-2423) for each enrolled entity (e.g., "Entity A Resources", "Entity B Resources", "Entity C Resources", "Entity D Resources", "Entity E Resources".)

Use of the micro-service (e.g., 2421-2423) includes at least one computing resource of the platform system 2400 executing computer-readable instructions of the micro-service. The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

In some implementations, the two geographical regions are spatially separated by a globally significant transmission distance, as described herein.

In some implementations, a regionally distributed micro-service has computing resources in at least two geographic regions, and the platform system 2400 determines which of the computing resources to use to minimize communication latency for media communication that uses the regionally distributed micro-service. In some implementations, the platform system 2400 determines a region of at least one media communication endpoint of the media communication that uses the regionally distributed micro-service. In some implementations, the platform system 2400 determines computing resources of the regionally distributed micro-service that are located in a region that is located in the same region as the region of the endpoint or in a region that is nearest to the region of the endpoint. In some implementations, the platform system 2400 determines regional computing resources of the regionally distributed micro-service that result in less communication latency for communication with the endpoint, as compared with communication latency resulting from using computing resources in another region.

Multiple Micro-Services

In some implementations, entity configuration for the entity (e.g., the entities A-E depicted in FIGS. 24A and 25) includes micro-service configuration for use of two or more micro-services (e.g., 2421-2423) of the plurality of media communication micro-services by the entity. In some implementations, the micro-service configuration for use of the two or more micro-services includes configuration for independent use of the two or more micro-services. In some implementations, a first application of an entity uses a first micro-service and a second application of the entity uses a second micro-service, and the entity uses the first micro-service independently from the second micro-service. For example, a first application of an entity can use a signaling micro-service to establish media communication, and a second application of the entity can establish media communication without using the platform system 2400 but uses a media micro-service of the platform system 2400 to perform transcoding of media communication.

In some implementations, the micro-service configuration for use of the micro-services includes configuration for combined use of the micro-services. In some implementations, a first micro-service is combined with a second micro service (of the micro-services configured for the entity) by configuring at least one of an endpoint mapping, an event callback URI, and an event application logic URI of the first micro-service to specify the second micro-service.

In some implementations, the platform system combines the first micro-service with the second micro-service responsive to user input received via at least one one of the account portal user interface and an API of the platform system. The platform system combines the first micro-service with the second micro-service by generating micro-service configuration for the first micro-service that specifies the second micro-service in at least one of an endpoint mapping, an event callback URI, and an event application logic URI of the first micro-service.

In some implementations, an entity combines a signaling micro-service with another micro-service, such as, for example, a transcoding media micro-service and a transcription media micro-service (as described above for FIG. 14). The signaling micro-service establishes media communication between two media communication endpoints (e.g., Client 2a and Client 2b of FIG. 14). The signaling micro-service generates an event responsive to receipt of new media stream data by the signaling micro-service. The micro-service configuration for the signaling micro-service includes an event callback URI for the generated event that specifies a URI for the transcoding media micro-service (e.g., "/transcodingService/Accounts/{AccountSid}") for the new media stream data event. In some implementations, the event callback URI is scoped to the entity (e.g., by specifying an account ID of the entity that is managed by the account system 2430). In some implementations, the URI for the transcoding media micro-service specifies a resource (e.g., /Accounts/{AccountSid}) of the transcoding media micro-service that corresponds to an entity (e.g., the entity identified by "AccountSid", which is an account managed by the account system 2430) associated with the media communication. For example, in a case where the Micro-Service B 2422 of FIG. 24A is the transcoding media micro-service and the media communication is associated with Entity E, the URI for the transcoding media micro-service specifies the Entity E resources. Upon detection of the new media stream data event, by the event trigger system 2484, the new media stream data is relayed to the transcoding media micro-service via an API call to the event callback URI.

The transcoding media micro-service generates an event responsive to completion of media transcoding, and the micro-service configuration for the transcoding media micro-service includes an event callback URI for the generated event that specifies a URI for the signaling micro-service (e.g., "/SignalingService/Accounts/{AccountSid}") for the transcoding completion event. Upon detection of the transcoding completion event by the event trigger system 2484, the transcoded media is provided to the signaling micro-service via an API call to the event callback URI for the signaling micro-service. The micro-service configuration for the transcoding media micro-service also includes an event callback URI for the generated event that specifies a URI for the transcription micro-service (e.g., "/TranscriptionService/Accounts/{AccountSid}") for the transcoding completion event. Upon detection of the transcoding completion event by the event trigger system 2484, the transcoded media is provided to the transcription micro-service via an API call to the event callback URI for the transcription micro-service. In some implementations, each of the signaling micro-service, the transcription media micro-service and the transcoding media micro-service have different micro-service configuration. In some implementations, each of the signaling micro-service, the transcription media micro-service and the transcoding media micro-service have different billing profiles. In some implementations, each of the signaling micro-service, the transcription media micro-service and the transcoding media micro-service each have billing profiles (e.g., billing profiles similar to the billing profiles described herein for the billing engine 150 of FIG. 1).

In some implementations, use of the at least one micro-service includes use of a first micro-service and a second micro-service. In some implementations, a request to the first micro-service includes a data parameter that specifies use of the second micro-service. In some implementations, micro-service configuration for the first micro-service specifies use of the second micro-service. For example, micro-service configuration for a signaling micro-service can specify use of a media recording micro-service for media communication established by the signaling micro-service. In some implementations, use of the second micro-service is directed in response to an event in which the first micro-service calls out to an event application logic URI of an external application server to retrieve processing instructions, and the processing instructions retrieved via the event application logic URI direct the use of the second micro-service, the event application logic URI being configured for the event. In some implementations, the second micro-service is activated in response to an asynchronously received API request to a micro-service API resource of the first micro-service. For example, during a video chat session over a signaling micro-service, a REST API request is received by the platform 2400 that references an identifier for the video chat session, and directs a modification to media routing of the video chat session to include one or more media micro-services.

Regionally Distributed Micro-Services

In some implementations, entity configuration for the entity (e.g., the entities A-E depicted in FIGS. 24A and 25) includes micro-service configuration for use of two or more micro-services (e.g., 2421-2423) of the plurality of media communication micro-services by the entity, and the first micro-service is a regionally distributed micro-service. The regionally distributed micro-service has computing resources in at least two geographic regions, the platform system 2400 uses computing resources of the first micro-service that are of a geographic region that is nearest to a region of at least one media communication endpoint of media communication that uses the first micro-service. In some implementations, the first micro-service is a signaling micro-service and a second micro-service is a media micro-service. In some implementations, the platform system 2400 establishes media communication by using the signaling micro-service, and the established media communication is managed by using the media micro-service.

Media Communication

In some implementations, the media communication micro-services include at least one of: media communication micro-services that are constructed to provide peer-to-peer media communication; media communication micro-services that are constructed to provide peer-to-peer real-time media communication; and media communication micro-services that are constructed to provide real-time media communication.

In some implementations, media communication is asynchronous media communication, and asynchronous media communication includes messaging. In some implementations, media communication is synchronous media communication, and synchronous media communication includes at least one of voice and video communication.

Micro-Service Configuration

In some implementations, an endpoint mapping specifies a mapping of a telephony endpoint to the application URI of an external system (e.g., an external system 2451-2455 of FIG. 24A), each application URI is used by the platform system 2400 to retrieve application instructions from the external system (e.g., 2451-2455) associated with the application URI, and the platform system 2400 executes the retrieved instructions.

In some implementations, each event application logic URI is used by the platform system 2400 to retrieve instructions to be executed by the platform system 2400 responsive to detection of an event associated with the event application logic URI. The detection is performed by the platform system 2400.

In some implementations, each event callback URI is used by the platform system 2400 to notify the associated external system (e.g., 2451-2455) of detection of the event associated with the event callback URI by the platform system 2400.

In some implementations, each micro-service API resource (e.g., the entity resources depicted in FIG. 24A for micro-services 2421-2423) of the platform system 2400 provides at least one of: access to micro-service configuration of the micro-service for a corresponding entity; access to micro-service information of the micro-service for the corresponding entity; and use of the micro-service for the corresponding entity. In some implementations, each micro-service API resource (e.g., the entity resources depicted in FIG. 24A for micro-services 2421-2423) of the platform system 2400 provides at least one of: access to micro-service data of the micro-service for a corresponding entity; and access to micro-service media of the micro-service for the corresponding entity.

In some implementations, at least one micro-service API resource of the platform system is accessed by an external system via a public API (e.g., an API of the API system 2483 of FIG. 24A) provided by the platform system 2400.

In some implementations, responsive to detection of an event associated with an event callback URI by the platform system 2400 (e.g., by using the event trigger system 2484), the platform system 2400 provides event information to the external system (e.g., 2451-2455) associated with the event callback URI in a request to the event callback URI. In some implementations, the request to the event callback URI is an HTTP request.

In some implementations, each micro-service has different micro-service configuration. In some implementations, two or more micro-services have different micro-service configuration.

Accounting and Billing

In some implementations, accounting for micro-service usage of at least one micro-service (e.g., 2421-2423) configured for the entity (e.g., Entities A-E) includes: metering access of at least one configured micro-service API resource by the entity. In some implementations, the platform system 2400 accounts for micro-service usage by each entity independently. In some implementations, the platform system 2400 accounts for micro-service usage of each micro-service independently. In some implementations, the platform system 2400 performs billing for each entity based on the accounting of micro-service usage by each entity.

In some implementations, each micro-service has a different billing profile. In some implementations, at least two micro-services have different billing profiles. In some implementations, each micro-service has at least one billing profile (e.g., a billing profile similar to the billing profiles described herein for the billing engine 150 of FIG. 1). In some implementations, each micro-service has at least one billing profile for each entity configured for the micro-service (e.g., a billing profile similar to the billing profiles described herein for the billing engine 150 of FIG. 1). In some implementations, each micro-service has a billing profile for at least one entity configured for the micro-service.

In some implementations, each entity has a different billing profile. In some implementations, at least two entities have different billing profiles. In some implementations, each entity has at least one billing profile (e.g., a billing profile similar to the billing profiles described herein for the billing engine 150 of FIG. 1). In some implementations, each entity has a billing profile (e.g., a billing profile similar to the billing profiles described herein for the billing engine 150 of FIG. 1) for at least one micro-service configured for the entity.

In some implementations, the method 2600 is similar to the method 200 of FIG. 2. In some implementations, the process S2610 is similar to the process S210 of FIG. 2. In some implementations, the process S2610 is similar to the process S220 of FIG. 2. In some implementations, the process S2620 is similar to the process S230 of FIG. 2. In some implementations, the process S2630 is similar to the process S240 of FIG. 2. In some implementations, the process S2640 is similar to the process S240 of FIG. 2.

In some implementations, the method 2600 is similar to the method 1500 of FIG. 15. In some implementations, the process S2610 is similar to the process S1510 of FIG. 15. In some implementations, the process S2610 is similar to the process S1520 of FIG. 15. In some implementations, the process S2620 is similar to the process S1530 of FIG. 15. In some implementations, the process S2630 is similar to the process S1540 of FIG. 15. In some implementations, the process S2640 is similar to the process S1540 of FIG. 15.

In some implementations, the process S2610 is performed by the operational services 2499. In some implementations, the process S2610 is performed by the account system 2430. In some implementations, the process S2610 is performed by the account system 2430 and the policy engine 2431. In some implementations, the process S2610 is performed by two or more of the account system 2430, the policy engine 2431, and the MS interface 2480.

In some implementations, the process S2620 is performed by the operational services 2499. In some implementations, the process S2620 is performed by one or more of the account system 2430, the policy engine 2431, the MS interface 2480, the resource management system 2490, the event trigger system 2484, and the fraud detection system 2470.

In some implementations, the process S2630 is performed by the operational services 2499. In some implementations, the process S2630 is performed by one or more of the account system 2430, the policy engine 2431, the MS interface 2480, metering and logging system 2440 and the billing engine 2450. In some implementations, the process S2630 is performed by the account system 2430.

In some implementations, the process S2640 is performed by the operational services 2499. In some implementations, the process S2640 is performed by one or more of the account system 2430, the metering and logging system 2440 and the billing engine 2450. In some implementations, the process S2640 is performed by the billing engine 2450.

Additional Embodiments of the Method 2600

In some embodiments, the method 2600 includes: enrolling at least one entity in the platform system by setting entity configuration for use of the platform system by the at least one entity; processing at least one micro-service request according to the entity configuration for the at least one entity, the at least one micro-service request being a request for use of at least one micro-service of the platform system on behalf of the at least one entity; and accounting for the use of the at least one micro-service on behalf of the at least one entity. The entity configuration is received from at least one external system via an account management interface, the account management interface including a least one of an account portal user interface and an account management API. The entity configuration includes micro-service configuration for use of at least one of the plurality of media communication micro-services by the at least one entity, micro-service configuration specifying at least one of: an endpoint mapping to at least one application logic URI of an external system, and an event callback URI of an external system. The platform system includes at least one micro-service API resource for each enrolled entity.

In some implementations, entity configuration includes micro-service configuration for use of two or more micro-services. The micro-service configuration for use of the two or more micro-services includes configuration for combined use of the two or more micro-services. A first micro-service is combined with a second micro service of the two or more micro-services by configuring at least one of an endpoint mapping and an event callback URI of the first micro-service to specify the second micro-service.

In some implementations, the platform system combines the first micro-service with the second micro-service responsive to user input received via at least one of the account portal user interface and an API of the platform system. The platform system combines the first micro-service with the second micro-service by generating micro-service configuration for the first micro-service that specifies the second micro-service in at least one of an endpoint mapping and an event callback URI of the first micro-service.

In some implementations, use of the at least one micro-service includes at least one computing resource of the platform system executing computer-readable instructions of the at least one micro-service. The platform system includes at least one regionally distributed micro-service, the platform system including computing resources in at least two geographic regions for the at least one regionally distributed micro-service, the platform system determining computing resources for use of the at least one distributed micro-service based on a region of at least one media communication endpoint of media communication that uses the at least one regionally distributed micro-service. The first micro-service is a regionally distributed micro-service having computing resources in at least two geographic regions, and the platform system uses computing resources of the first micro-service that are of a geographic region that is nearest to a region of at least one media communication endpoint of media communication that uses the first micro-service.

In some implementations, accounting for micro-service usage of at least one micro-service configured for the at least one entity includes: metering access of at least one configured micro-service resource API by the at least one entity. In some implementations, the platform system accounts for micro-service usage by each entity independently. In some implementations, the platform system accounts for micro-service usage of each micro-service independently, and the platform system performs billing for each entity based on the accounting of micro-service usage by each entity. In some implementations, a first micro-service is a signaling micro-service and a second micro-service is a media micro-service, and the platform system establishes media communication by using the signaling micro-service, and the established media communication is managed by using the media micro-service.

In some implementations, the plurality of entities include at least one of a platform account and a platform sub-account.

In some implementations, the method 2600 includes generating billing information for the at least one entity based on the accounting for the use of the at least one micro-service on behalf of the at least one entity. In some implementations, the method 2600 includes notifying the at least one entity based on the accounting for the use of the at least one micro-service on behalf of the at least one entity. In some implementations, the method 2600 includes performing fraud detection for the at least one entity based on the accounting for the use of the at least one micro-service on behalf of the at least one entity.

In some implementations, use of the at least one micro-service includes: operating on media of media communication of the at least one entity.

In some implementations, operating on media of media communication of the at least one entity includes: mutably operating on the media by modifying the media. In some implementations, the at least one micro-service is a synchronous media micro-service, such as, for example, a transcoding micro-service. In some implementations, the at least one micro-service is an asynchronous media micro-service, such as, for example, a media redacting micro-service, a micro-service constructed to remove silence from a recording, and the like. In some implementations, the media redacting micro-service functions to remove elements of the media that are sensitive. In some implementations, the media redacting micro-service functions to automatically detect a pattern in the media and apply censorship to a portion of the media that corresponds to the pattern. For example, the media redacting micro-service functions can be constructed to automatically detect at least one of credit card numbers, social security numbers, account numbers, addresses, and other suitable forms of information in the media and automatically remove such detected information from the media.

In some implementations, operating on media of media communication of the at least one entity includes: immutably operating on the media by preserving the media. In some implementations, the at least one micro-service is a synchronous media micro-service, such as, for example, a real-time speech detection media micro-service. In some implementations, the at least one micro-service is an asynchronous media micro-service, such as, for example, a speech to text micro-service, an emotion detection micro-service, and the like.

8. Signaling Micro-Service

In some embodiments, at least one of the micro-services 2421-2423 of FIG. 24A is a signaling micro-service, such as, for example, a network discovery micro-service. In some implementations, the signaling micro-service is similar to the STUN/TURN micro-services (STMS) of FIG. 13.

Figure 27:
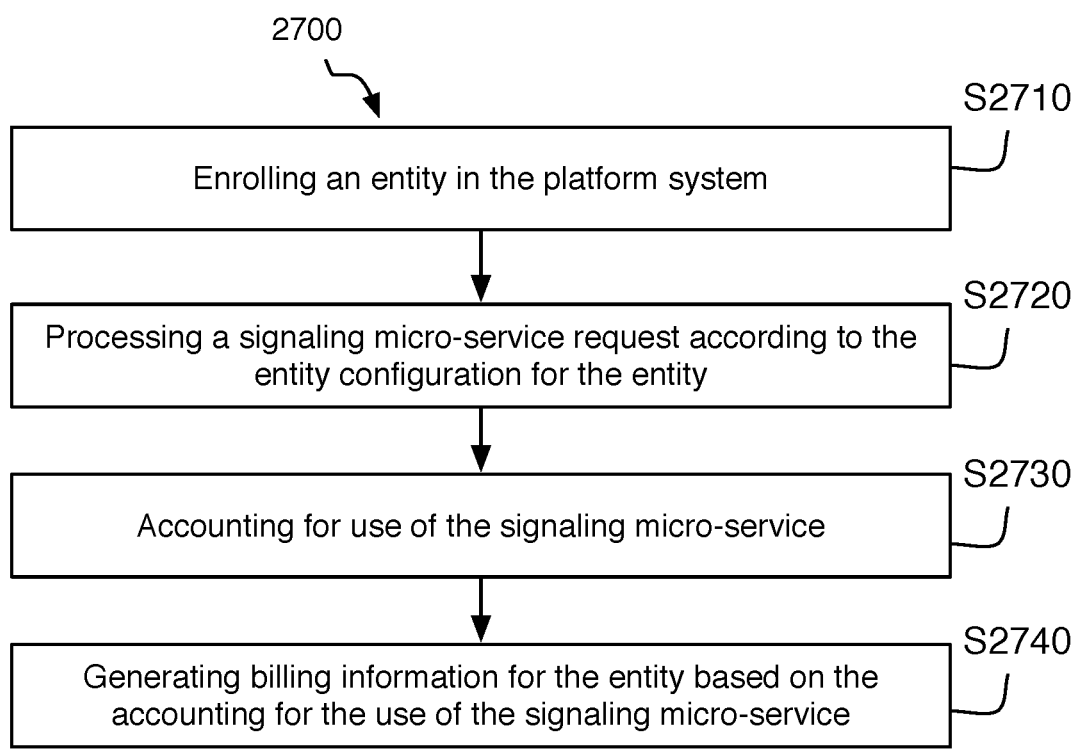
FIG. 27 is a block diagram representation of a method of a preferred embodiment.

FIG. 27 depicts a signaling micro-service method 2700 that is performed at a multi-tenant media communication platform system (e.g., the system 2400 of FIG. 24) that includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services include at least one signaling micro-service. In some implementations, the signaling micro-service configuration is managed by operational services of the platform system (e.g., the operational services 2499 of FIG. 24A). In some implementations, the signaling micro-service configuration is managed by an account system of the platform system (e.g., the account system 2430 of FIG. 24B). In some implementations, the signaling micro-service configuration is managed by a policy engine of the platform system (e.g., the policy engine 2431 of FIG. 24B). In some implementations, the signaling micro-service configuration is managed by the signaling micro-service of the platform system (e.g., 2421-2423 FIG. 24A).

The method 2700 includes: enrolling an entity in the platform system, enrolling the entity comprising setting entity configuration for use of the signaling micro-service by the entity (process S2710); processing a signaling micro-service request according to the entity configuration for the entity, the signaling micro-service request being a request for use of the signaling micro-service on behalf of the entity (process S2720); accounting for the use of the signaling micro-service on behalf of the entity (process S2730); and generating billing information for the entity based on the accounting for the use of the signaling micro-service on behalf of the entity (process S2740).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the signaling micro-service by the entity. The micro-service configuration for the signaling micro-service specifies at least one of: an endpoint mapping to at least one application logic URI of an external system, an event callback URI of an external system, and an event application logic URI of an external system. The platform system includes at least one signaling micro-service API resource for the enrolled entity.

The use of the signaling micro-service includes at least one computing resource of the platform system 2400 executing computer-readable instructions of the signaling micro-service. The signaling micro-service is a regionally distributed micro-service, and the platform system 2400 includes computing resources in at least two geographic regions for the signaling micro-service. The platform system determines (e.g., by using the resource management system 2490) computing resources for use of the signaling micro-service based on a region of at least one media communication endpoint of media communication that uses the signaling micro-service.

Multiple Micro-Services

In some implementations, the signaling micro-service is configured for media communication that passes through the platform system 2400. Entity configuration for the entity includes the signaling micro-service configuration and micro-service configuration for use of a media micro-service by the entity. The media micro-service is a micro-service of the plurality of micro-services of the media communication platform system 2400.

In some implementations, the signaling micro-service and the media micro-service are configured to be used independently.

In some implementations, the signaling micro-service and the media micro-service are configured to be used in combination. In some implementations, the signaling micro-service is combined with the media micro-service by configuring at least one of an endpoint mapping, an event callback URI, and an event application logic URI of the signaling micro-service to specify the media micro-service. In some implementations, the platform system 2400 combines the signaling micro-service with the media micro-service responsive to user input received via at least one of the account portal user interface and an API of the platform system 2400, the platform system 2400 combining the signaling micro-service with the media micro-service by generating micro-service configuration for the signaling micro-service that specifies the media micro-service in at least one of: an endpoint mapping, an event callback URI; an event application logic URI of the signaling micro-service.

In some implementations, use of the signaling micro-service includes combined use of the signaling micro-service with a media micro-service. In some implementations, a request to the signaling micro-service includes a data parameter that specifies use of the media micro-service. In some implementations, micro-service configuration for the signaling micro-service specifies use of the media micro-service. For example, micro-service configuration for the signaling micro-service can specify use of a media recording micro-service for media communication established by the signaling micro-service. In some implementations, use of the media micro-service is directed in response to an event in which the signaling micro-service calls out to an event application logic URI of an external application server to retrieve processing instructions, and the processing instructions retrieved via the event application logic URI direct the use of the second micro-service, the event application logic URI being configured for the event. In some implementations, the media micro-service is activated in response to an asynchronously received API request to a micro-service API resource of the signaling micro-service. For example, during a video chat session over the signaling micro-service, a REST API request is received by the platform 2400 that references an identifier for the video chat session, and directs a modification to media routing of the video chat session to include one or more media micro-services.

Signaling Micro-Service Configuration

In some implementations, each signaling micro-service API resource of the platform system provides at least one of: access to micro-service configuration of the signaling micro-service for a corresponding entity; access to signaling micro-service information of the micro-service for the corresponding entity; and use of the signaling micro-service for the corresponding entity. In some implementations, each signaling micro-service API resource of the platform system provides at least one of: access to micro-service data of the signaling micro-service for a corresponding entity; and access to signaling micro-service media of the micro-service for the corresponding entity.

Regionally Distributed Signaling Micro-Service

In some implementations, the signaling micro-service is a regionally distributed micro-service having computing resources in at least two geographic regions. The platform system 2400 uses computing resources of the signaling micro-service that are of a geographic region that is nearest to a region of at least one media communication endpoint of media communication that uses the signaling micro-service. In some implementations, the platform system 2400 establishes media communication by using the signaling microservice, and the established media communication is managed by using a media micro-service.

STUN/TURN

In some implementations, the signaling micro-service is a STUN/TURN service, and the signaling micro-service is configured to use TURN for the media communication. In some implementations, the at least one signaling micro-service API resource for the enrolled entity includes at least a TURN service token instance resource that is used by the entity to access a TURN service token for using the signaling micro-service for media communication that passes through the platform system. In some implementations, in a case wherein the signaling micro-service configuration specifies at least one of communication session monitoring and communication session interaction, the signaling micro-service is configured for media communication that passes through the platform system 2400.

Accounting and Billing

In some implementations, accounting for the use of the signaling micro-service on behalf of the entity includes accounting based on at least one of: a number of network discovery attempts, time of media streaming, and data transfer of media streaming. In some implementations, generating billing information includes generating billing information based on modality of a communication stream of the media communication, wherein audio streaming is billed differently from video streaming. In some implementations, generating billing information includes generating billing information based the type of media being communicated. In some implementations, the platform system 2400 uses the billing engine 2450 to generate different billing information for different types of media communication, such as for example, video communication, audio communication, photo communication, and the like.

Implementations of the Method 2700

In some implementations, the method 2700 is similar to the method 2600.

In some implementations, setting entity configuration (e.g., the process S2710) is performed as described herein for block A110 of FIG. 16. In some implementations, micro-service configuration for the signaling micro-service includes allocating mappings as described herein for block A110 of FIG. 16 and mapping requests to the entity as described herein for block A130 of FIG. 16. In some implementations, processing a signaling micro-service request (e.g., the process S2720) includes initiating a network discovery session as described herein for block A120 of FIG. 16.

In some implementations, accounting for use of the signaling micro-service (e.g., the process S2730) includes monitoring usage as described herein for block A140 of FIG. 16.

In some implementations, the method 2700 includes the platform system 2400 applying service management processing to the signaling micro-service request as described herein for block A150 of FIG. 16. In some implementations, the method 2700 includes the platform system 2400 servicing a network discovery session for the signaling micro-service request as described herein for block A160 of FIG. 16.

In some implementations, the method 2700 is similar to the method 2600 of FIG. 26. In some implementations, the process S2710 is similar to the process S2610 of FIG. 26. In some implementations, the process S2720 is similar to the process S2620 of FIG. 26. In some implementations, the process S2730 is similar to the process S2630 of FIG. 26. In some implementations, the process S2740 is similar to the process S2640 of FIG. 26.

In some implementations, the method 2700 is similar to the method 1600 of FIG. 16. In some implementations, the process S2710 is similar to the process A110 of FIG. 16. In some implementations, the process S2710 is similar to the process A130 of FIG. 16. In some implementations, the process S2720 is similar to the process A120 of FIG. 16. In some implementations, the process S2720 is similar to the process A130 of FIG. 16. In some implementations, the process S2730 is similar to the process A140 of FIG. 16. In some implementations, the process S2720 includes processing similar to the process A150 of FIG. 16. In some implementations, the process S2720 includes processing similar to the process A160 of FIG. 16.

Additional Embodiments of the Method 2700

In some embodiments, the method 2700 includes: enrolling an entity in the platform system by setting entity configuration for use of the signaling micro-service by the entity; processing a signaling micro-service request according to the entity configuration for the entity, the signaling micro-service request being a request for use of the signaling micro-service on behalf of the entity; and accounting for the use of the signaling micro-service on behalf of the entity. The platform system includes at least one signaling micro-service API resource for the entity.

Use of the signaling micro-service includes: determining one of a network address discovery process and a media relay process for performing signaling negotiation to establish a communication stream; in a case where the network address discovery process is determined, servicing a network discovery session to discover a public IP address for establishing the communication stream, the communication stream being a peer-to-peer communication stream; and in a case where the media relay process is determined, servicing a media relay session to bridge media of the communication stream between at least two media communication endpoints of the communication stream.

In some implementations, servicing a network discovery session includes: performing STUN signaling negotiation to establish a peer-to-peer media communication session, and the communication stream is communicated via the established peer-to-peer media communication session. In some implementations, servicing a network discovery session further includes maintaining a signaling connection to the peer-to-peer media communication session at the multi-tenant media communication platform system. In some implementations, performing STUN signaling negotiation includes performing a network address discovery service that enables the discovery of public IP address to be used in P2P communication.

In some implementations, servicing a media relay session includes: performing TURN signaling negotiation to establish a media communication session, and routing media of the communication session through the signaling micro-service. In some implementations, performing TURN signaling negotiation includes performing a media relay service which provides an accessible, intermediary media router to bridge media streams between a set of participants wherein at least one of the participants is unavailable. In some implementations, routing media of the communication session through the signaling micro-service includes routing the media of the communication session to a supplementary media service of the communication platform system. In some implementations, the supplementary media service is a media micro-service. In some implementations, the supplementary media service is a media service of the signaling micro-service. In some implementations, the supplementary media service is provided by a media service module that is included in the signaling micro-service, and wherein the supplementary media service is selectively activated.

In some implementations, the entity configuration includes signaling micro-service configuration for use of the signaling micro-service by the entity, micro-service configuration specifying at least one of: an endpoint mapping to at least one application logic URI of an external system, and an event callback URI of an external system. In some implementations, the entity configuration is received from at least one external system via an account management interface, the account management interface including a least one of an account portal user interface and an account management API.

In some implementations, entity configuration for the entity includes the signaling micro-service configuration and micro-service configuration for use of a media micro-service by the entity, the media micro-service being a micro-service of the plurality of micro-services of the media communication platform system. The signaling micro-service is combined with the media micro service by configuring at least one of an endpoint mapping and an event callback URI of the signaling micro-service to specify the media micro-service.

In some implementations, the platform system combines the signaling micro-service with the media micro-service responsive to user input received via at least one of the account portal user interface and an API of the platform system. The platform system combines the signaling micro-service with the media micro-service by generating micro-service configuration for the signaling micro-service that specifies the media micro-service in at least one of an endpoint mapping and an event callback URI of the signaling micro-service.

In some implementations, use of the signaling micro-service comprises at least one computing resource of the platform system executing computer-readable instructions of the signaling micro-service. The signaling micro-service is a regionally distributed micro-service, the platform system including computing resources in at least two geographic regions for the signaling micro-service. The platform system determines computing resources for use of the signaling micro-service based on a region of at least one media communication endpoint of media communication that uses the signaling micro-service.

In some implementations, the signaling micro-service API resource provides at least one of: access to signaling micro-service configuration; access to signaling micro-service information; access to micro-service data; access to signaling micro-service media; and use of the signaling micro-service. In some implementations, the signaling micro-service API resource is accessed by an external system via a public API provided by the platform system.

In some implementations, accounting for the use of the signaling micro-service comprises: metering access of the signaling micro-service resource by the entity. In some implementations, the platform system accounts for signaling micro-service usage by each entity independently. In some implementations, the platform system performs billing for each entity based on the accounting of signaling micro-service usage by each entity.

In some implementations, a request to the signaling micro-service includes a data parameter that specifies use of a media micro-service. In some implementations, signaling micro-service configuration for the signaling micro-service specifies use of a media micro-service. In some implementations, use of a media micro-service is directed in response to an event in which the signaling micro-service calls out to an event application logic URI of an external application server to retrieve processing instructions, and the processing instructions retrieved via the event application logic URI direct the use of the media micro-service, the event application logic URI being configured for the event. In some implementations, a media micro-service is activated in response to an asynchronously received API request to a signaling micro-service API resource of the signaling micro-service.

In some implementations, the plurality of entities include at least one of a platform account and a platform sub-account.

In some implementations, the method includes generating billing information for the entity based on the accounting for the use of the signaling micro-service on behalf of the entity. In some implementations, the method includes notifying the entity based on the accounting for the use of the signaling micro-service on behalf of the entity. In some implementations, the method includes performing fraud detection for the entity based on the accounting for the use of the signaling micro-service on behalf of the entity.

In some implementations, the supplementary media service mutably operates on the media by modifying the media. In some implementations, the mutable supplementary media service is a synchronous media service, such as, for example, a transcoding media service. In some implementations, the mutable supplementary media service is an asynchronous media service such as, for example, a media redacting service.

In some implementations, the supplementary media service immutably operates on the media on the media by preserving the media. In some implementations, the immutable supplementary media service is a synchronous media service, such as, for example, a real-time speech detection media service. In some implementations, the immutable supplementary media service is an asynchronous media service, such as, for example, a speech to text service, an emotion detection service, and the like.

9. Transcoding Micro-Service

In some embodiments, at least one of the micro-services 2421-2423 of FIG. 24A is a transcoding micro-service.

In some embodiments, a transcoding micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services include at least one transcoding micro-service. In some implementations, the transcoding micro-service configuration is managed by operational services of the platform system (e.g., the operational services 2499 of FIG. 24A). In some implementations, the transcoding micro-service configuration is managed by an account system of the platform system (e.g., the account system 2430 of FIG. 24B). In some implementations, the transcoding micro-service configuration is managed by a policy engine of the platform system (e.g., the policy engine 2431 of FIG. 24B). In some implementations, the transcoding micro-service configuration is managed by the transcoding micro-service of the platform system (e.g., 2421-2423 FIG. 24A).

The transcoding micro-service method includes: enrolling an entity in the platform system (e.g., 2400), enrolling the entity comprising setting entity configuration for use of the transcoding micro-service by the entity (e.g., enrolling in a manner similar to the process S2610 of FIG. 26); processing a transcoding micro-service request according to the entity configuration for the entity, the transcoding micro-service request being a request for use of the transcoding micro-service on behalf of the entity (e.g., processing in a manner similar to the process S2620 of FIG. 26); accounting for the use of the transcoding micro-service on behalf of the entity (e.g., accounting for use in a manner similar to the process S2630 of FIG. 26); and generating billing information for the entity based on the accounting for the use of the transcoding micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the transcoding micro-service by the entity. The micro-service configuration for the transcoding micro-service specifies at least one of: an endpoint mapping to at least one application logic URI, an event callback URI, and an event application logic URI. In some implementations, micro-service configuration for the transcoding micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the transcoding micro-service specifies at least one of: an endpoint mapping to at least one application logic URI of an external system (e.g., 2451-2455 of FIG. 24A), an event callback URI of an external system, and an event application logic URI of an external system.

The platform system includes at least one transcoding micro-service API resource for the enrolled entity.

The use of the transcoding micro-service includes at least one computing resource of the platform system 2400 executing computer-readable instructions of the transcoding micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the transcoding micro-service receives at least one of a media stream, a reference to a media stream (e.g., a URI), a media resource, and a reference to a media resource (e.g., URI) as an input. In some implementations, the transcoding micro-service receives the input via the transcoding micro-service API (e.g., one of 2491-2493 of FIG. 24A).

In some implementations, the transcoding micro-service receives the input from an external system (e.g., 2451-2455 of FIG. 24A). In some implementations, an external system of the enrolled entity provides the input via a request to the generated transcoding micro-service API resource of the transcoding micro-service.

In some implementations, the transcoding micro-service receives the input from a micro-service (e.g., 2421-2423) of the platform system 2400. In some implementations, micro-service configuration for the micro-service that provides the input to the transcoding micro-service specifies an event callback URI of the transcoding micro-service. In some implementations, the micro-service that provides the input to the transcoding micro-service provides the input via a transcoding micro-service API call to the configured event callback URI of the transcoding micro-service.

Output

In some implementations, the transcoding micro-service provides at least one of a transcoded media stream, a reference to a transcoded media stream (e.g., a URI), a transcoded media resource, and a reference to a transcoded media resource (e.g., URI) as an output. In some implementations, the transcoding micro-service provides the output via the transcoding micro-service API (e.g., one of 2491-2493 of FIG. 24A).

In some implementations, the transcoding micro-service provides the output to an external system (e.g., 2451-2455 of FIG. 24A). In some implementations, micro-service configuration for the transcoding micro-service specifies an event callback URI of the external system. In some implementations, the transcoding micro-service provides the output via a request to the configured event callback URI of the external system. In some implementations, micro-service configuration for the transcoding micro-service specifies an event application logic URI of the external system. In some implementations, the transcoding micro-service retrieves application instructions from the external system by providing a request to the application logic URI, and the transcoding micro-service executes the retrieved application instructions to process the output.

In some implementations, the transcoding micro-service provides the output to a micro-service (e.g., 2421-2423) of the platform system 2400. In some implementations, micro-service configuration for the transcoding micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the transcoding micro-service provides the output via a request to the configured event callback URI of the other micro-service. In some implementations, micro-service configuration for the transcoding micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the transcoding micro-service retrieves application instructions from the other micro-service by providing a request to the application logic URI, and the transcoding micro-service executes the retrieved application instructions to process the output.

Transcoding

In some implementations, the transcoding micro-service is similar to the transcoding service described with respect to FIG. 1. In some implementations, the transcoding micro-service is similar to the transcoding service described with respect to the media micro-services 111-113. In some implementations, the transcoding micro-service is similar to the transcoding service described with respect to FIG. 13. In some implementations, the transcoding micro-service is similar to the transcoding service described with respect to the media micro-services 1381-1382. In some implementations, the transcoding micro-service is similar to the transcoding service described with respect to FIG. 21A. In some implementations, the transcoding micro-service is similar to the transcoding service described with respect to FIG. 21B.

In some implementations, the transcoding micro-service converts between media formats. In some implementations, the transcoding micro-service converts between various codecs such as, for example, Speex used in mobile operating system applications (e.g., iOS and Android), Opus used in web and WebRTC applications, and PCMU used in PSTN and other media services. In some implementations, the transcoding micro-service performs any suitable codec or media transformation. In some implementations, the transcoding micro-service translates between media mediums such as, for example, converting a pure audio stream to a video stream or pulling the audio from a video into an audio stream.

In some implementations, the transcoding micro-service converts an active media stream to another format. For example, a call with two endpoints may natively use two different codecs, and the transcoding micro-service may convert one or two of the legs of the communication to a common or compatible media stream format. In some implementations, the transcoding micro-service converts accessed media resources that are or will be used in a communication session. For example, the transcoding micro-service can convert an MP3 file that is accessed from a URI to a wave file for playback during a phone call. In another example, a web client may use an OPUS codec while a mobile app may use Speex codec, and the transcoding micro-service accepts a media stream in a first format and outputs a media stream in a second format. In some implementations, the transcoding micro-service alters bitrate, media size or resolution, or alters any suitable aspect. In some implementations, the transcoding micro-service provides media transformative operations such as, for example, image, audio, or video filtering.

In some implementations, the micro-services 2421-2423 of FIG. 24A include a first type of transcoding micro-service operating on a first software stack (such as, for example, FreeSWITCH) inside of an operating system of a virtual machine, and a second type of transcoding micro-service built to run in the virtual machine. In some implementations, the first type of a transcoding micro-service is a legacy transcoding micro-service, and the second type of transcoding micro-service is a new version of the transcoding micro-service. In some implementations, the use of the first type of transcoding micro-service and the second type of transcoding micro-service is interchangeable. In some implementations, the first type of transcoding micro-service and the second type of transcoding micro-service are each is constructed for a particular purpose, and the use of the first type of transcoding micro-service and the second type of transcoding micro-service is not interchangeable. For example, in some implementations, a subset of transcoding micro-services is constructed for audio processing and a second subset of transcoding micro-services is constructed for video processing operations.

Accounting for Use

In some implementations, accounting for use of the transcoding micro-service includes at least one of metering time of the transcoding process, metering a duration of the transcoding process, metering a quantity of the transcoding process for an entity (e.g., an account) associated with the transcoding process (e.g., an account associated with a transcoding request). In some implementations, accounting for use of the transcoding micro-service includes metering for use of the transcoding micro-service based on a type of the media being transcoded (e.g., video, audio, image). In some implementations, accounting for use of the transcoding micro-service includes metering for use of the transcoding micro-service based on a type of the codec being transcoded (e.g., Speex, Opus, PCMU). In some implementations, accounting for use of the transcoding micro-service includes metering for use of the transcoding micro-service based on a type of transcoding operation (e.g., codec translation, bit-rate compensation, resizing, and the like). In some implementations, metering for use of a transcoding micro-service is performed differently for different types of transcoding micro-services. For example, the system 2400 can meter use of a first type of transcoding micro-service operating on a first software stack (such as, for example, FreeSWITCH) inside of an operating system of a virtual machine differently from metering of a second type of transcoding micro-service built to run in the virtual machine.

In some implementations, the operational services 2499 performs the metering. In some implementations, the metering and logging system 2440 performs the metering. In some implementations, the transcoding micro-service performs the metering (e.g., by using a metering and logging layer of the transcoding micro-service that is similar to the metering layer 1313 FIG. 13). In some implementations, the operational services 2499 performs the metering by using a metering and logging layer of the transcoding micro-service (e.g., a metering and logging layer that is similar to the metering layer 1313 FIG. 13). In some implementations, the metering and logging system 2440 performs the metering by using a metering and logging layer of the transcoding micro-service (e.g., a metering and logging layer that is similar to the metering layer 1313 FIG. 13).

10. Recording Micro-Service

In some embodiments, at least one of the micro-services 2421-2423 of FIG. 24A is a recording micro-service.

In some embodiments, a recording micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services include at least one recording micro-service. In some implementations, the recording micro-service configuration is managed by operational services of the platform system (e.g., the operational services 2499 of FIG. 24A). In some implementations, the recording micro-service configuration is managed by an account system of the platform system (e.g., the account system 2430 of FIG. 24B). In some implementations, the recording micro-service configuration is managed by a policy engine of the platform system (e.g., the policy engine 2431 of FIG. 24B). In some implementations, the recording micro-service configuration is managed by the recording micro-service of the platform system (e.g., 2421-2423 FIG. 24A).

The recording micro-service method includes: enrolling an entity in the platform system (e.g., 2400), enrolling the entity comprising setting entity configuration for use of the recording micro-service by the entity (e.g., enrolling in a manner similar to the process S2610 of FIG. 26); processing a recording micro-service request according to the entity configuration for the entity, the recording micro-service request being a request for use of the recording micro-service on behalf of the entity (e.g., processing in a manner similar to the process S2620 of FIG. 26); accounting for the use of the recording micro-service on behalf of the entity (e.g., accounting for use in a manner similar to the process S2630 of FIG. 26); and generating billing information for the entity based on the accounting for the use of the recording micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the recording micro-service by the entity. The micro-service configuration for the recording micro-service specifies at least one of: an endpoint mapping to at least one application logic URI, an event callback URI, and an event application logic URI. In some implementations, micro-service configuration for the recording micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the recording micro-service specifies at least one of: an endpoint mapping to at least one application logic URI of an external system (e.g., 2451-2455 of FIG. 24A), an event callback URI of an external system, and an event application logic URI of an external system.

The platform system includes at least one recording micro-service API resource for the enrolled entity.

The use of the recording micro-service includes at least one computing resource of the platform system 2400 executing computer-readable instructions of the recording micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the recording micro-service receives at least one of a media stream and a reference to a media stream (e.g., a URI) as an input. In some implementations, the recording micro-service receives the input via the recording micro-service API (e.g., one of 2491-2493 of FIG. 24A).

In some implementations, the recording micro-service receives the input from an external system (e.g., 2451-2455 of FIG. 24A). In some implementations, an external system of the enrolled entity provides the input via a request to the generated recording micro-service API resource of the recording micro-service.

In some implementations, the recording micro-service receives the input from a micro-service (e.g., 2421-2423) of the platform system 2400. In some implementations, micro-service configuration for the micro-service that provides the input to the recording micro-service specifies an event callback URI of the recording micro-service. In some implementations, the micro-service that provides the input to the recording micro-service provides the input via a recording micro-service API call to the configured event callback URI of the recording micro-service.

Output

In some implementations, the recording micro-service provides at least one of a media recording resource and a reference to a media recording resource (e.g., URI) as an output. In some implementations, the recording micro-service provides the output via the recording micro-service API (e.g., one of 2491-2493 of FIG. 24A). In some implementations, the media recording resource is a recording of the input received by the recording micro-service (e.g., via the recording micro-service API).

In some implementations, the recording micro-service provides the output to an external system (e.g., 2451-2455 of FIG. 24A). In some implementations, micro-service configuration for the recording micro-service specifies an event callback URI of the external system. In some implementations, the recording micro-service provides the output via a request to the configured event callback URI of the external system. In some implementations, micro-service configuration for the recording micro-service specifies an event application logic URI of the external system. In some implementations, the recording micro-service retrieves application instructions from the external system by providing a request to the application logic URI, and the recording micro-service executes the retrieved application instructions to process the output.

In some implementations, the recording micro-service provides the output to a micro-service (e.g., 2421-2423) of the platform system 2400. In some implementations, micro-service configuration for the recording micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the recording micro-service provides the output via a request to the configured event callback URI of the other micro-service. In some implementations, micro-service configuration for the recording micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the recording micro-service retrieves application instructions from the other micro-service by providing a request to the application logic URI, and the recording micro-service executes the retrieved application instructions to process the output.

Recording

In some implementations, the recording micro-service records calls. In some implementations, the recording micro-service records communication sessions. In some implementations, the recording micro-service performs audio recording. In some implementations, the recording micro-service performs at least one of audio recording, video recording, screen-sharing recording, multimedia recording, or any suitable recording service. In some implementations, the recording micro-service performs transcription for a recording recorded by the recording micro-service. In some implementations, the recording micro-service performs transcription by performing automated speech recognition on media of a communication session (or a call). In some implementations, the recording micro-service performs automated manual transcription. In some implementations, automated manual transcription includes the recording micro-service providing media to be transcribed (e.g., audio data) to a human transcriber via a computing device (e.g., mobile device, computer, phone, etc.) of the human transcriber and processing transcribed media received by the recording micro-service from the computing device of the human transcriber. In some implementations, the recording micro-service performs semi-automated transcription, which involves a combination of automated speech recognition and automated manual transcription. In some implementations, the recording micro-service performs automated speech recognition to transcribe audio media that is recognized by the speech recognition system (or process) of the recording micro-service, and in a case where the automated speech recognition system (or process) does not recognize at least a portion of audio media, the recording micro-service performs automated manual transcription by providing the unrecognized audio media to a computing device (e.g., mobile device, computer, phone, etc.) of a human transcriber and processing transcribed media received by the recording micro-service from the computing device of the human transcriber.

Accounting for Use

In some implementations, accounting for use of the recording micro-service includes at least one of metering time of the recording process, metering a duration of the recording process, metering a quantity of the recording process for an entity (e.g., an account) associated with the recording process (e.g., an account associated with a recording request). In some implementations, accounting for use of the recording micro-service includes at least one of metering time of a transcribing process of the recording process, metering a duration of the transcribing process, metering a quantity of the transcribing process for an entity (e.g., an account) associated with the recording process (e.g., an account associated with a recording request). In some implementations, accounting for use of the recording micro-service includes metering for use of the recording micro-service based on a type of transcribing process (e.g., automated speech recognition, automated manual transcription, semi-automated transcription) performed by the recording micro-service. In some implementations, accounting for use of the recording micro-service includes metering for use of the recording micro-service based on a type of the media being recorded (e.g., video, audio, image). In some implementations, metering for use of a recording micro-service is performed differently for different types of recording micro-services.

In some implementations, the operational services 2499 performs the metering. In some implementations, the metering and logging system 2440 performs the metering. In some implementations, the recording micro-service performs the metering (e.g., by using a metering and logging layer of the recording micro-service that is similar to the metering layer 1313 FIG. 13). In some implementations, the operational services 2499 performs the metering by using a metering and logging layer of the recording micro-service (e.g., a metering and logging layer that is similar to the metering layer 1313 FIG. 13). In some implementations, the metering and logging system 2440 performs the metering by using a metering and logging layer of the recording micro-service (e.g., a metering and logging layer that is similar to the metering layer 1313 FIG. 13).

11. Text-To-Speech

In some embodiments, at least one of the micro-services 2421-2423 of FIG. 24A is a text-to-speech (TTS) micro-service.

In some embodiments, a TTS micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services include at least one TTS micro-service. In some implementations, the TTS micro-service configuration is managed by operational services of the platform system (e.g., the operational services 2499 of FIG. 24A). In some implementations, the TTS micro-service configuration is managed by an account system of the platform system (e.g., the account system 2430 of FIG. 24B). In some implementations, the TTS micro-service configuration is managed by a policy engine of the platform system (e.g., the policy engine 2431 of FIG. 24B). In some implementations, the TTS micro-service configuration is managed by the TTS micro-service of the platform system (e.g., 2421-2423 FIG. 24A).

The TTS micro-service method includes: enrolling an entity in the platform system (e.g., 2400), enrolling the entity comprising setting entity configuration for use of the TTS micro-service by the entity (e.g., enrolling in a manner similar to the process S2610 of FIG. 26); processing a TTS micro-service request according to the entity configuration for the entity, the TTS micro-service request being a request for use of the TTS micro-service on behalf of the entity (e.g., processing in a manner similar to the process S2620 of FIG. 26); accounting for the use of the TTS micro-service on behalf of the entity (e.g., accounting for use in a manner similar to the process S2630 of FIG. 26); and generating billing information for the entity based on the accounting for the use of the TTS micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes microservice configuration for use of the TTS micro-service by the entity. The micro-service configuration for the TTS micro-service specifies at least one of: an endpoint mapping to at least one application logic URI, an event callback URI, and an event application logic URI. In some implementations, micro-service configuration for the TTS micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the TTS micro-service specifies at least one of: an endpoint mapping to at least one application logic URI of an external system (e.g., 2451-2455 of FIG. 24A), an event callback URI of an external system, and an event application logic URI of an external system.

The platform system includes at least one TTS micro-service API resource for the enrolled entity.

The use of the TTS micro-service includes at least one computing resource of the platform system 2400 executing computer-readable instructions of the TTS micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the TTS micro-service receives at least one of text data and a reference to a text data (e.g., a URI) as an input. In some implementations, the TTS micro-service receives the input via the TTS micro-service API (e.g., one of 2491-2493 of FIG. 24A).

In some implementations, the TTS micro-service receives the input from an external system (e.g., 2451-2455 of FIG. 24A). In some implementations, an external system of the enrolled entity provides the input via a request to the generated TTS micro-service API resource of the TTS micro-service.

In some implementations, the TTS micro-service receives the input from a micro-service (e.g., 2421-2423) of the platform system 2400. In some implementations, micro-service configuration for the micro-service that provides the input to the TTS micro-service specifies an event callback URI of the TTS micro-service. In some implementations, the micro-service that provides the input to the TTS micro-service provides the input via a TTS micro-service API call to the configured event callback URI of the TTS micro-service.

Output

In some implementations, the TTS micro-service provides at least one of a media resource, a reference to a media resource (e.g., URI), a media stream, and a reference to a media stream (e.g., URI) as an output. In some implementations, the TTS micro-service provides the output via the TTS micro-service API (e.g., one of 2491-2493 of FIG. 24A). In some implementations, the media resource is an audible speech recording corresponding to the text input received by the TTS micro-service (e.g., via the TTS micro-service API). In some implementations, the media stream is a media stream (e.g. audio stream, video stream) that includes audible speech corresponding to the text input received by the TTS micro-service (e.g., via the TTS micro-service API).

In some implementations, the TTS micro-service provides the output to an external system (e.g., 2451-2455 of FIG. 24A). In some implementations, micro-service configuration for the TTS micro-service specifies an event callback URI of the external system. In some implementations, the TTS micro-service provides the output via a request to the configured event callback URI of the external system. In some implementations, micro-service configuration for the TTS micro-service specifies an event application logic URI of the external system. In some implementations, the TTS micro-service retrieves application instructions from the external system by providing a request to the application logic URI, and the TTS micro-service executes the retrieved application instructions to process the output.

In some implementations, the TTS micro-service provides the output to a micro-service (e.g., 2421-2423) of the platform system 2400. In some implementations, micro-service configuration for the TTS micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the TTS micro-service provides the output via a request to the configured event callback URI of the other micro-service. In some implementations, micro-service configuration for the TTS micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the TTS micro-service retrieves application instructions from the other micro-service by providing a request to the application logic URI, and the TTS micro-service executes the retrieved application instructions to process the output.

Text-To-Speech

In some implementations, the text-to-speech micro-service converts text into audible speech, and the audible speech is played within a communication stream of the system 2400. In some implementations, the text-to-speech micro-service generates audible speech from text provided to (or accessed by) the text-to-speech micro-service, and the audible speech is played within a communication stream of the system 2400. In some implementations, a phone call connects to a telephony application that specifies a script that should be read to the caller. In some implementations, the script is directed to the text-to-speech micro-service to be played during the phone call. In some implementations, the text-to-speech micro-service is used for audio communication. In some implementations, the script is directed to the text-to-speech micro-service to be played during the phone call. In some implementations, the text-to-speech micro-service is used for video communication by playing audible speech within a computer-generated video simulation or rendering of a speaker of the video communication. In some implementations, the text-to-speech micro-service receives (or accesses) text as an input and outputs an audio stream that is played or mixed in with the communication session.

Accounting for Use

In some implementations, accounting for use of the TTS micro-service includes at least one of metering time of the TTS process, metering a duration of the TTS process, metering a quantity of the TTS process (e.g., number of words, etc.) for an entity (e.g., an account) associated with the TTS process (e.g., an account associated with a TTS request). In some implementations, accounting for use of the recording micro-service includes metering for use of the TTS micro-service based on a type of the communication session (e.g., video communication session, audio communication session, image communication session). In some implementations, metering for use of a TTS micro-service is performed differently for different types of TTS micro-services. In some implementations, accounting for use of the TTS micro-service includes metering for use of the TTS micro-service based on a media format of the audible speech (speaker voice, use of multiple speaker voices for different portions of text, media format of audible speech, bitrate of audible speech media, etc.). In some implementations, an entity requesting use of the TTS micro-service specifies a speaker voice (e.g., a speaker having a specified sex, e.g., male or female, age, regional accent, and the like) for the audible speech, and accounting for use of the TTS micro-service includes metering for use of the TTS micro-service based on the specified speaker voice for the audible speech. In some implementations, an entity requesting use of the TTS micro-service specifies a speaker voice for different portions of the text to be spoken, and accounting for use of the TTS micro-service includes metering for use of the TTS micro-service based on the use of multiple speaker voices for the audible speech. In some implementations, an entity requesting use of the TTS micro-service specifies a speaker voice (e.g., a speaker having a specified sex, e.g., male or female, age, regional accent, and the like) for the audible speech, and accounting for use of the TTS micro-service includes metering for use of the TTS micro-service based on the specified speaker voice for the audible speech.

In some implementations, an entity requesting use of the TTS micro-service specifies a specific speaker voice to be used for the audible speech, and accounting for use of the TTS micro-service includes metering for use of the TTS micro-service based on the use of a specified speaker voice. In some implementations, an entity requesting use of the TTS micro-service specifies a specific speaker voice by providing a speaker voice model that includes parameters for generating audible speech having specified characteristics. In some implementations, an entity requesting use of the TTS micro-service specifies a specific speaker voice by providing an identifier that identifies an individual whose voice should be imitated for the generation of the audible speech. In some implementations, an entity requesting use of the TTS micro-service specifies that identifies an individual who should read the text to generate the audible speech. In some implementations, the entity requesting the use of the TTS micro-service can specify a voice actor (e.g., a celebrity, public figure, professional commercial actor, etc.) to read text to be used to generate the audible speech, and the TTS micro-service provides the text to be spoken to a computing device (e.g., mobile device, computer, phone, etc.) of a human (e.g., a voice actor) and processes audible speech media received from the computing device of the human, the human using the computing device (or another computing device) to record the human's reading of the text.

In some implementations, the operational services 2499 performs the metering. In some implementations, the metering and logging system 2440 performs the metering. In some implementations, the TTS micro-service performs the metering (e.g., by using a metering and logging layer of the TTS micro-service that is similar to the metering layer 1313 FIG. 13). In some implementations, the operational services 2499 performs the metering by using a metering and logging layer of the TTS micro-service (e.g., a metering and logging layer that is similar to the metering layer 1313 FIG. 13). In some implementations, the metering and logging system 2440 performs the metering by using a metering and logging layer of the TTS micro-service (e.g., a metering and logging layer that is similar to the metering layer 1313 FIG. 13).

12. Speech Detection

In some embodiments, at least one of the micro-services 2421-2423 of FIG. 24A is a speech detection (recognition) micro-service.

In some embodiments, a speech detection micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services includes at least one speech detection micro-service. In some implementations, the speech detection micro-service configuration is managed by operational services of the platform system (e.g., the operational services 2499 of FIG. 24A). In some implementations, the speech detection micro-service configuration is managed by an account system of the platform system (e.g., the account system 2430 of FIG. 24B). In some implementations, the speech detection micro-service configuration is managed by a policy engine of the platform system (e.g., the policy engine 2431 of FIG. 24B). In some implementations, the speech detection micro-service configuration is managed by the speech detection micro-service of the platform system (e.g., 2421-2423 FIG. 24A).

The speech detection micro-service method includes: enrolling an entity in the platform system (e.g., 2400), enrolling the entity comprising setting entity configuration for use of the speech detection micro-service by the entity (e.g., enrolling in a manner similar to the process S2610 of FIG. 26); processing a speech detection micro-service request according to the entity configuration for the entity, the speech detection micro-service request being a request for use of the speech detection micro-service on behalf of the entity (e.g., processing in a manner similar to the process S2620 of FIG. 26); accounting for the use of the speech detection micro-service on behalf of the entity (e.g., accounting for use in a manner similar to the process S2630 of FIG. 26); and generating billing information for the entity based on the accounting for the use of the speech detection micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the speech detection micro-service by the entity. The micro-service configuration for the speech detection micro-service specifies at least one of: an endpoint mapping to at least one application logic URI, an event callback URI, and an event application logic URI. In some implementations, micro-service configuration for the speech detection micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the speech detection micro-service specifies at least one of: an endpoint mapping to at least one application logic URI of an external system (e.g., 2451-2455 of FIG. 24A), an event callback URI of an external system, and an event application logic URI of an external system.

The platform system includes at least one speech detection micro-service API resource for the enrolled entity.

The use of the speech detection micro-service includes at least one computing resource of the platform system 2400 executing computer-readable instructions of the speech detection micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the speech detection micro-service receives at least one of a media resource, a reference to a media resource (e.g., a URI), a media stream, and a reference to a media stream (e.g., a URI) as an input. In some implementations, the speech detection micro-service receives the input via the speech detection micro-service API (e.g., one of 2491-2493 of FIG. 24A).

In some implementations, the speech detection micro-service receives the input from an external system (e.g., 2451-2455 of FIG. 24A). In some implementations, an external system of the enrolled entity provides the input via a request to the generated speech detection micro-service API resource of the speech detection micro-service.

In some implementations, the speech detection micro-service receives the input from a micro-service (e.g., 2421-2423) of the platform system 2400. In some implementations, micro-service configuration for the micro-service that provides the input to the speech detection micro-service specifies an event callback URI of the speech detection micro-service. In some implementations, the micro-service that provides the input to the speech detection micro-service provides the input via a speech detection micro-service API call to the configured event callback URI of the speech detection micro-service.

Output

In some implementations, the speech detection micro-service provides at least one of speech detection results (e.g., detected keywords, a data file, parameters, and the like) and a reference to speech detection results (e.g., URI) as an output. In some implementations, the speech detection micro-service provides the output via the speech detection micro-service API (e.g., one of 2491-2493 of FIG. 24A).

In some implementations, the speech detection micro-service provides the output to an external system (e.g., 2451-2455 of FIG. 24A). In some implementations, micro-service configuration for the speech detection micro-service specifies an event callback URI of the external system. In some implementations, the speech detection micro-service provides the output via a request to the configured event callback URI of the external system. In some implementations, micro-service configuration for the speech detection micro-service specifies an event application logic URI of the external system. In some implementations, the speech detection micro-service retrieves application instructions from the external system by providing a request to the application logic URI, and the speech detection micro-service executes the retrieved application instructions to process the output.

In some implementations, the speech detection micro-service provides the output to a micro-service (e.g., 2421-2423) of the platform system 2400. In some implementations, micro-service configuration for the speech detection micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the speech detection micro-service provides the output via a request to the configured event callback URI of the other micro-service. In some implementations, micro-service configuration for the speech detection micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the speech detection micro-service retrieves application instructions from the other micro-service by providing a request to the application logic URI, and the speech detection micro-service executes the retrieved application instructions to process the output.

Speech Detection

In some implementations, the speech detection micro-service collects spoken input and converts the spoken input into a format for at least one of transcription, natural language processing, and interpretation of responses. In some implementations, the speech detection micro-service uses the transcription micro-service described above. In some implementations, input to the speech detection micro-service is an audio stream and parameters of speech recognition.

In some implementations, the speech detection micro-service detects presence of audible speech in an audio stream. In some implementations, the speech detection micro-service detects presence determines whether a media communication contains audio data of human speech. As an example, the speech detection micro-service can determine when a human has joined a conference call by detecting presence of audible speech in audio media of the media communication. As an example, the speech detection micro-service can determine when a human associated with a destination communication endpoint of a voice communication session has accepted the voice communication session by detecting presence of audible speech in the audio media of the media communication.

In some implementations, the speech detection micro-service performs answering machine detection for a media communication session. In some implementations, the speech detection micro-service performs answering machine detection by detecting presence of an audio signal (e.g., the tone or beep that prompts the caller to leave a message) that corresponds to an answering machine in the audio media of the media communication session. In some implementations, the speech detection micro-service performs answering machine detection by performing a conventional answering machine detection process for determining whether a voice communication session has been established with an answering machine rather than a human (e.g., determining whether an answering machine or a human has answered the voice call).

Accounting for Use

In some implementations, accounting for use of the speech detection micro-service includes at least one of metering time of the speech detection process, metering a duration of the speech detection process, metering a quantity of the speech detection process for an entity (e.g., an account) associated with the speech detection process (e.g., an account associated with a speech detection request). In some implementations, accounting for use of the speech detection micro-service includes at least one of metering time of a transcribing process of the speech detection process, metering a duration of the transcribing process, metering a quantity of the transcribing process for an entity (e.g., an account) associated with the speech detection process (e.g., an account associated with a speech detection request). In some implementations, accounting for use of the speech detection micro-service includes metering for use of the speech detection micro-service based on a type of transcribing process (e.g., automated speech recognition, automated manual transcription, semi-automated transcription) performed by the speech detection micro-service. In some implementations, accounting for use of the speech detection micro-service includes metering for use of the speech detection micro-service based on a type of the media (e.g., video, audio). In some implementations, metering for use of a speech detection micro-service is performed differently for different types of speech detection micro-services. In some implementations, an entity requesting use of the speech detection micro-service configures the speech detection micro-service to detect specified words (or phases) in speech, and metering for use of a speech detection micro-service is performed based on a number of words (or phrases) specified in the configuration. In some implementations, an entity requesting use of the speech detection micro-service configures the speech detection micro-service to detect speech from at least one specified individual, and metering for use of a speech detection micro-service is performed based on a number of individuals (whose speech is to be detected) specified in the configuration.

In some implementations, the operational services 2499 performs the metering. In some implementations, the metering and logging system 2440 performs the metering. In some implementations, the speech detection micro-service performs the metering (e.g., by using a metering and logging layer of the speech detection micro-service that is similar to the metering layer 1313 FIG. 13). In some implementations, the operational services 2499 performs the metering by using a metering and logging layer of the speech detection micro-service (e.g., a metering and logging layer that is similar to the metering layer 1313 FIG. 13). In some implementations, the metering and logging system 2440 performs the metering by using a metering and logging layer of the speech detection micro-service (e.g., a metering and logging layer that is similar to the metering layer 1313 FIG. 13).

13. Conferencing

In some embodiments, at least one of the micro-services 2421-2423 of FIG. 24A is a conferencing micro-service.

In some embodiments, a conferencing micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services include at least one conferencing micro-service. In some implementations, the conferencing micro-service configuration is managed by operational services of the platform system (e.g., the operational services 2499 of FIG. 24A). In some implementations, the conferencing micro-service configuration is managed by an account system of the platform system (e.g., the account system 2430 of FIG. 24B). In some implementations, the conferencing micro-service configuration is managed by a policy engine of the platform system (e.g., the policy engine 2431 of FIG. 24B). In some implementations, the conferencing micro-service configuration is managed by the conferencing micro-service of the platform system (e.g., 2421-2423 FIG. 24A).

The conferencing micro-service method includes: enrolling an entity in the platform system (e.g., 2400), enrolling the entity comprising setting entity configuration for use of the conferencing micro-service by the entity (e.g., enrolling in a manner similar to the process S2610 of FIG. 26); processing a conferencing micro-service request according to the entity configuration for the entity, the conferencing micro-service request being a request for use of the conferencing micro-service on behalf of the entity (e.g., processing in a manner similar to the process S2620 of FIG. 26); accounting for the use of the conferencing micro-service on behalf of the entity (e.g., accounting for use in a manner similar to the process S2630 of FIG. 26); and generating billing information for the entity based on the accounting for the use of the conferencing micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the conferencing micro-service by the entity. The micro-service configuration for the conferencing micro-service specifies at least one of: an endpoint mapping to at least one application logic URI, an event callback URI, and an event application logic URI. In some implementations, micro-service configuration for the conferencing micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the conferencing micro-service specifies at least one of: an endpoint mapping to at least one application logic URI of an external system (e.g., 2451-2455 of FIG. 24A), an event callback URI of an external system, and an event application logic URI of an external system.

The platform system includes at least one conferencing micro-service API resource for the enrolled entity.

The use of the conferencing micro-service includes at least one computing resource of the platform system 2400 executing computer-readable instructions of the conferencing micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service. In some implementations, the conferencing micro-service is a regionally distributed micro-service.

Input

In some implementations, the conferencing micro-service receives at least conference parameters as an input. In some implementations, conference parameters include at one of information for conference call participants (e.g., communication endpoint information for each conference call participant), information for a conference call organizer (e.g., an identifier of an entity that manages the conference, such as for example, one of the Entities A-E of FIG. 24A), a time of the conference call, a duration of the conference call, and any other suitable conference call parameters. In some implementations, the conferencing micro-service receives media streams for each communication endpoint of the conference call as an input. In some implementations, the conferencing micro-service receives the input via the conferencing micro-service API (e.g., one of 2491-2493 of FIG. 24A).

In some implementations, the conferencing micro-service receives the input from an external system (e.g., 2451-2455 of FIG. 24A). In some implementations, an external system of the enrolled entity provides the input via a request to the generated conferencing micro-service API resource of the conferencing micro-service.

In some implementations, the conferencing micro-service receives the input from a micro-service (e.g., 2421-2423) of the platform system 2400. In some implementations, the conferencing micro-service receives the input from a signaling micro-service of the platform system 2400. In some implementations, micro-service configuration for the micro-service that provides the input to the conferencing micro-service specifies an event callback URI of the conferencing micro-service. In some implementations, the micro-service that provides the input to the conferencing micro-service provides the input via a conferencing micro-service API call to the configured event callback URI of the conferencing micro-service.

Output

In some implementations, the conferencing micro-service provides at least one of a conference media stream and a reference to a conference media stream (e.g., URI) as an output. In some implementations, the conferencing micro-service provides the output via the conferencing micro-service API (e.g., one of 2491-2493 of FIG. 24A). In some implementations, the conference media stream is a media stream resulting from mixing participant media streams (e.g., call audio from each participant) received by the conferencing micro-service (e.g., received by the conferencing micro-micro-service API).

In some implementations, the conferencing micro-service provides the output to an external system (e.g., 2451-2455 of FIG. 24A). In some implementations, micro-service configuration for the conferencing micro-service specifies an event callback URI of the external system. In some implementations, the conferencing micro-service provides the output via a request to the configured event callback URI of the external system. In some implementations, micro-service configuration for the conferencing micro-service specifies an event application logic URI of the external system. In some implementations, the conferencing micro-service retrieves application instructions from the external system by providing a request to the application logic URI, and the conferencing micro-service executes the retrieved application instructions to process the output.

In some implementations, the conferencing micro-service provides the output to a micro-service (e.g., 2421-2423) of the platform system 2400. In some implementations, micro-service configuration for the conferencing micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the conferencing micro-service provides the output via a request to the configured event callback URI of the other micro-service. In some implementations, micro-service configuration for the conferencing micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the conferencing micro-service retrieves application instructions from the other micro-service by providing a request to the application logic URI, and the conferencing micro-service executes the retrieved application instructions to process the output.

Conferencing

In some implementations, the conferencing micro-service facilitates conference calls with more than two endpoints connected. In some implementations, the conferencing micro-service receives media streams (e.g., audio media streams for an audio conference) from each endpoint of the conference call (e.g., outgoing audio media provided by endpoint devices of the conference call endpoints), and mixes the received media streams to generate an output media stream that is provided by the conferencing micro-service to each endpoint of the conference call (e.g., via endpoint devices of the endpoints). In some implementations, the conferencing micro-service uses a plurality of mixing resources to perform the mixing. In some implementations, the conferencing micro-service uses a plurality of mixing resources to perform localized mixing, and the conferencing micro-service mixes audio of endpoints in a same geographic region by using a mixing resource located near the endpoints.

In some implementations, the conferencing micro-service mixes audio for audio communication sessions. In some implementations, the conferencing micro-service mixes audio for video communication sessions.

Accounting for Use

In some implementations, accounting for use of the conferencing micro-service includes at least one of metering time of the conferencing process, metering a duration of the conferencing process, metering a quantity of the conferencing process for an entity (e.g., an account) associated with the conferencing process (e.g., an account associated with a conferencing request). In some implementations, accounting for use of the conferencing micro-service includes metering for use of the conferencing micro-service based on a number of communication endpoints of the conference call. In some implementations, accounting for use of the conferencing micro-service includes metering for use of the conferencing micro-service based on a number of mixing resources used for the conference call. In some implementations, accounting for use of the conferencing micro-service includes metering for use of the conferencing micro-service based on locations of mixing resources used for the conference call. In some implementations, metering for use of a conferencing micro-service is performed differently for different types of conferencing micro-services.

In some implementations, the operational services 2499 performs the metering. In some implementations, the metering and logging system 2440 performs the metering. In some implementations, the conferencing micro-service performs the metering (e.g., by using a metering and logging layer of the conferencing micro-service that is similar to the metering layer 1313 FIG. 13). In some implementations, the operational services 2499 performs the metering by using a metering and logging layer of the conferencing micro-service (e.g., a metering and logging layer that is similar to the metering layer 1313 FIG. 13). In some implementations, the metering and logging system 2440 performs the metering by using a metering and logging layer of the conferencing micro-service (e.g., a metering and logging layer that is similar to the metering layer 1313 FIG. 13).

14. Mixing

In some embodiments, at least one of the micro-services 2421-2423 of FIG. 24A is a mixing micro-service.

In some embodiments, a mixing micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services includes at least one mixing micro-service. In some implementations, the mixing micro-service configuration is managed by operational services of the platform system (e.g., the operational services 2499 of FIG. 24A). In some implementations, the mixing micro-service configuration is managed by an account system of the platform system (e.g., the account system 2430 of FIG. 24B). In some implementations, the mixing micro-service configuration is managed by a policy engine of the platform system (e.g., the policy engine 2431 of FIG. 24B). In some implementations, the mixing micro-service configuration is managed by the mixing micro-service of the platform system (e.g., 2421-2423 FIG. 24A).

The mixing micro-service method includes: enrolling an entity in the platform system (e.g., 2400), enrolling the entity comprising setting entity configuration for use of the mixing micro-service by the entity (e.g., enrolling in a manner similar to the process S2610 of FIG. 26); processing a mixing micro-service request according to the entity configuration for the entity, the mixing micro-service request being a request for use of the mixing micro-service on behalf of the entity (e.g., processing in a manner similar to the process S2620 of FIG. 26); accounting for the use of the mixing micro-service on behalf of the entity (e.g., accounting for use in a manner similar to the process S2630 of FIG. 26); and generating billing information for the entity based on the accounting for the use of the mixing micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the mixing micro-service by the entity. The micro-service configuration for the mixing micro-service specifies at least one of: an endpoint mapping to at least one application logic URI, an event callback URI, and an event application logic URI. In some implementations, micro-service configuration for the mixing micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the mixing micro-service specifies at least one of: an endpoint mapping to at least one application logic URI of an external system (e.g., 2451-2455 of FIG. 24A), an event callback URI of an external system, and an event application logic URI of an external system.

The platform system includes at least one mixing micro-service API resource for the enrolled entity.

The use of the mixing micro-service includes at least one computing resource of the platform system 2400 executing computer-readable instructions of the mixing micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the mixing micro-service receives at least one of a media stream and a reference to a media stream (e.g., a URI) as an input. In some implementations, the mixing micro-service receives the input via the mixing micro-service API (e.g., one of 2491-2493 of FIG. 24A).

In some implementations, the mixing micro-service receives the input from an external system (e.g., 2451-2455 of FIG. 24A). In some implementations, an external system of the enrolled entity provides the input via a request to the generated mixing micro-service API resource of the mixing micro-service.

In some implementations, the mixing micro-service receives the input from a micro-service (e.g., 2421-2423) of the platform system 2400. In some implementations, micro-service configuration for the micro-service that provides the input to the mixing micro-service specifies an event callback URI of the mixing micro-service. In some implementations, the micro-service that provides the input to the mixing micro-service provides the input via a mixing micro-service API call to the configured event callback URI of the mixing micro-service.

Output

In some implementations, the mixing micro-service provides at least one of a mixed media stream and a reference to a mixed media stream (e.g., URI) as an output. In some implementations, the mixing micro-service provides the output via the mixing micro-service API (e.g., one of 2491-2493 of FIG. 24A). In some implementations, the mixed media stream is a media stream that results from mixing of each input media stream received by the mixing micro-service (e.g., via the mixing micro-service API).

In some implementations, the mixing micro-service provides the output to an external system (e.g., 2451-2455 of FIG. 24A). In some implementations, micro-service configuration for the mixing micro-service specifies an event callback URI of the external system. In some implementations, the mixing micro-service provides the output via a request to the configured event callback URI of the external system. In some implementations, micro-service configuration for the mixing micro-service specifies an event application logic URI of the external system. In some implementations, the mixing micro-service retrieves application instructions from the external system by providing a request to the application logic URI, and the mixing micro-service executes the retrieved application instructions to process the output.

In some implementations, the mixing micro-service provides the output to a micro-service (e.g., 2421-2423) of the platform system 2400. In some implementations, micro-service configuration for the mixing micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the mixing micro-service provides the output via a request to the configured event callback URI of the other micro-service. In some implementations, micro-service configuration for the mixing micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the mixing micro-service retrieves application instructions from the other micro-service by providing a request to the application logic URI, and the mixing micro-service executes the retrieved application instructions to process the output.

Mixing

In some implementations, the mixing micro-service is similar to the conferencing micro-service described above for FIG. 33. In some implementations, the mixes an audio stream of a communication session (e.g., audio of a voice communication session, audio of a video communication session) with an audio stream of a media resource (e.g., audio of an audio file, audio of a video file. For example, the mixing micro-service can mix an audio stream of a live or pre-recorded event (e.g., a presidential speech, an earnings call, a concert, and the like) with an audio stream of a communication session.

Accounting for Use

In some implementations, accounting for use of the mixing micro-service includes at least one of metering time of the mixing process, metering a duration of the mixing process, metering a quantity of the mixing process for an entity (e.g., an account) associated with the mixing process (e.g., an account associated with a mixing request). In some implementations, accounting for use of the mixing micro-service includes metering for use of the mixing micro-service based on a number of media resources mixed. In some implementations, accounting for use of the mixing micro-service includes metering for use of the mixing micro-service based on a type of media resources mixed. In some implementations, accounting for use of the mixing micro-service includes metering for use of the mixing micro-service based on the specific media resources mixed. In some implementations, accounting for use of the mixing micro-service includes metering for use of the mixing micro-service based on a number of mixing resources used. In some implementations, accounting for use of the mixing micro-service includes metering for use of the mixing micro-service based on locations of mixing resources used. In some implementations, metering for use of a mixing micro-service is performed differently for different types of mixing micro-services.

In some implementations, the operational services 2499 performs the metering. In some implementations, the metering and logging system 2440 performs the metering. In some implementations, the mixing micro-service performs the metering (e.g., by using a metering and logging layer of the mixing micro-service that is similar to the metering layer 1313 FIG. 13). In some implementations, the operational services 2499 performs the metering by using a metering and logging layer of the mixing micro-service (e.g., a metering and logging layer that is similar to the metering layer 1313 FIG. 13). In some implementations, the metering and logging system 2440 performs the metering by using a metering and logging layer of the mixing micro-service (e.g., a metering and logging layer that is similar to the metering layer 1313 FIG. 13).

In some implementations, a mixing micro-service method is similar to the conferencing method 3300.

15. Broadcasting

In some embodiments, at least one of the micro-services 2421-2423 of FIG. 24A is a broadcasting micro-service.

In some embodiments, a broadcasting micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services includes at least one broadcasting micro-service. In some implementations, the broadcasting micro-service configuration is managed by operational services of the platform system (e.g., the operational services 2499 of FIG. 24A). In some implementations, the broadcasting micro-service configuration is managed by an account system of the platform system (e.g., the account system 2430 of FIG. 24B). In some implementations, the broadcasting micro-service configuration is managed by a policy engine of the platform system (e.g., the policy engine 2431 of FIG. 24B). In some implementations, the broadcasting micro-service configuration is managed by the broadcasting micro-service of the platform system (e.g., 2421-2423 FIG. 24A).

The broadcasting micro-service method includes: enrolling an entity in the platform system (e.g., 2400), enrolling the entity comprising setting entity configuration for use of the broadcasting micro-service by the entity (e.g., enrolling in a manner similar to the process S2610 of FIG. 26); processing a broadcasting micro-service request according to the entity configuration for the entity, the broadcasting micro-service request being a request for use of the broadcasting micro-service on behalf of the entity (e.g., processing in a manner similar to the process S2620 of FIG. 26); accounting for the use of the broadcasting micro-service on behalf of the entity (e.g., accounting for use in a manner similar to the process S2630 of FIG. 26); and generating billing information for the entity based on the accounting for the use of the broadcasting micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the broadcasting micro-service by the entity. The micro-service configuration for the broadcasting micro-service specifies at least one of: an endpoint mapping to at least one application logic URI, an event callback URI, and an event application logic URI. In some implementations, micro-service configuration for the broadcasting micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the broadcasting micro-service specifies at least one of: an endpoint mapping to at least one application logic URI of an external system (e.g., 2451-2455 of FIG. 24A), an event callback URI of an external system, and an event application logic URI of an external system.

The platform system includes at least one broadcasting micro-service API resource for the enrolled entity.

The use of the broadcasting micro-service includes at least one computing resource of the platform system 2400 executing computer-readable instructions of the broadcasting micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service. In some implementations, the broadcasting micro-service is a regionally distributed micro-service.

Input

In some implementations, the broadcasting micro-service receives broadcast information as an input. In some implementations, the broadcasting micro-service receives the input via the broadcasting micro-service API (e.g., one of 2491-2493 of FIG. 24A). In some implementations, broadcast information includes information for at least one of one or more destination communication endpoints, media to be broadcasted, and a communication session to be broadcasted.

In some implementations, the broadcasting micro-service receives the input from an external system (e.g., 2451-2455 of FIG. 24A). In some implementations, an external system of the enrolled entity provides the input via a request to the generated broadcasting micro-service API resource of the broadcasting micro-service.

In some implementations, the broadcasting micro-service receives the input from a micro-service (e.g., 2421-2423) of the platform system 2400. In some implementations, micro-service configuration for the micro-service that provides the input to the broadcasting micro-service specifies an event callback URI of the broadcasting micro-service. In some implementations, the micro-service that provides the input to the broadcasting micro-service provides the input via a broadcasting micro-service API call to the configured event callback URI of the broadcasting micro-service.

Broadcasting

In some implementations, the broadcasting micro-service is similar to the conferencing micro-service described above for FIG. 33. In some implementations, the broadcasting micro-service manages a communication session with a plurality of communication endpoints (e.g., a conference call, a one-way conference call, a listen-only conference call, and the like), in which a media stream is broadcasted to each of the communication endpoints. In some implementations, the media stream is a media stream of another conference call (e.g., an earnings call). In some implementations, the media stream is a media stream of a media resource. In some embodiments, an entity requesting use of the broadcasting micro-service specifies a media stream to be broadcast, and specifies at least one communication endpoint as a recipient of the media stream to be broadcast. In some implementations, an entity specifies a communication session (e.g., a communication session between two commination endpoints, a conference call) as the media stream to be broadcast. In some implementations, an entity specifies an established communication session as the media stream to be broadcast. In some implementations, an entity specifies a communication session that is not established as the media stream to be broadcast. For example, an entity can configure the broadcasting micro-service to broadcast any communication session between (or among) specified communication endpoints to be broadcasted to specified broadcast recipients (e.g., communication endpoints). In some implementations, the broadcasting micro-service is configured for use in combination with a signaling micro-service. In some implementations, the broadcasting micro-service performs signaling. In some implementations, the broadcasting micro-service performs signaling as described above for the signaling micro-service.

Accounting for Use

In some implementations, accounting for use of the broadcasting micro-service includes metering a number of communication endpoints that receive the broadcast. In some implementations, accounting for use of the broadcasting micro-service includes metering based on the media stream being broadcast. In some implementations, accounting for use of the broadcasting micro-service includes metering based on a type of media stream being broadcast. In some implementations, accounting for use of the broadcasting micro-service includes metering a duration of the media stream. In some implementations, accounting for use of the broadcasting micro-service is based on the media stream being broadcasted. In some implementations, billing for use of the broadcasting service is based on a number of communication endpoints receiving the broadcast. In some implementations, billing for use of the broadcasting service is based on billing rate for the broadcasted media stream.

In some implementations, metering for use of a broadcasting micro-service is performed differently for different types of broadcasting micro-services.

In some implementations, the operational services 2499 performs the metering. In some implementations, the metering and logging system 2440 performs the metering. In some implementations, the broadcasting micro-service performs the metering (e.g., by using a metering and logging layer of the broadcasting micro-service that is similar to the metering layer 1313 FIG. 13). In some implementations, the operational services 2499 performs the metering by using a metering and logging layer of the broadcasting micro-service (e.g., a metering and logging layer that is similar to the metering layer 1313 FIG. 13). In some implementations, the metering and logging system 2440 performs the metering by using a metering and logging layer of the broadcasting micro-service (e.g., a metering and logging layer that is similar to the metering layer 1313 FIG. 13).

16. Notification

In some embodiments, at least one of the micro-services 2421-2423 of FIG. 24A is a notification micro-service.

In some embodiments, a notification micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services includes at least one notification micro-service. In some implementations, the notification micro-service configuration is managed by operational services of the platform system (e.g., the operational services 2499 of FIG. 24A). In some implementations, the notification micro-service configuration is managed by an account system of the platform system (e.g., the account system 2430 of FIG. 24B). In some implementations, the notification micro-service configuration is managed by a policy engine of the platform system (e.g., the policy engine 2431 of FIG. 24B). In some implementations, the notification micro-service configuration is managed by the notification micro-service of the platform system (e.g., 2421-2423 FIG. 24A).

The notification micro-service method includes: enrolling an entity in the platform system (e.g., 2400), enrolling the entity comprising setting entity configuration for use of the notification micro-service by the entity (e.g., enrolling in a manner similar to the process S2610 of FIG. 26); processing a notification micro-service request according to the entity configuration for the entity, the notification micro-service request being a request for use of the notification micro-service on behalf of the entity (e.g., processing in a manner similar to the process S2620 of FIG. 26); accounting for the use of the notification micro-service on behalf of the entity (e.g., accounting for use in a manner similar to the process S2630 of FIG. 26); and generating billing information for the entity based on the accounting for the use of the notification micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the notification micro-service by the entity. The micro-service configuration for the notification micro-service specifies at least one of: an endpoint mapping to at least one application logic URI, an event callback URI, and an event application logic URI. In some implementations, micro-service configuration for the notification micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the notification micro-service specifies at least one of: an endpoint mapping to at least one application logic URI of an external system (e.g., 2451-2455 of FIG. 24A), an event callback URI of an external system, and an event application logic URI of an external system.

The platform system includes at least one notification micro-service API resource for the enrolled entity.

The use of the notification micro-service includes at least one computing resource of the platform system 2400 executing computer-readable instructions of the notification micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service. In some implementations, the notification micro-service is a regionally distributed micro-service.

Input

In some implementations, the notification micro-service receives notification information as an input. In some implementations, the notification micro-service receives the input via the notification micro-service API (e.g., one of 2491-2493 of FIG. 24A). In some implementations, notification information includes information of events to be published by the notification micro-service, and a type of pub/sub channel to use for publishing notifications to subscribers.

In some implementations, the notification micro-service receives the input from an external system (e.g., 2451-2455 of FIG. 24A). In some implementations, an external system of the enrolled entity provides the input via a request to the generated notification micro-service API resource of the notification micro-service.

In some implementations, the notification micro-service receives the input from a micro-service (e.g., 2421-2423) of the platform system 2400. In some implementations, micro-service configuration for the micro-service that provides the input to the notification micro-service specifies an event callback URI of the notification micro-service. In some implementations, the micro-service that provides the input to the notification micro-service provides the input via a notification micro-service API call to the configured event callback URI of the notification micro-service.

Notification

In some implementations, the notification micro-service is similar to at least one of the systems and methods described in U.S. Pat. No. 8,838,707, which is hereby incorporated in its entirety by this reference. In some implementations, the notification micro-service is similar to at least one embodiment or implementation of the event router described in U.S. Pat. No. 8,838,707. In some implementations, the notification micro-service performs a notification process similar to at least one of the methods described in U.S. Pat. No. 8,838,707.

In some implementations, the notification micro-service is similar to at least one of the systems and methods described in U.S. Pat. No. 8,964,726, which is hereby incorporated in its entirety by this reference. In some implementations, the notification micro-service is similar to at least one embodiment or implementation of the event router described in U.S. Pat. No. 8,964,726. In some implementations, the notification micro-service performs a notification process similar to at least one of the methods described in U.S. Pat. No. 8,964,726.

In some implementations, the notification micro-service maintains at least one publication and subscription (pub/sub) channel and for an entity, and manages distributing of event messages. In some implementations, the event messages are generated by micro-services of the system 2400 that are used by the entity. In some implementations, a system of the entity (e.g., 2451-2455 of FIG. 24A) publishes content to a particular event channel configured for the entity at the notification micro-service. In some implementations, the entity configures one or micro-services (of the system 2400) used by the entity to publish content to a particular event channel configured for the entity at the notification micro-service. In some implementations, responsive to publication of content in the form of an event message, the notification micro-service distributes the event message to all subscribers of the event.

In some implementations, the notification micro-service determines a publication and subscription (pub/sub) channel to be used for an entity from a set of two or more types of pub/sub channels (e.g., Google Cloud Pub/Sub, Apple Push Notification Service, and the like).

Accounting for Use

In some implementations, accounting for use of the notification micro-service includes at least one of metering a quantity of notifications for an entity (e.g., an account) associated with the notification micro-service (e.g., an account associated with a notification request). In some implementations, accounting for use of the notification micro-service includes metering for use of the notification micro-service based on a type of notification performed by the notification micro-service (e.g., type of pub/sub system(s) used, type of events being published, and the like). In some implementations, metering for use of a notification micro-service is performed differently for different types of notification micro-services.

In some implementations, the operational services 2499 performs the metering. In some implementations, the metering and logging system 2440 performs the metering. In some implementations, the notification micro-service performs the metering (e.g., by using a metering and logging layer of the notification micro-service that is similar to the metering layer 1313 FIG. 13). In some implementations, the operational services 2499 performs the metering by using a metering and logging layer of the notification micro-service (e.g., a metering and logging layer that is similar to the metering layer 1313 FIG. 13). In some implementations, the metering and logging system 2440 performs the metering by using a metering and logging layer of the notification micro-service (e.g., a metering and logging layer that is similar to the metering layer 1313 FIG. 13).

17. Call Progress

In some embodiments, at least one of the micro-services 2421-2423 of FIG. 24A is a call progress micro-service.

In some embodiments, a call progress micro-service method that is performed at a multi-tenant media communication platform system (e.g., the system 2400 of FIG. 24) is similar to the method 2600. In some embodiments, the multi-tenant media communication platform system includes a plurality of media communication micro-services (e.g., 2421-2423 of FIG. 24A) and micro-service configuration for a plurality of entities (e.g., the entities corresponding to the systems 2451-2455 of FIG. 24A, the entities depicted in FIG. 24B) configured for use of the platform system (e.g., 2400). The plurality of media communication micro-services includes at least one call progress micro-service. In some implementations, the call progress micro-service configuration is managed by operational services of the platform system (e.g., the operational services 2499 of FIG. 24A). In some implementations, the call progress micro-service configuration is managed by an account system of the platform system (e.g., the account system 2430 of FIG. 24B). In some implementations, the call progress micro-service configuration is managed by a policy engine of the platform system (e.g., the policy engine 2431 of FIG. 24B). In some implementations, the call progress micro-service configuration is managed by the call progress micro-service of the platform system (e.g., 2421-2423 FIG. 24A).

In some implementations, the call progress micro-service is included in a conferencing micro-service.

The call progress micro-service method includes: enrolling an entity in the platform system (e.g., 2400), enrolling the entity comprising setting entity configuration for use of the call progress micro-service by the entity (e.g., enrolling in a manner similar to the process S2610 of FIG. 26); processing a call progress micro-service request according to the entity configuration for the entity, the call progress micro-service request being a request for use of the call progress micro-service on behalf of the entity (e.g., processing in a manner similar to the process S2620 of FIG. 26); accounting for the use of the call progress micro-service on behalf of the entity (e.g., accounting for use in a manner similar to the process S2630 of FIG. 26); and generating billing information for the entity based on the accounting for the use of the call progress micro-service on behalf of the entity (e.g., generating billing information in a manner similar to the process S2640 of FIG. 26).

The plurality of entities include at least one of a platform account, sub-account, organization, user, and service instance. Entity configuration is received from at least one external system via an account management interface, the account management interface including a least one of an account portal user interface and an account management API. Entity configuration for the entity includes micro-service configuration for use of the call progress micro-service by the entity. The micro-service configuration for the call progress micro-service specifies at least one of: an endpoint mapping to at least one application logic URI, an event callback URI, and an event application logic URI. In some implementations, micro-service configuration for the call progress micro-service specifies at least one of: an endpoint mapping to at least one application logic URI of a micro-service of the platform system 2400, an event callback URI of a micro-service of the platform system 2400, and an event application logic URI of a micro-service of the platform system 2400. In some implementations, micro-service configuration for the call progress micro-service specifies at least one of: an endpoint mapping to at least one application logic URI of an external system (e.g., 2451-2455 of FIG. 24A), an event callback URI of an external system, and an event application logic URI of an external system.

The platform system includes at least one call progress micro-service API resource for the enrolled entity.

The use of the call progress micro-service includes at least one computing resource of the platform system 2400 executing computer-readable instructions of the call progress micro-service.

The platform system 2400 includes at least one regionally distributed micro-service, and the platform system 2400 includes computing resources in at least two geographic regions for the regionally distributed micro-service. The platform system 2400 (e.g., the resource management system 2490 of FIG. 24A) determines computing resources for use of the regionally distributed micro-service based on a region of at least one media communication endpoint of media communication that uses the regionally distributed micro-service.

Input

In some implementations, the call progress micro-service receives communication session information as an input. In some implementations, the call progress micro-service receives the input via the call progress micro-service API (e.g., one of 2491-2493 of FIG. 24A). In some implementations, communication session information includes at least one of caller ID information of at least one call session, communication device input information of at least one call session, DTMF input detection information detected for at least one call session, speech recognition information of at least one call session, speech detection information of at least one call session, authentication information of at least one call session. In some implementations, the authentication information is provided by a participant via an out-of-band communication (e.g., via communication with a Web server), and the participant provides the authentication information along with information identifying at least one corresponding communication session. In some implementations, the call progress micro-service receives the communication session information from at least one application server. In some implementations, the call progress micro-service receives the communication session information from at least one conferencing micro-service. In some implementations, the call progress micro-service receives the communication session information from at least one signaling micro-service. In some implementations, the call progress micro-service receives the communication session information directly from a system of at least one participant of a communication session. In some implementations, the call progress micro-service receives the communication session information from an input detection micro-service, such as the input detection micro-services described herein.

In some implementations, the call progress micro-service receives the input from an external system (e.g., 2451-2455 of FIG. 24A). In some implementations, an external system of the enrolled entity provides the input via a request to the generated call progress micro-service API resource of the call progress micro-service.

In some implementations, the call progress micro-service receives the input from a micro-service (e.g., 2421-2423) of the platform system 2400. In some implementations, micro-service configuration for the micro-service that provides the input to the call progress micro-service specifies an event callback URI of the call progress micro-service. In some implementations, the micro-service that provides the input to the call progress micro-service provides the input via a call progress micro-service API call to the configured event callback URI of the call progress micro-service.

Output

In some implementations, the call progress micro-service provides at least one of call progress information and a reference to call progress information (e.g., URI) as an output. In some implementations, the call progress micro-service provides the output via the call progress micro-service API (e.g., one of 2491-2493 of FIG. 24A). In some implementations, the call progress information includes at least one of information identifying participants of a communication session (e.g., identities of participants in a communication session between two communication endpoints, identities of participants in a conference call), information indicating a number of participants in a conference call, information indicating times at which one or more participants joined a conference call, information indicating times at which one or more participants left a conference call, information indicating times at which at least one participant spoke, information indicating a speaking duration for at least one participant.

In some implementations, the call progress micro-service provides the output to an external system (e.g., 2451-2455 of FIG. 24A). In some implementations, micro-service configuration for the call progress micro-service specifies an event callback URI of the external system. In some implementations, the call progress micro-service provides the output via a request to the configured event callback URI of the external system. In some implementations, micro-service configuration for the call progress micro-service specifies an event application logic URI of the external system. In some implementations, the call progress micro-service retrieves application instructions from the external system by providing a request to the application logic URI, and the call progress micro-service executes the retrieved application instructions to process the output.

In some implementations, the call progress micro-service provides the output to a micro-service (e.g., 2421-2423) of the platform system 2400. In some implementations, micro-service configuration for the call progress micro-service specifies an event callback URI of another micro-service of the platform system 2400. In some implementations, the event callback URI is a URI of a resource of the other micro-service that the platform system 2400 generates for the enrolled entity during enrollment of the entity for the other micro-service. In some implementations, the call progress micro-service provides the output via a request to the configured event callback URI of the other micro-service. In some implementations, micro-service configuration for the call progress micro-service specifies an event application logic URI of another micro-service of the platform system 2400. In some implementations, the event application logic URI is a URI of a resource of the other micro-service that the platform system 2400 generates for the enrolled entity during enrollment of the entity for the other micro-service. In some implementations, the call progress micro-service retrieves application instructions from the other micro-service by providing a request to the application logic URI, and the call progress micro-service executes the retrieved application instructions to process the output.

Call Progress

In some implementations, the call progress micro-service determines the call progress information from the communication session information received as input. In some implementations, the call progress micro-service identifies at least one participant from caller ID information of the communication session information.

In some implementations, the call progress micro-service identifies at least one participant from device input information of the communication session information. In some implementations, device input information includes data of audible speech captured by a device of at least one participant (e.g., a recording or audio capture of a participant speaking their name into a microphone after being prompted to state their name). In some implementations, the call progress micro-service identifies at least one participant from DTMF input detection information of the communication session information. In some implementations, the call progress micro-service identifies at least one participant from speech recognition information of the communication session information. In some implementations, the call progress micro-service identifies at least one participant from speech detection information of the communication session information. In some implementations, the call progress micro-service identifies at least one participant from authentication information of the communication session information.

In some implementations, the call progress micro-service determines call progress for a conference session (e.g., a voice conference call session, a video conference call session, and the like) managed by conferencing micro-service described above for FIG. 33.

Accounting for Use

In some implementations, accounting for use of the call progress micro-service includes at least one of metering time of the call progress process, metering a duration of the call progress process, metering a quantity of the call progress process for an entity (e.g., an account) associated with the call progress process (e.g., an account associated with a call progress request). In some implementations, accounting for use of the call progress micro-service includes metering for use of the call progress micro-service based on a number of communication endpoints of the communication session (e.g., conference call, two party communication session). In some implementations, accounting for use of the call progress micro-service includes metering for use of the call progress micro-service based the type of call progress information output by the call progress micro-service (e.g., current participants, history of participants joining and leaving, determining speaking duration for each speaker, and the like, notifications when specified participants join or leave). In some implementations, accounting for use of the call progress micro-service includes metering for use of the call progress micro-service based the type of processed used to determine participant identities (e.g., speech recognition, use of an application server to acquire authentication information, DTMF detection, and the like). In some implementations, metering for use of a call progress micro-service is performed differently for different types of call progress micro-services.

In some implementations, the operational services 2499 performs the metering. In some implementations, the metering and logging system 2440 performs the metering. In some implementations, the call progress micro-service performs the metering (e.g., by using a metering and logging layer of the call progress micro-service that is similar to the metering layer 1313 FIG. 13). In some implementations, the operational services 2499 performs the metering by using a metering and logging layer of the call progress micro-service (e.g., a metering and logging layer that is similar to the metering layer 1313 FIG. 13). In some implementations, the metering and logging system 2440 performs the metering by using a metering and logging layer of the call progress micro-service (e.g., a metering and logging layer that is similar to the metering layer 1313 FIG. 13).

18. System Architecture: Communication Platform System

Figure 28:
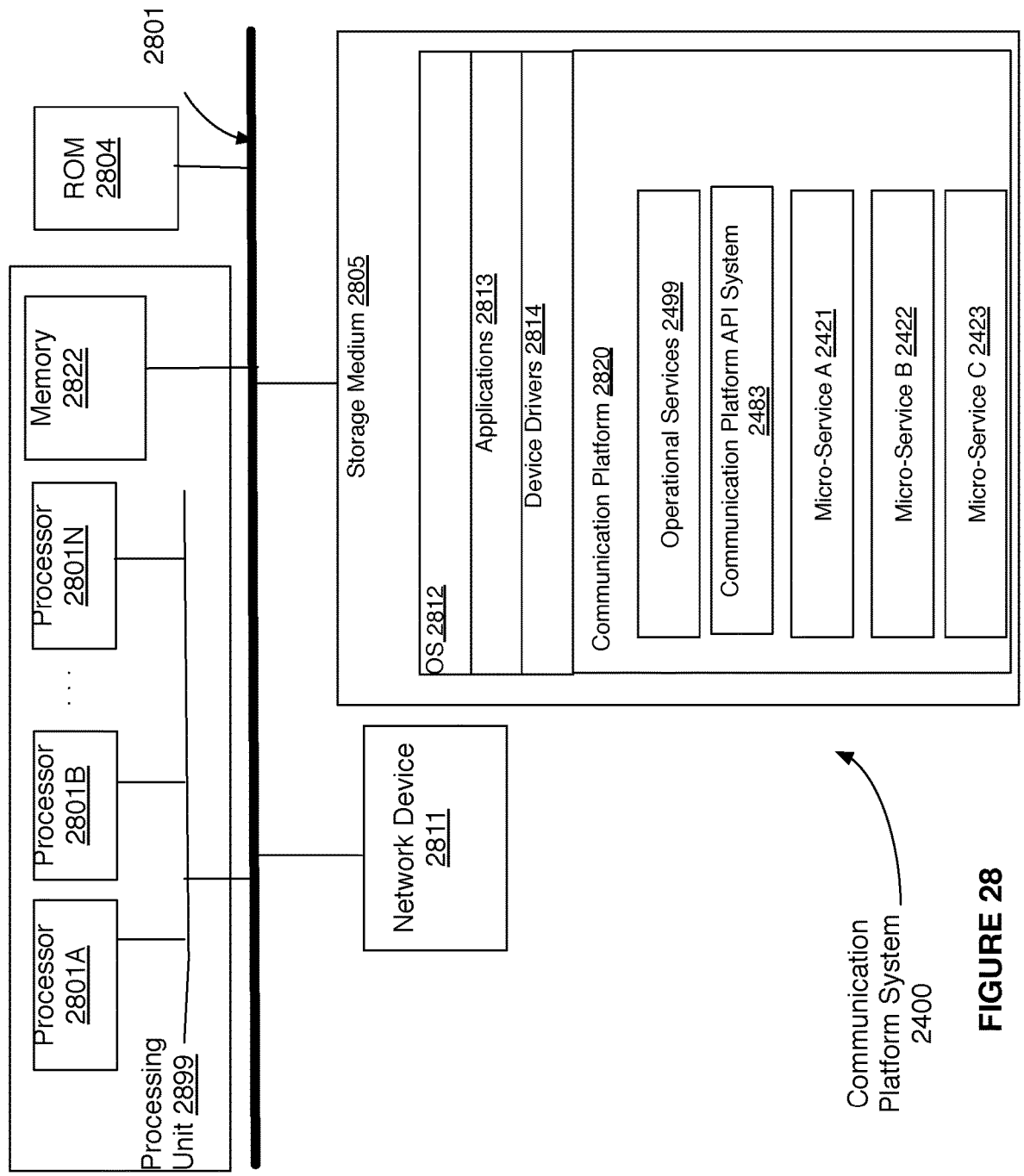
FIG. 28 is an architecture diagram of a system of a preferred embodiment.

FIG. 28 is an architecture diagram of a system (e.g., the communication platform system 2400 of FIG. 24A) according to an implementation in which the system is implemented by a server device. In some implementations, the system is implemented by a plurality of devices. In some implementations, the system 2400 is similar to the system 100 of FIG. 1. In some implementations, the system 2400 is similar to the system 1300 of FIG. 13.

The bus 2801 interfaces with the processors 2801A-2801N, the main memory (e.g., a random access memory (RAM)) 2822, a read only memory (ROM) 2804, a processor-readable storage medium 2805, and a network device 2811. In some implementations, the system 2400 includes at least one of a display device and a user input device.

The processors 2801A-2801N may take many forms, such as ARM processors, X86 processors, and the like.

In some implementations, the system (e.g., 2400) includes at least one of a central processing unit (processor) and a multi-processor unit (MPU).

The processors 2801A-2801N and the main memory 2822 form a processing unit 2899. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a the operational services, the communication platform API system, and one or more micro-services.

The network adapter device 2811 provides one or more wired or wireless interfaces for exchanging data and commands between the system (e.g., 2400) and other devices, such as an external system (e.g., 2451-2455). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 2822 (of the processing unit 2899) from the processor-readable storage medium 2805, the ROM 2804 or any other storage location. During execution of these software programs, the respective machine-executable instructions are accessed by at least one of processors 2801A-2801N (of the processing unit 2899) via the bus 2801, and then executed by at least one of processors 2801A-2801N. Data used by the software programs are also stored in the memory 2822, and such data is accessed by at least one of processors 2801A-2801N during execution of the machine-executable instructions of the software programs. The processor-readable storage medium 2805 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 2805 includes machine-executable instructions (and related data) for an operating system 2812, software programs 2813, device drivers 2814, and the communication platform 2820 of the system 2400. The machine-executable instructions (and related data) for the communication platform 2820 include machine-executable instructions (and related data) for the operational services 2499, the communication platform API System 2483, and the micro-services 2421-2423.

19. System Architecture: External System

Figure 29:
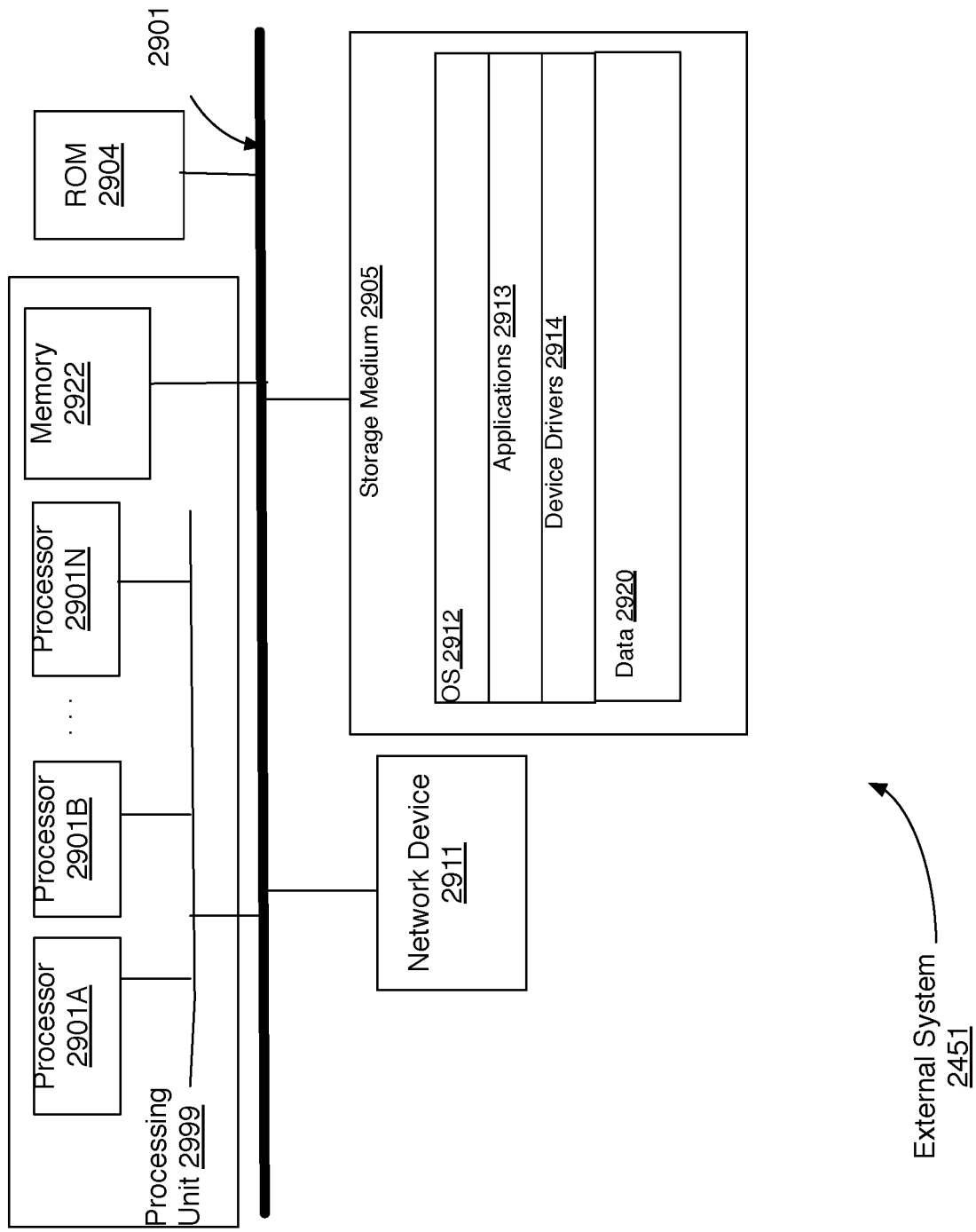
FIG. 29 is an architecture diagram of an external system.

FIG. 29 is an architecture diagram of an external system (e.g., an entity external system, such as, for example, one of the entity systems 2451-2453 of FIG. 24A) according to an implementation in which the external system is implemented by a server device. In some implementations, the external system is implemented by a plurality of devices.

The bus 2901 interfaces with the processors 2901A-2901N, the main memory (e.g., a random access memory (RAM)) 2922, a read only memory (ROM) 2904, a processor-readable storage medium 2905, and a network device 2911. In some implementations, the external system includes a display device and a user input device.

The processors 2901A-2901N may take many forms, such as ARM processors, X86 processors, and the like.

In some implementations, the server device includes at least one of a central processing unit (processor) and a multi-processor unit (MPU).

The processors 2901A-2901N and the main memory 2922 form a processing unit 2999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 2911 provides one or more wired or wireless interfaces for exchanging data and commands between the external system and other devices, such as the system 2400 of FIG. 24A. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 2922 (of the processing unit 2999) from the processor-readable storage medium 2905, the ROM 2904 or any other storage location. During execution of these software programs, the respective machine-executable instructions are accessed by at least one of processors 2901A-2901N (of the processing unit 2999) via the bus 2901, and then executed by at least one of processors 2901A-2901N. Data used by the software programs are also stored in the memory 2922, and such data is accessed by at least one of processors 2901A-2901N during execution of the machine-executable instructions of the software programs. The processor-readable storage medium 2905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 2905 includes machine-executable instructions (and related data) for an operating system 2912, software programs 2913, device drivers 2914, and data 2920.

20. Machines

The system and method of the preferred embodiment and variations thereof can be embodied and/or implemented at least in part as a machine configured to receive a computer-readable medium storing computer-readable instructions. The instructions are preferably executed by computer-executable components preferably integrated with the STMS platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

21. Conclusion

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   detecting, based on event data of a first account, that a first triggering event associated with the first account has been triggered;
   accessing a callback uniform resource identifier (URI) associated with the first triggering event, the callback URI corresponding to a micro-service;
   transmitting, to a computing system and via the callback URI, a communication;
   receiving application logic from the computing system in response to the communication; and
   executing the received application logic to provide the micro-service in relation to the first account.

2. The method of claim 1, wherein providing the micro-service in relation to the first account comprises:
   providing the micro-service in relation to a communication session between a first communication endpoint and a second communication endpoint.

3. The method of claim 1, further comprising:
   establishing, for the first account, a micro-service configuration describing triggering conditions for initiating use of micro-services in relation to the first account, wherein detection of the first triggering event is processed according to the triggering conditions for use of the micro-service described by the micro-service configuration.

4. The method of claim 3, further comprising:
   detecting, based on the event data of the first account, that a second triggering event associated with the first account has been triggered; and processing detection of the second triggering event according to the triggering conditions for use of micro-services described by the micro-service configuration.

5. The method of claim 3, further comprising:
establishing, for a second account, a second micro-service configuration describing triggering conditions for initiating use of micro-services in relation to the second account establishing, the triggering conditions for use of the micro-services by the second account being different than the triggering conditions for use of the micro-services by the first account.

6. The method of claim 5, further comprising:
accounting for usage of the micro-services in association with the second account based on the second micro-service configuration established for the second account.

7. The method of claim 1, wherein a first billing profile for the first account defines a pricing of usage at a first tier of usage and a second billing profile for a second account defines the pricing of usage at a second tier of usage.

8. The method of claim 7, wherein the pricing of usage at the second tier of usage is higher than the pricing of usage at the first tier of usage.

9. The method of claim 7, wherein the first tier of usage includes a usage limit.

10. A system comprising:
one or more computer processors; and
one or more computer-readable mediums storing instructions that, when executed by the one or more computer processors, cause the system to perform operations comprising:
detecting, based on event data of a first account, that a first triggering event associated with the first account has been triggered;
accessing a callback uniform resource identifier (URI) associated with the first triggering event, the callback URI corresponding to a micro-service;
transmitting, to a computing system and via the callback URI, a communication;
receiving application logic from the computing system in response to the communication; and
executing the received application logic to provide the micro-service in relation to the first account.

11. The system of claim 10, wherein providing the micro-service in relation to the first account comprises:
providing the micro-service in relation to a communication session between a first communication endpoint and a second communication endpoint.

12. The system of claim 10, the operations further comprising:
establishing, for the first account, a micro-service configuration describing triggering conditions for initiating use of micro-services in relation to the first account, wherein detection of the first triggering event is processed according to the triggering conditions for use of the micro-service described by the micro-service configuration.

13. The system of claim 12, the operations further comprising:
detecting, based on the event data of the first account, that a second triggering event associated with the first account has been triggered; and
processing detection of the second triggering event according to the triggering conditions for use of micro-services described by the micro-service configuration.

14. The system of claim 12, the operations further comprising:
establishing, for a second account, a second micro-service configuration describing triggering conditions for initiating use of micro-services in relation to the second account establishing, the triggering conditions for use of the micro-services by the second account being different than the triggering conditions for use of the micro-services by the first account.

15. The system of claim 14, the operations further comprising:
accounting for usage of the micro-services in association with the second account based on the second micro-service configuration established for the second account.

16. A non-transitory computer-readable medium storing instructions that, when executed by one or more computer processors of one or more computing devices, cause the one or more computing devices to perform operations comprising:
detecting, based on event data of a first account, that a first triggering event associated with the first account has been triggered;
accessing a callback uniform resource identifier (URI) associated with the first triggering event, the callback URI corresponding to a micro-service;
transmitting, to a computing system and via the callback URI, a communication;
receiving application logic from the computing system in response to the communication; and
executing the received application logic to provide the micro-service in relation to the first account.

17. The non-transitory computer-readable medium of claim 16, wherein providing the micro-service in relation to the first account comprises:
providing the micro-service in relation to a communication session between a first communication endpoint and a second communication endpoint.

18. The non-transitory computer-readable medium of claim 16, the operations further comprising:
establishing, for the first account, a micro-service configuration describing triggering conditions for initiating use of micro-services in relation to the first account, wherein detection of the first triggering event is processed according to the triggering conditions for use of the micro-service described by the micro-service configuration.

19. The non-transitory computer-readable medium of claim 18, the operations further comprising:
detecting, based on the event data of the first account, that a second triggering event associated with the first account has been triggered; and
processing detection of the second triggering event according to the triggering conditions for use of micro-services described by the micro-service configuration.

20. The non-transitory computer-readable medium of claim 18, the operations further comprising:
establishing, for a second account, a second micro-service configuration describing triggering conditions for initiating use of micro-services in relation to the second account establishing, the triggering conditions for use of the micro-services by the second account being different than the triggering conditions for use of the micro-services by the first account; and accounting for usage of the micro-services in association with the second account based on the second micro-service configuration established for the second account.

* * * * *